United States Patent [19]

Hirai et al.

[11] Patent Number: 5,367,843
[45] Date of Patent: Nov. 29, 1994

[54] ROOF APPARATUS

[75] Inventors: Takashi Hirai; Keisuke Hirai, both of Tokyo, Japan

[73] Assignee: Hirai Engineering Corporation, Tokyo, Japan

[21] Appl. No.: 111,333

[22] Filed: Aug. 24, 1993

[30] Foreign Application Priority Data

Sep. 7, 1992 [JP] Japan .................................. 4-262739
Mar. 11, 1993 [JP] Japan .................................. 5-076437

[51] Int. Cl.$^5$ .............................................. E04B 7/18
[52] U.S. Cl. ........................................ 52/200; 126/621
[58] Field of Search ............... 52/200; 126/621, 622, 126/623

[56] References Cited

U.S. PATENT DOCUMENTS

| | | | |
|---|---|---|---|
| 4,108,155 | 8/1978 | Koizumi et al. | 126/621 |
| 4,202,188 | 5/1980 | Cummings | 126/621 |
| 4,936,063 | 6/1990 | Humphrey | 52/200 |
| 4,996,809 | 3/1991 | Beard | 52/200 |
| 5,092,087 | 3/1992 | Kane et al. | 52/200 X |

FOREIGN PATENT DOCUMENTS

| | | |
|---|---|---|
| 0417303A1 | 3/1991 | European Pat. Off. . |
| 0424581A1 | 5/1991 | European Pat. Off. . |
| 2000860A | 1/1979 | United Kingdom . |

Primary Examiner—Carl D. Friedman
Assistant Examiner—Creighton Smith
Attorney, Agent, or Firm—Lowe, Price, LeBlanc & Becker

[57] ABSTRACT

A roof apparatus includes a plurality of light collecting members, each having a pair of left and right vertical members, an upper horizontal member, a lower horizontal member, and a transparent plate. The upper horizontal members are disposed at a ridge side end of the vertical members, the lower horizontal members are disposed at an eaves side end of the vertical members, and the transparent plate is disposed on the inner periphery of the vertical members, the upper horizontal member, and the lower horizontal member. The light collecting members are connected in a slope direction of the roof, and the lower horizontal member has a transparent plate holding piece, a transparent plate contact wall, and a cover piece. The transparent plate holding piece is adapted to hold an eaves side end of the transparent plate. The transparent plate contact wall has a thickness which is smaller than the thickness of the transparent plate. The cover piece is adapted to cover an upper portion of the upper horizontal member of an adjacent eaves side light collecting member and extends from the upper end of the transparent plate contact wall.

13 Claims, 59 Drawing Sheets

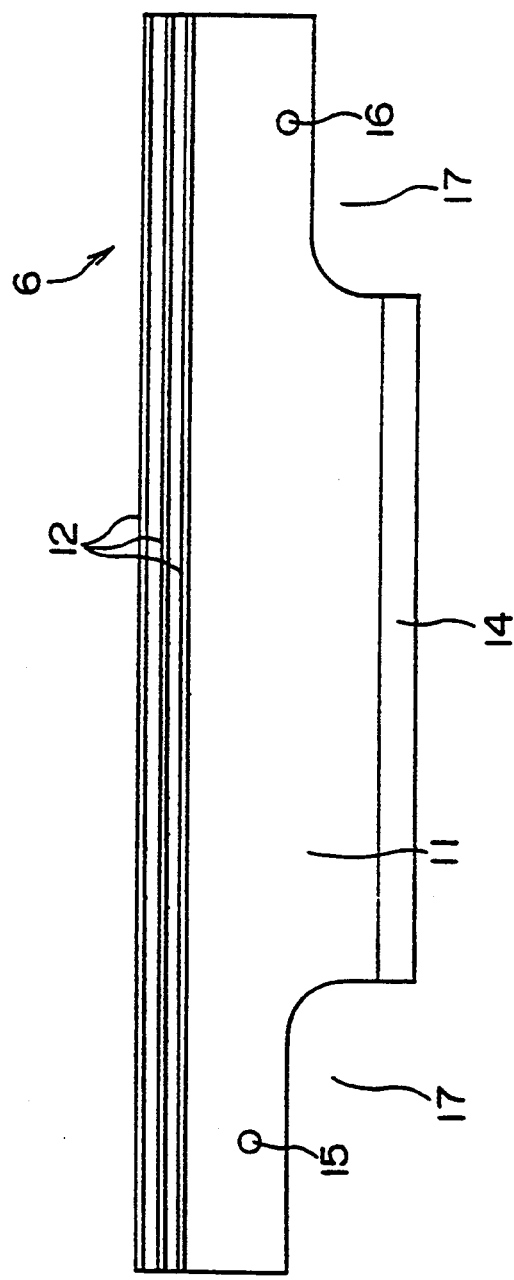
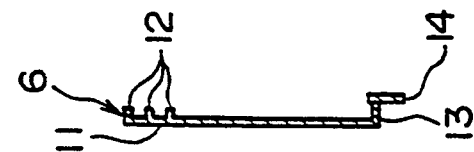

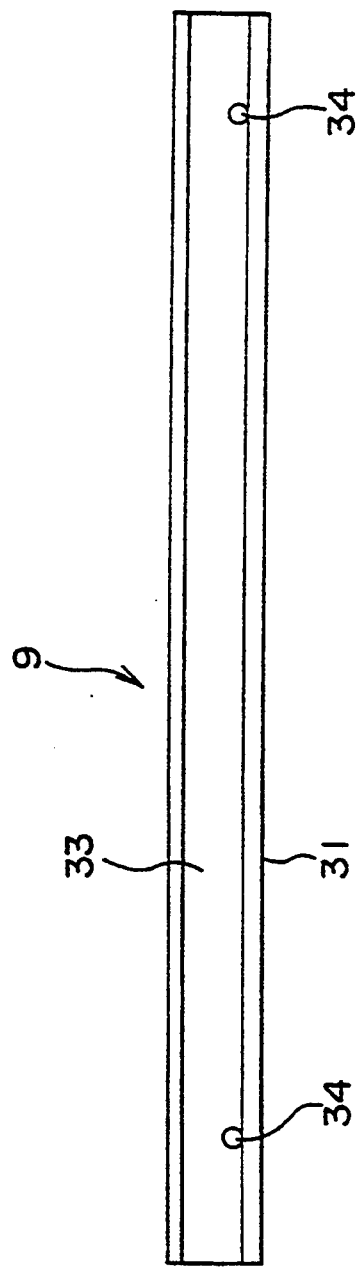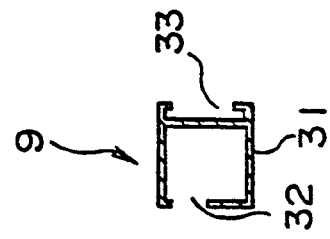

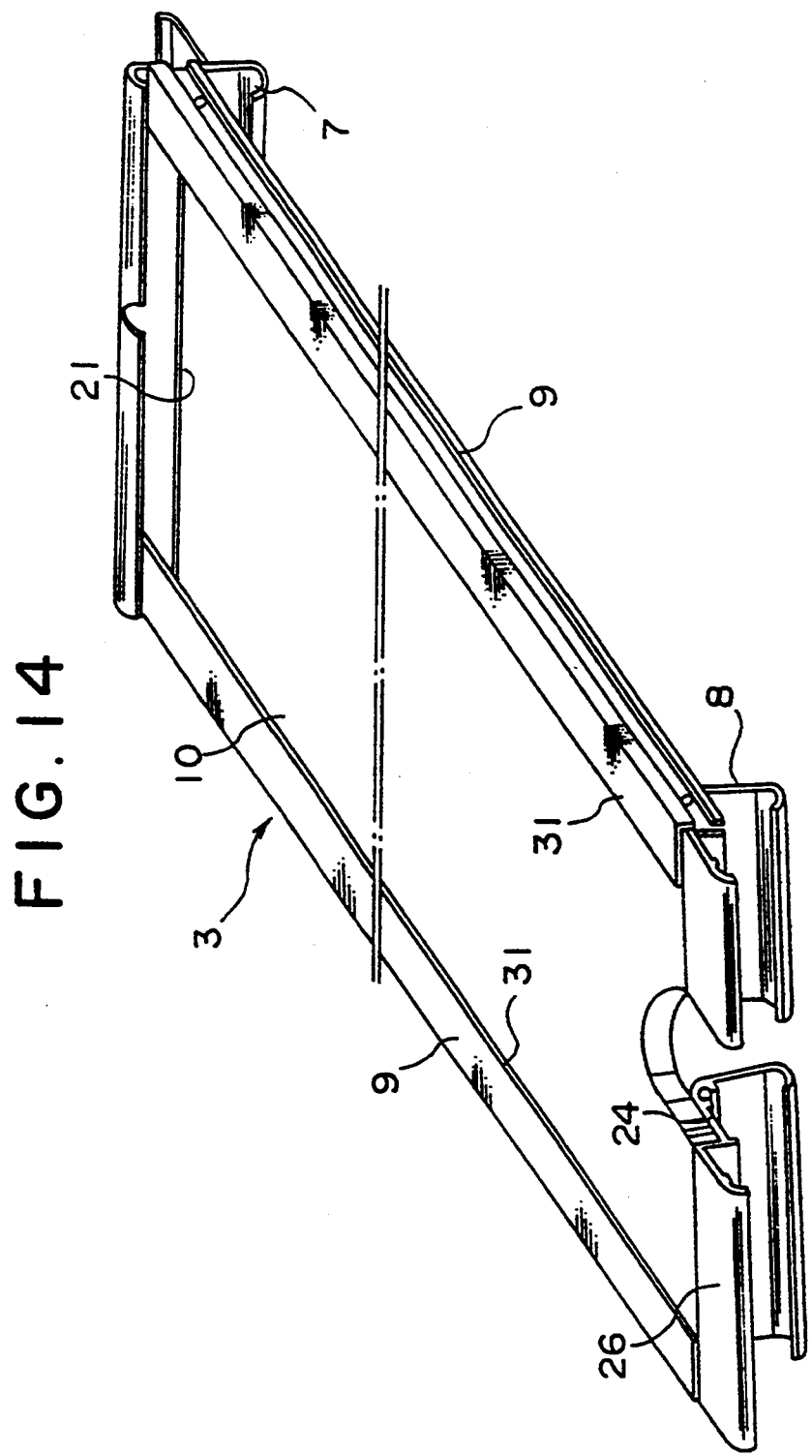

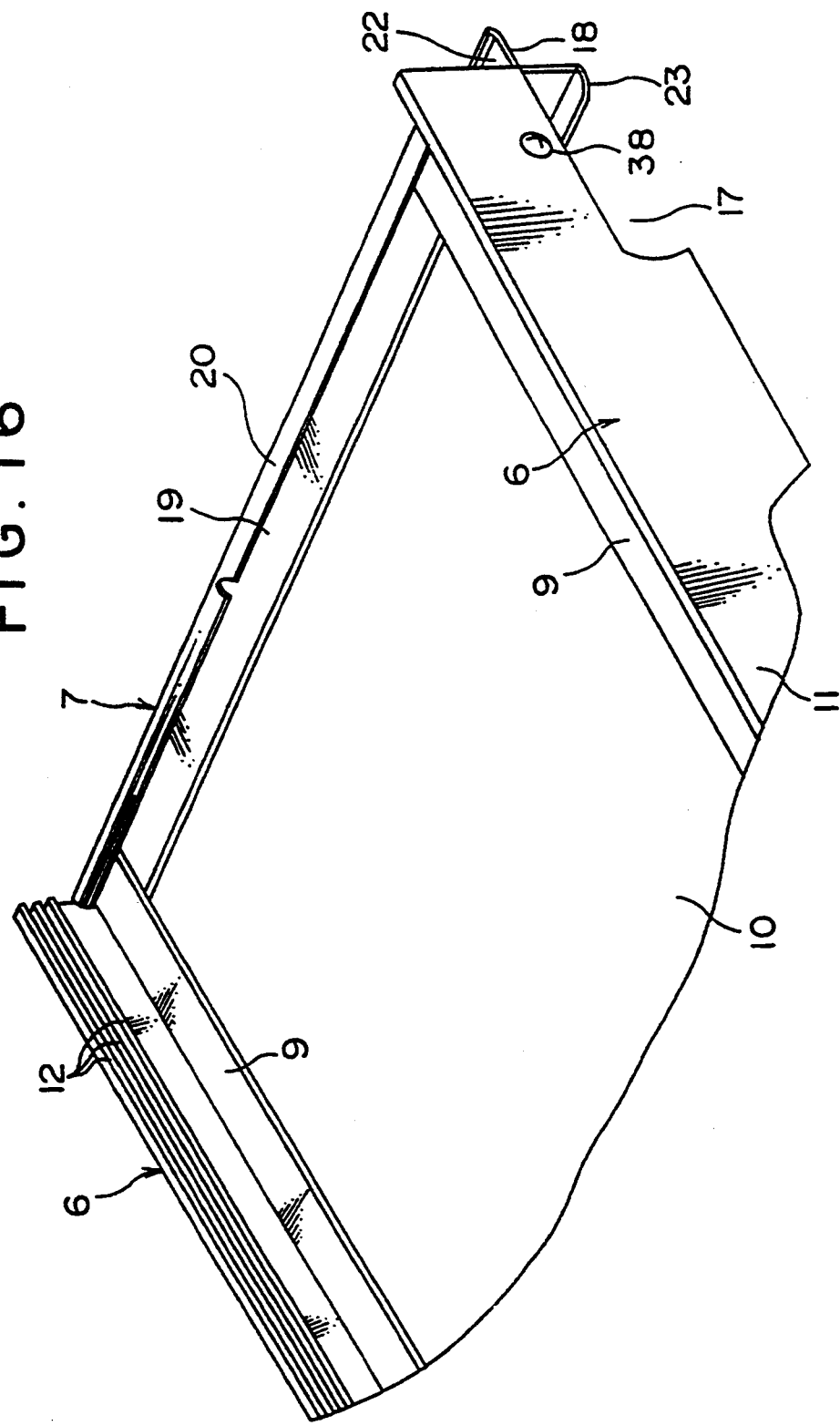

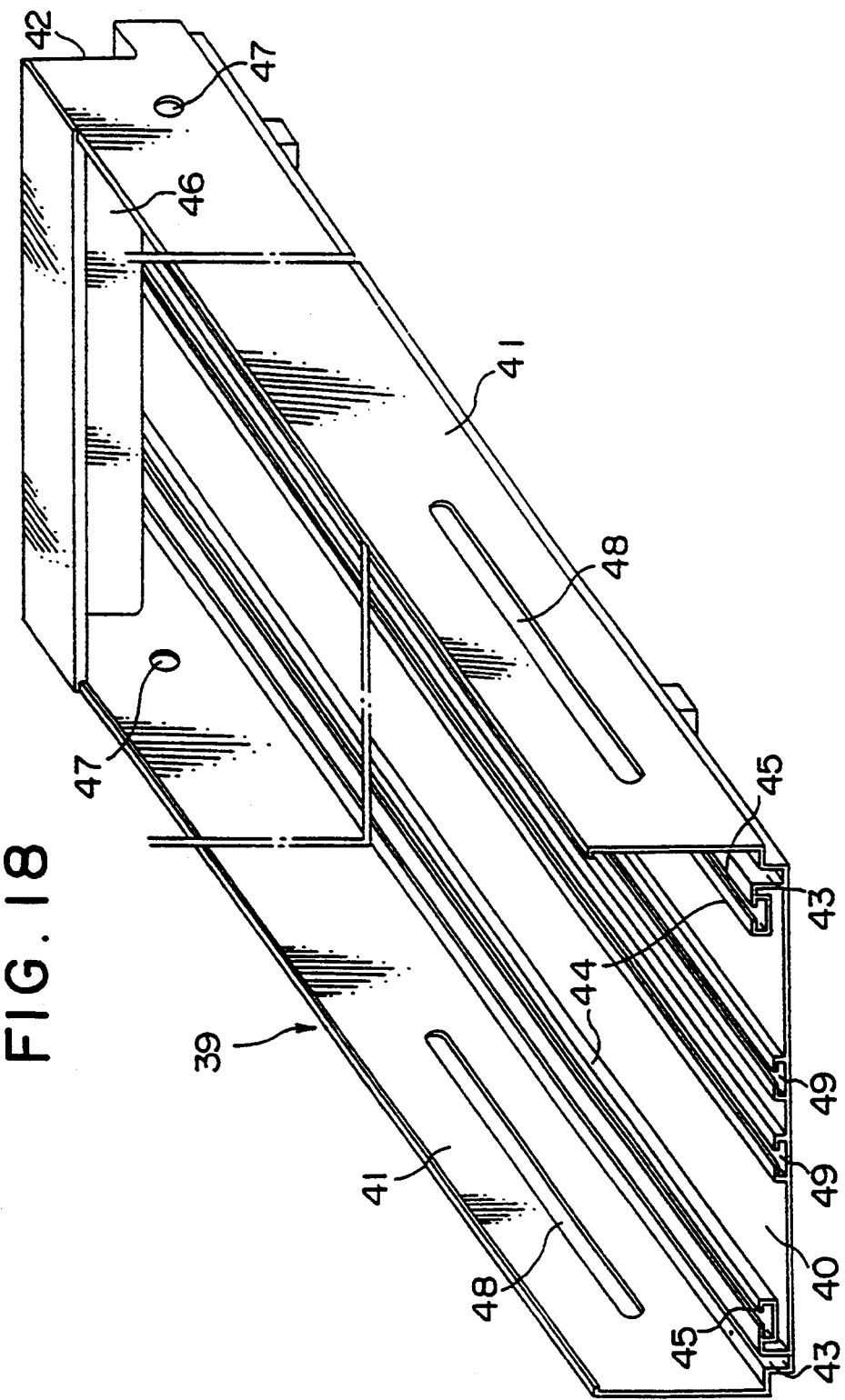

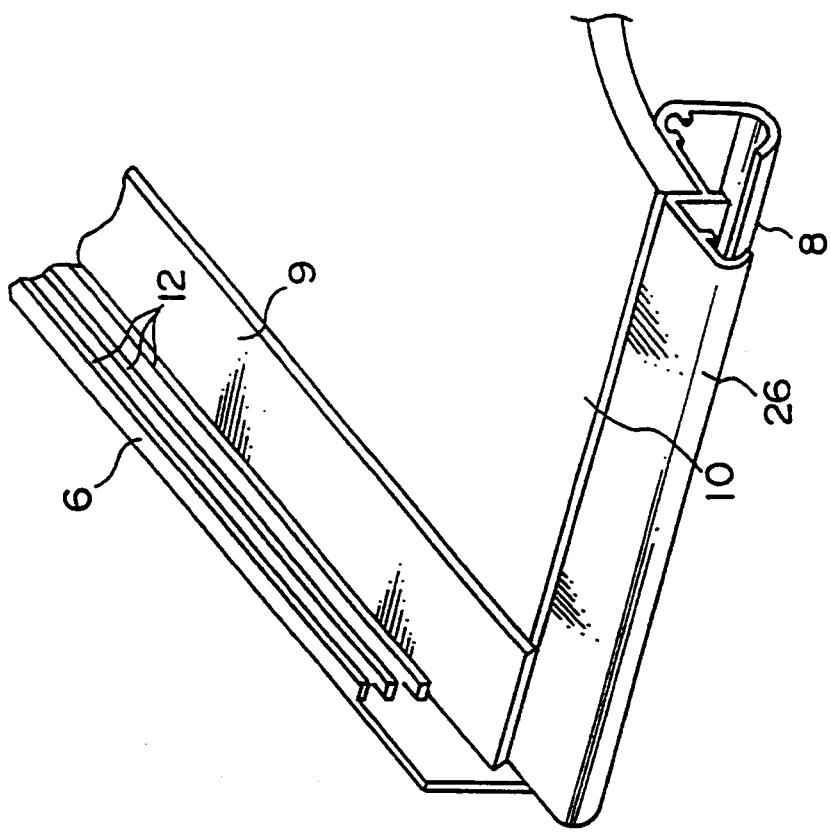
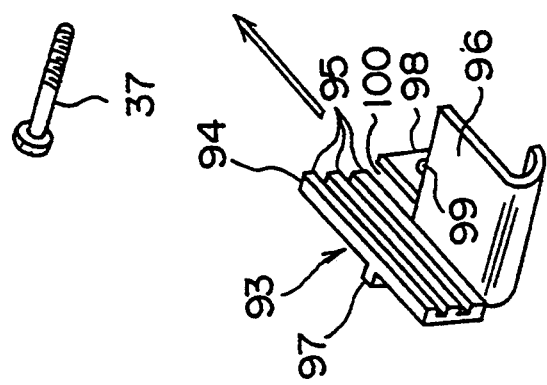
FIG. 44

ROOF APPARATUS

BACKGROUND OF INVENTION

The present invention relates to a roof apparatus suitable for a solar energy collecting roof.

DESCRIPTION OF THE RELATED ART

The applicant of the present invention has disclosed a light collecting frame for a roof as Japanese Patent Laid-Open Publication No. 241157/1991. The light collecting frame has a transparent plate which is disposed in a space defined by a transparent plate support member, a lower horizontal member, and an upper horizontal member. At a lower front end of the lower horizontal member, a recess which is fitted to the upper horizontal member is defined. On an upper surface at an eaves side edge of the lower horizontal member, a transparent plate contact wall which has nearly the same thickness as the transparent plate is disposed.

SUMMARY OF THE INVENTION

An object of the present invention is to provide a roof apparatus for having a well drainage in the eaves direction of the roof, effectively flashing a connecting portion between a lower horizontal member and an upper horizontal member, preventing dust, rubbish, and the like from staying on the upper surface of a transparent plate, and suppressing a decrease of light collecting efficiency.

The present invention is a roof apparatus, comprising a plurality of light collecting members, each of the light collecting member having a pair of (left and right) vertical members, an upper horizontal member, a lower horizontal member, and a transparent plate, the upper horizontal member being disposed at a ridge side end of the vertical members, the lower horizontal member being disposed at an eaves side end of the vertical members, the transparent plate being disposed on the inner periphery of the vertical members, the upper horizontal member, and the lower horizontal member, the light collecting members being connected in a slope direction of a roof, wherein the lower horizontal member has a transparent plate holding piece, a transparent plate contact wall, and a cover piece, the transparent plate holding piece being adapted to hold an eaves side end of the transparent plate, the transparent plate contact wall having the thickness which is smaller than the thickness of the transparent plate, the cover piece being adapted to cover an upper portion of the upper horizontal member of an adjacent eaves side light collecting member and extending from the upper end of the transparent plate contact wall.

The vertical members each comprises a plurality of water proof protrusions longitudinally formed at an upper end of the inner surface of the vertical wall, a horizontal protrusion piece disposed on the inner surface at the lower end of the vertical wall, and a vertical support leg being disposed at the inner end of the horizontal extrusion piece and vertically extending.

The vertical wall and the vertical support leg each define a ventilation notch at the lower end on an eaves side end and a ridge side end thereof.

The upper horizontal member comprises a sash-shaped horizontal piece, an upright wall disposed in the longitudinal direction on the upper surface of the horizontal piece, a horizontal upper surface being disposed at the upper end of the upright wall and extending on an eaves side of the roof, the horizontal upper surface being in parallel with the horizontal piece, a water reflecting wall folded to a ridge side end of the horizontal upper surface, a transparent plate support groove defined between the horizontal piece and the horizontal upper surface, and a fitting engagement piece having a downward extend portion, a first bend portion, and a second bend portion, which are connected in succession, the downward extend portion extending on the lower surface of the horizontal piece, the first bend portion bending on an eaves side, the second bend portion bending upwardly.

The forward end of the cover piece downwardly bends, the lower surface thereof having a water proof protrusion.

The transparent plate holding piece has a curved water proof aqueduct disposed at a ridge side edge and curves downwardly in the eaves direction of the roof.

The vertical members each have a transparent plate support member disposed along the inner surface thereof.

The transparent plate support member comprises a hollow transparent plate holding frame, a space means formed in the longitudinal direction at an upper portion of an inner wall of the transparent plate holding wall, the space means being adapted to allow the transparent plate to be held, and a groove means formed in the longitudinal direction on an outer surface of the transparent plate holding frame.

The roof apparatus further comprises a plurality of connecting members disposed in the slope direction of the roof at predetermined intervals, a light collecting member fitting mounted on each of the connecting members, and an engagement hook upwardly extending on the ridge side of the roof to the light collecting member fitting and engaging with a fitting engagement piece of the upper horizontal member.

The engagement hook is disposed on each of a ridge side and an eaves side of the light collecting member fitting.

The light collecting member fitting comprises a lower across piece, and an upper holding piece disposed on the upper surface of the lower across piece.

Since the eaves side end surface of the transparent plate is in contact with the transparent plate contact wall, the eaves side end of the transparent plate is supported. Thus, since the upper surface of the eaves side end of the transparent plate is not closed, the area of the transparent plate becomes wide. As a result, the solar energy collecting efficiency is improved. Since the upper surface of the transparent plate is higher than the upper surface of the cover piece, rain water flows from the transparent plate to the upper surface of the light collecting member on the eaves side through the upper surface of the cover piece. Thus, the rain water is smoothly drained. In addition, since the cover piece is engaged with the upper horizontal member, the splashing of rain water can be prevented.

The transparent plate contact wall which is thinner than the transparent plate is disposed at an eaves side end of the transparent plate holding piece. Moreover, the cover piece which covers the upper horizontal member of an adjacent light collecting member is disposed at the upper end of the transparent plate contact wall, the transparent plate at the eaves side end more protrudes than the lower horizontal member. Thus, rain water which flows on the upper surface of the light collecting member does not stay. Instead, the rain water is quickly drained to the eaves side. In addition, the rain water does not enter the engagement portion between the upper horizontal member and the lower horizontal member. Moreover, dust and rubbish neither adhere to the ridge side end surface of the lower horizontal member, nor stay on the upper surface of the transparent plate. Thus, the light transmitting efficiency is not lowered. Furthermore, since all portions except for the connecting member and the lower horizontal member can be formed as light collecting surface, the light collecting efficiency is high. When the roof apparatus is used as a solar energy collecting roof where photo-cells are disposed on the lower surface of the transparent plate, the energy collecting efficiency becomes very high.

BRIEF DESCRIPTION OF THE DRAWINGS

FIG. 6 Is a side view showing a vertical member;

FIG. 7 is a sectional view of the vertical member;

FIG. 12 is a side view showing a transparent plate support member;

FIG. 13 is a sectional view showing the transparent plate support member;

FIG. 14 is a perspective view showing the light collecting member to which the vertical member has not been mounted;

FIG. 16 is a perspective view showing a ridge side end of the light collecting member;

FIG. 18 is a perspective view showing a light collecting member assembling jig to which a lower horizontal member alignment member has not been mounted;

FIG. 44 is an exploded perspective view showing one side of a light collecting member according to the second embodiment;

DETAILED DESCRIPTION OF THE PREFERRED EMBODIMENTS

Figure 1:
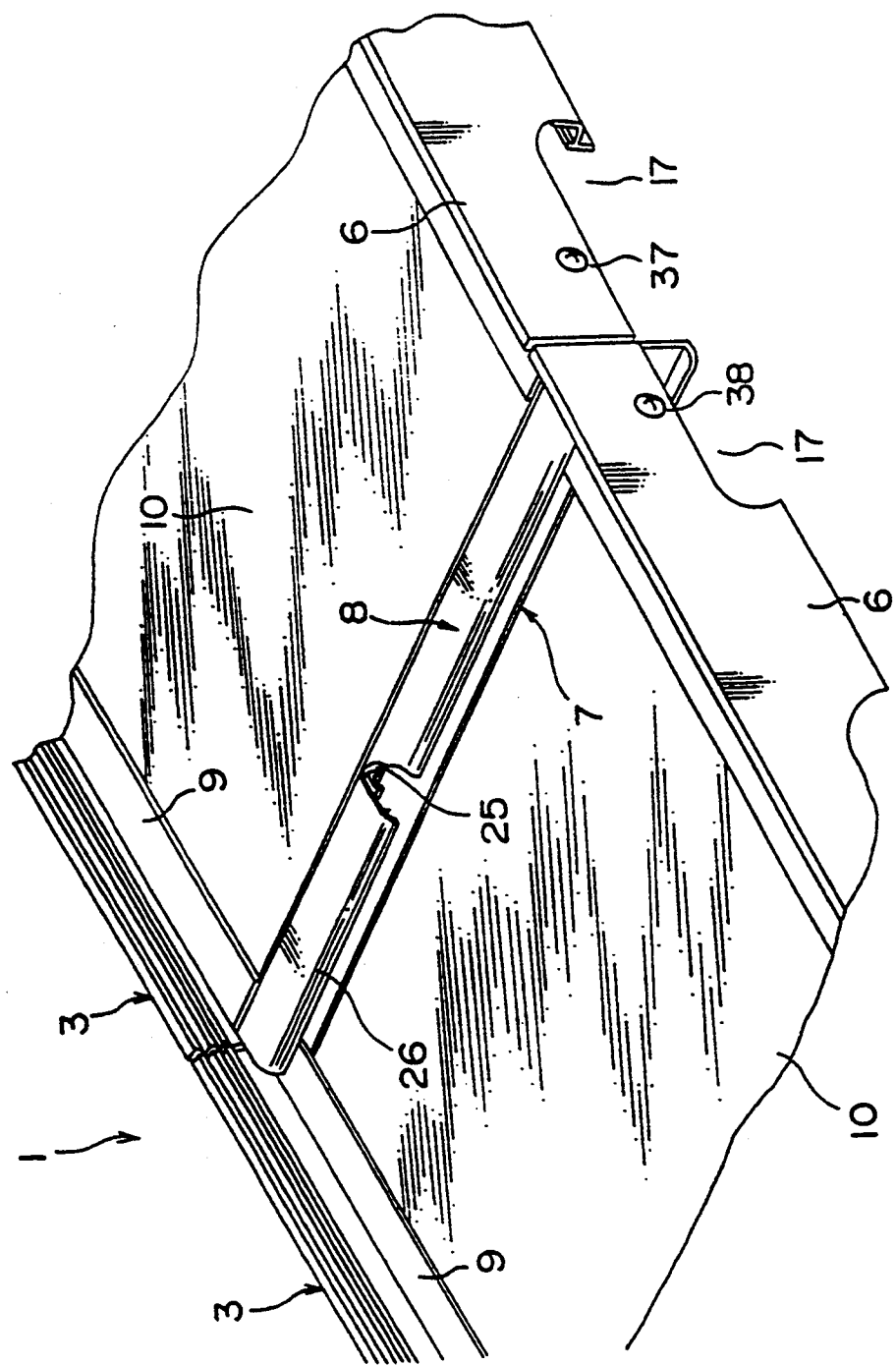
FIG. 1 is a perspective view showing principal portions of a roof apparatus.
Figure 2:
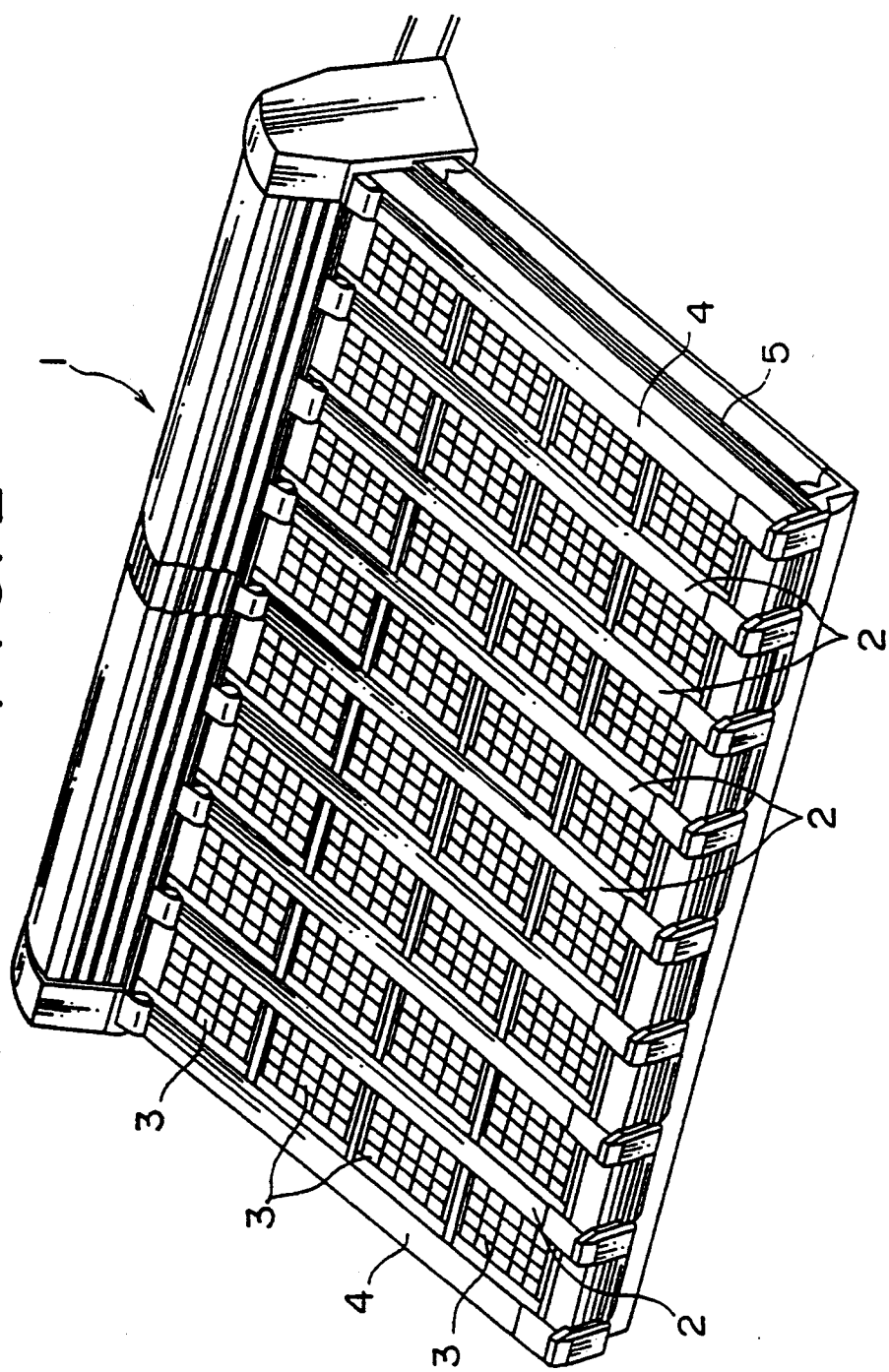
FIG. 2 is an overall perspective view showing the roof apparatus.

In FIG. 2, a roof apparatus 1 is mounted on a gabled roof. The roof apparatus 1 comprises intermediate connecting members 2, light collecting members 3, lateral connecting members 4, and lateral front base members 5. The intermediate connecting members 2 are disposed in the slope direction of the roof backing at predetermined intervals. Between adjacent intermediate connecting members 2, the light collecting members 3 are disposed. On the most gable sides of the roof apparatus 1, the lateral connecting members 4 are disposed instead of the intermediate connecting members 2. Outside the lateral connecting member 4, the lateral front base member 5 is disposed.

Figure 3:
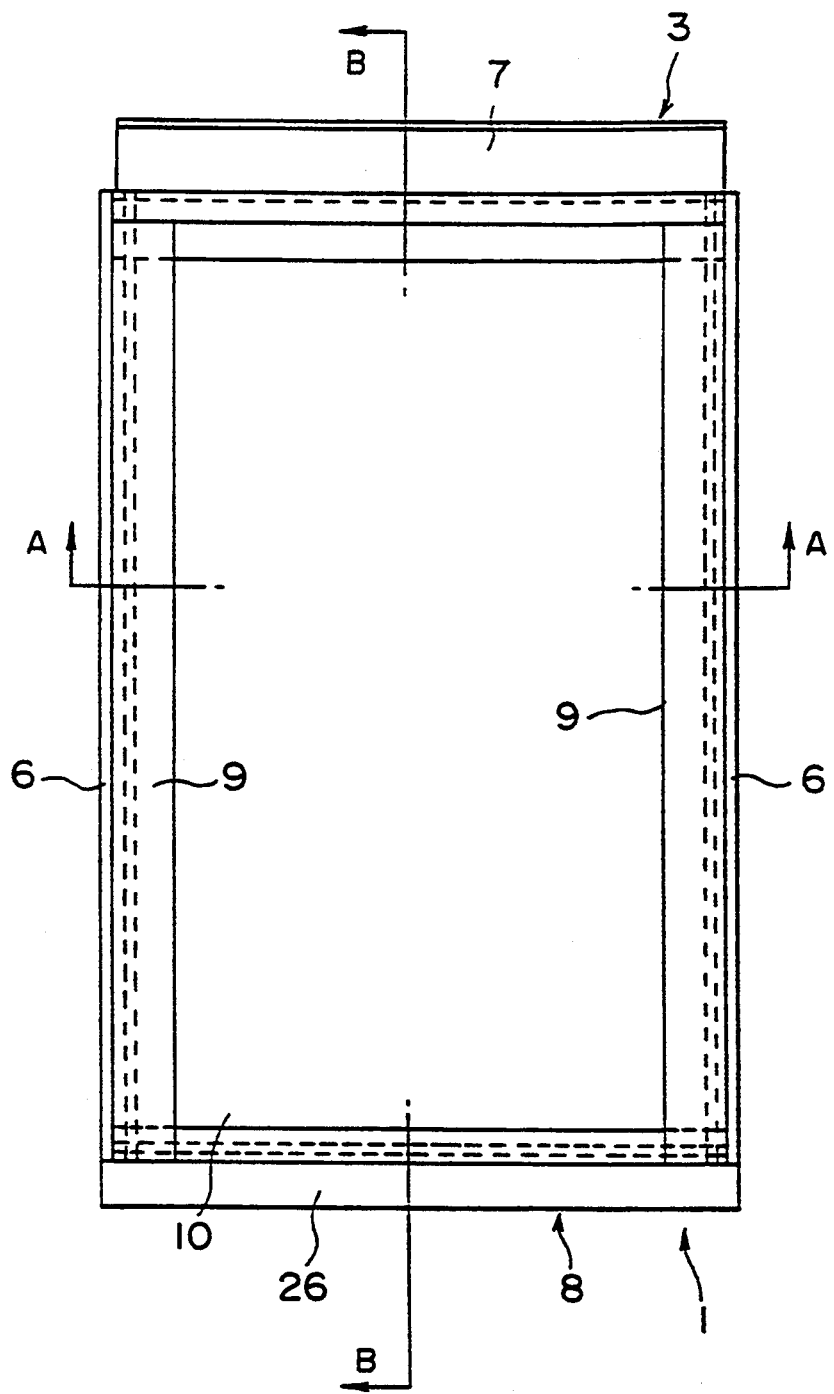
FIG. 3 is a plan view showing a light collecting member.
Figure 4:
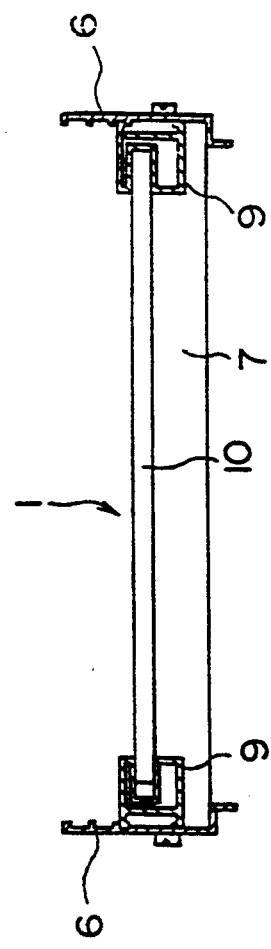
FIG. 4 is a sectional view taken along line A—A of FIG. 3.
Figure 5:
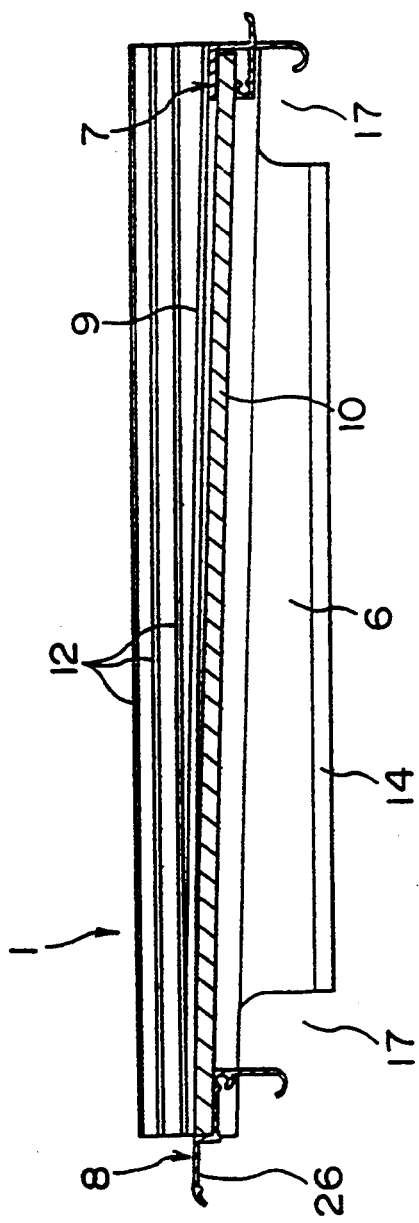
FIG. 5 is a sectional view taken along line B—B of FIG. 3.

As shown in FIGS. 3 to 5, the light collecting member 3 comprises a pair of (left and right) vertical members 6, an upper horizontal member 7 (disposed between ridge side ends of the vertical members 6), a lower horizontal member 8 (disposed between the eaves side ends of the vertical members 6), transparent plate support members 9 (disposed along the inner surfaces of the vertical members 6, the upper horizontal member 7, and the lower horizontal member 8), and a transparent plate 10 such as glass plate or acrylic resin plate (disposed on the inner periphery of a square frame defined by such members). On the nearly entire rear surface of the transparent plate 10, photo-cells are disposed. The photo-cells converts solar energy into electric energy.

As shown in FIGS. 6 and 7, the vertical member 6 has a vertical wall 11. At an upper end portion on the inner surface of the vertical wall 11, a plurality of water proof protrusions 12 are longitudinally formed. At the lower end of the inner surface of the vertical wall 11, a horizontal protrusion piece 13 is disposed. At the inner end of the horizontal protrusion piece 13, a vertical support leg 14 is disposed. The vertical support leg 14 vertically protrudes.

At an eaves side end portion of the vertical wall 11, a mounting hole 15 is defined. At a ridge side end portion of the vertical wall 11, a mounting hole 16 is defined. The distance between the lowest water proof protrusion 12 and the mounting hole 15 is smaller than the distance between the lowest water proof protrusion 12 and the mounting hole 16. At the lower ends on the eaves side and the ridge side of the vertical wall 11 and the vertical support leg 14, ventilation notches 17 are defined.

Figure 8:
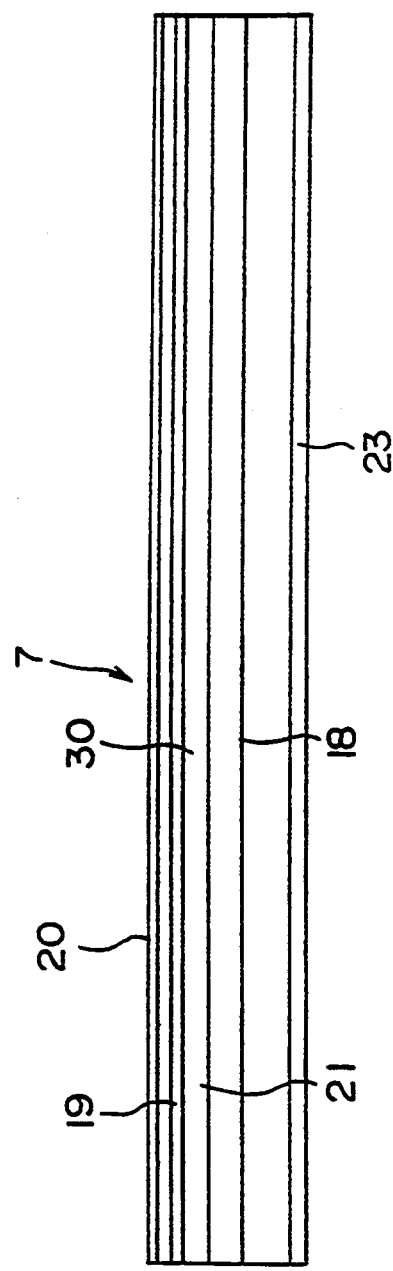
FIG. 8 is a side view showing an upper horizontal member.
Figure 9:
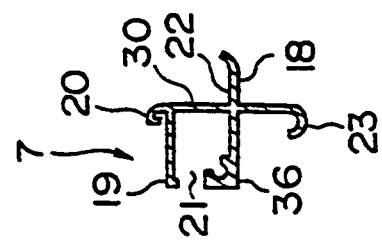
FIG. 9 is a sectional view showing the upper horizontal member.

As shown in FIGS. 8 and 9, the upper horizontal member 7 has a sash-shaped horizontal piece 18. The horizontal piece 18 extends in the direction perpendicular to the eaves and ridge directions. On the upper surface of the horizontal piece 18, an upright wall 30 is longitudinally disposed. At the upper end of the upright wall 30, a horizontal upper surface 19 which is in parallel with the horizontal piece 18 extends on the eaves side is formed. The ridge side end of the horizontal upper surface 19 is folded so as to form a water reflecting wall 20. Between the horizontal piece 18 and the horizontal upper surface 19, a transparent plate support groove 21 is defined. A hollow curved groove 36 is longitudinally defined at the eaves side end of the horizontal piece 18. On the ridge side upper surface of the horizontal piece 18, a drainage groove 22 is formed. On the lower surface of the horizontal piece 18, a fitting engagement piece 23 is formed. The fitting engagement piece 28 downwardly extends from the lower surface of the horizontal piece 18, bends on the eaves side, and upwardly bends.

Figure 10:
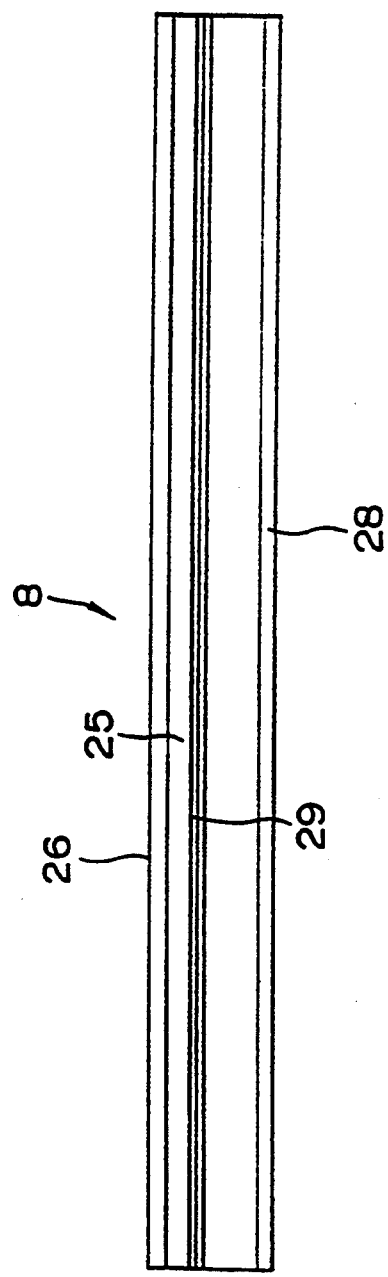
FIG. 10 is a side view showing a lower horizontal member.
Figure 11:
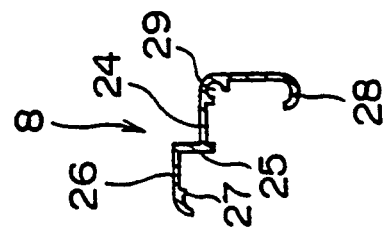
FIG. 11 is a sectional view showing the lower horizontal member.

As shown in FIGS. 10 and 11, the lower horizontal member 8 has a horizontally sash-shaped transparent plate holding piece 24. On the upper surface of the eaves side edge of the transparent plate holding piece 24, a transparent plate contact wall 25 is formed. The thickness of the transparent plate contact wall 25 is smaller than the thickness of the transparent wall 10. A cover piece 26 extends in the eaves direction on the upper end of the transparent plate contact wall 25. The cover piece 26 covers the horizontal upper surface 19 of the upper horizontal member 7. The forward end of the cover piece 26 downwardly bends. On the lower surface of the cover piece 26, a water proof protrusion 27 is formed. At the ridge side edge of the transparent plate holding piece 24, a curved water proof aqueduct 28 which downwardly bends in the eaves direction is formed. At the connecting portion between the transparent plate holding piece 24 and the curved water proof aqueduct 28, a hollow curved groove 29 is formed.

As shown in FIGS. 12 and 13, the transparent plate support member 9 has a hollow transparent plate holding frame 31. At an upper portion of the inner wall of the transparent plate holding frame 31, a space 32 into which the transparent plate is inserted is longitudinally defined. At an upper portion of the outer surface of the transparent plate holding frame 31, a recess 33 which prevents water from entering due to capillary action is longitudinally defined. At both end portions in the ridge and eaves directions on the outer wall of the transparent plate holding frame 31, fixing holes 34 which match the mounting holes 15 and 16 are defined, respectively.

Next, the assembling of the light collecting member 3 will be described. As shown in FIG. 14, the eaves side end of the transparent plate 10 is disposed on the upper surface of the transparent plate holding piece 24 of the lower horizontal member 8. The eaves side end of the transparent plate 10 is inserted into the transparent plate support groove 21 of the upper horizontal member 7. Both the lateral ends of the transparent plate 10 are inserted into the transparent plate holding frame 31 of the transparent plate support member 9. The four sides of the transparent plate 10 are supported by the above-described members through packings. The eaves side end of the upper surface of the transparent plate 10 is more protruded than the cover piece 26 of the lower horizontal member 8.

Thus, the height of the lower horizontal member 8 is lower than the height of the transparent plate 10. Thus, rain water which flows on the upper surface of the transparent plate is quickly drained on the eaves side. Therefore, dust and rubbish never stay on the transparent plate 10.

Figure 15:
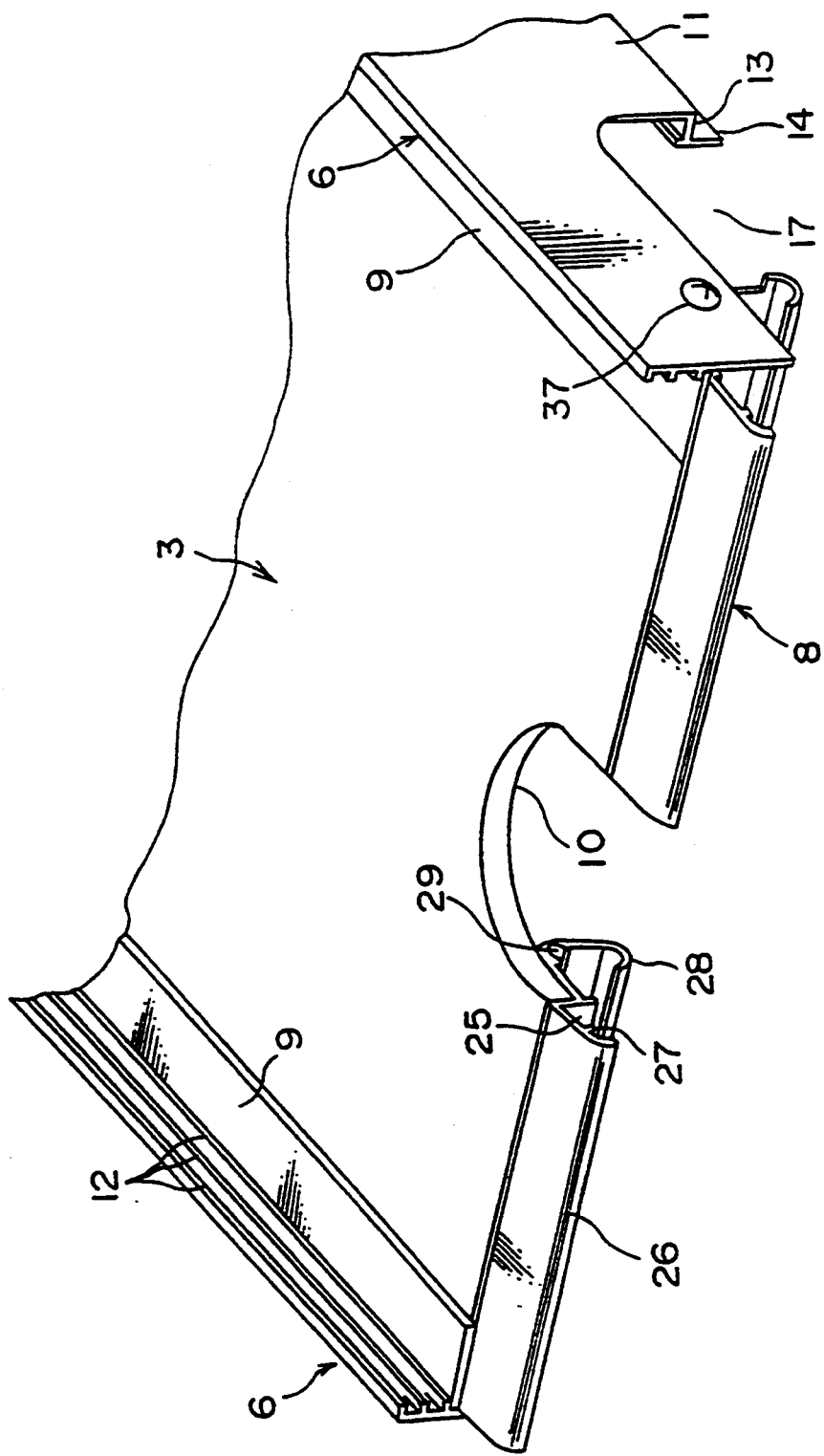
FIG. 15 is a perspective view showing a notch of an eaves side end of the light collecting member.

Next, the outer surface of the transparent plate support member 9 is contacted with the inner surface of the vertical wall 11 of the vertical member 6. The transparent plate support member 9 is mounted on the vertical member 6 with a predetermined angle so that the eaves side end of the transparent plate support member 9 is higher than the ridge side end. As shown in FIG. 15, a screw 37 is inserted into the eaves side mounting hole 15 of the vertical member 6, the eaves side fixing hole 34 of the transparent plate support member 9, and the hollow curved groove 29. As shown in FIG. 16, a screw 8 is inserted into the ridge side mounting hole 16 of the vertical member 6, the ridge side fixing hole 34 of the transparent plate support member 9, and the hollow curved groove 36 of the upper horizontal member 7. Thus, the light collecting member 3 is assembled.

Figures 17A, 17B, 17C:
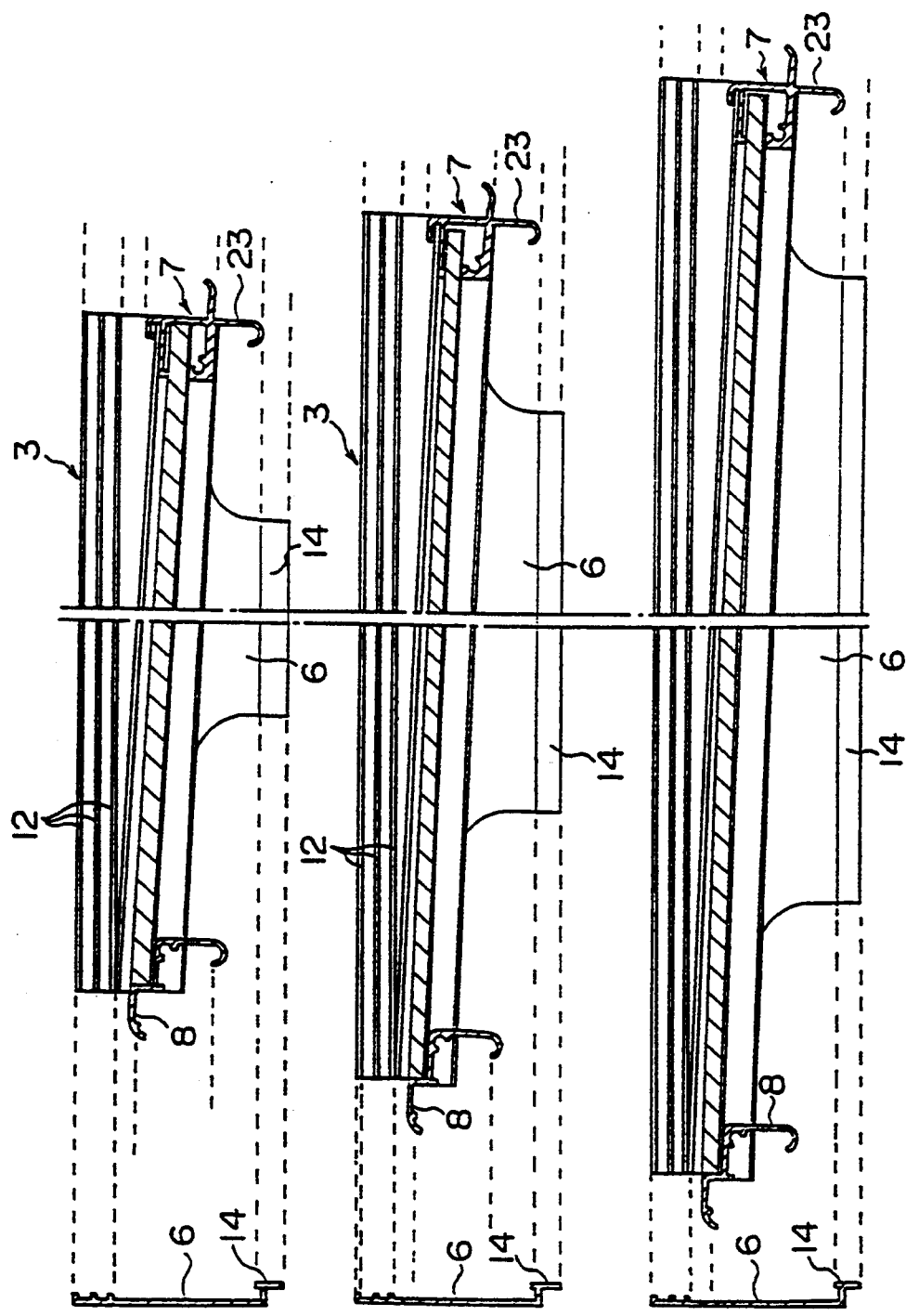
FIGS. 17 (a), (b), and (c) are views for comparing three types of light collecting members which differ from each other in different lengths.

The length of the roof apparatus 1 in the slope direction of the roof depends on the size of the building and the slope of the roof thereof. Thus, by a combination of a plurality of light collecting members 3 which differ from each other in lengths, the roof apparatus 1 is mounted on the roof of the building. FIG. 17 (a) shows a shorter light collecting member 3; FIG. 17 (b) shows a longer light collecting member 3; and FIG. 7 (c) shows a much longer light collecting member 3. The upper surface at the eaves side end of the transparent plate support member 9 is contacted with the lower surface of the lowest wafer proof protrusion of the vertical member 6. The light collecting member 3 is assembled so that the height of the lower surface of the fitting engagement piece 23 of the upper horizontal member 7 is equal to the height of the upper end of the vertical support leg 14 of the vertical member 6. The height of the transparent plate support member 9 mounted on the vertical member 6 is constant regardless of the length of the light collecting member 3. The angle between the transparent plate support member 9 and the vertical member 6 is disproportional to the length of the light collecting member 3.

Thus, when the transparent plate support member 9 and the vertical member 6 are independently produced, they can be extrude-molded. Even if the slope angle of the roof changes, the angle between the transparent plate support member 9 and the vertical member 6 can be adjusted with the same members.

As shown in FIG. 18, with a light collecting member assembling jig 39, the vertical member 6 and the transparent plate support member 9 are aligned.

The light collecting member assembling jig 39 is slightly longer than the longest light collecting member 3. Along both the edges in the lateral direction of a bottom plate 40 with nearly the same width as the light collecting member 3, a side wall 41 with nearly the same inner shape as the outer surface of the vertical member 6 is vertically disposed. Along one edge in the longitudinal direction of the bottom plate 40, a rear wall 42 is vertically disposed. Along the lower end on the inner surface of the side wall 41, a vertical member support groove 43 is defined. In addition, inside the vertical member support groove 43, an upper horizontal member alignment protrusion 44 is longitudinally disposed. At an intermediate portion in the lateral direction of the bottom plate 40, a pair of (left and right) pressure member guide grooves 49 are longitudinally defined.

On the upper surface of the upper horizontal member alignment protrusion 44, a slide groove 45 is longitudinally defined. The distance between the bottom surface of the vertical member support groove 34 and the upper surface of the upper horizontal member alignment protrusion 44 is nearly the same as the height of the vertical support leg 14 of the vertical member 6. At an upper portion of the rear wall 42, a vertical member fixing wall 46 is disposed. The vertical member fixing wall 46 which recesses for the length nearly equal to the distance between the upright wall 30 of the upper horizontal member 7 and the ridge side end of the horizontal piece 18. At one end portion in the longitudinal direction of the side wall 41, a round hole 47 which matches the ridge side mounting hole 16 is defined. At the other end in the longitudinal direction of the side wall 41, an elongate hole 48 is longitudinally defined with the same height as the eaves side mounting hole 15 of the vertical member 6.

Figure 19:
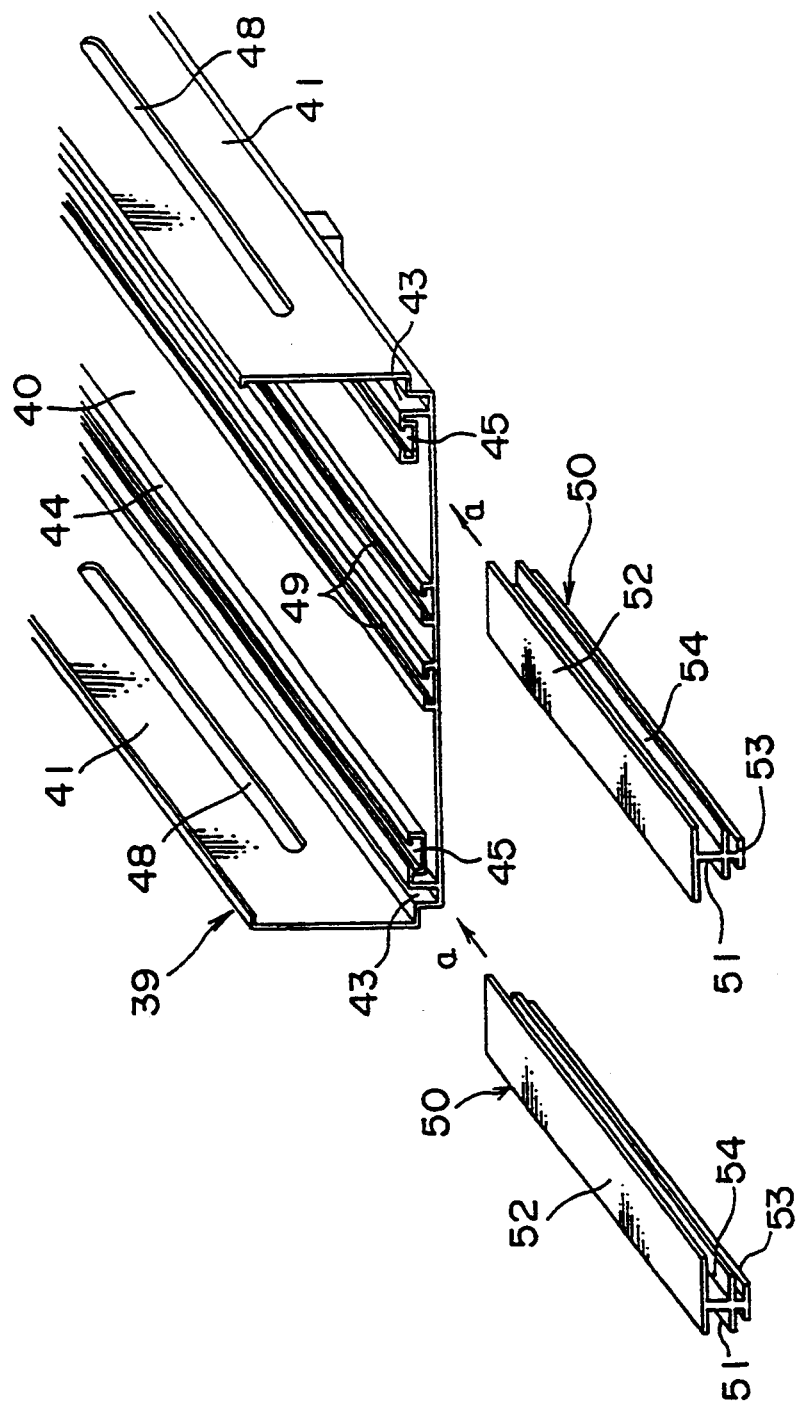
FIG. 19 is a perspective view showing principal portions of the light collecting member assembling jig to which the lower horizontal member alignment member is being mounted.

As shown in FIG. 19, the length of the lower horizontal member alignment member 50 is longer than the difference between the longest light collecting member 3 and the shortest light collecting member 3. At the upper end of a hanging piece 51, a lower horizontal member support wing piece 52 horizontally extends. An engagement protrusion 53 is inserted into the slide groove 45 at the lower end of the hanging piece 51. Above the engagement protrusion 53, a contact wing piece 54 is disposed. The contact wing piece 54 is disposed on the upper surface of the upper horizontal member alignment protrusion 44.

Figure 20:
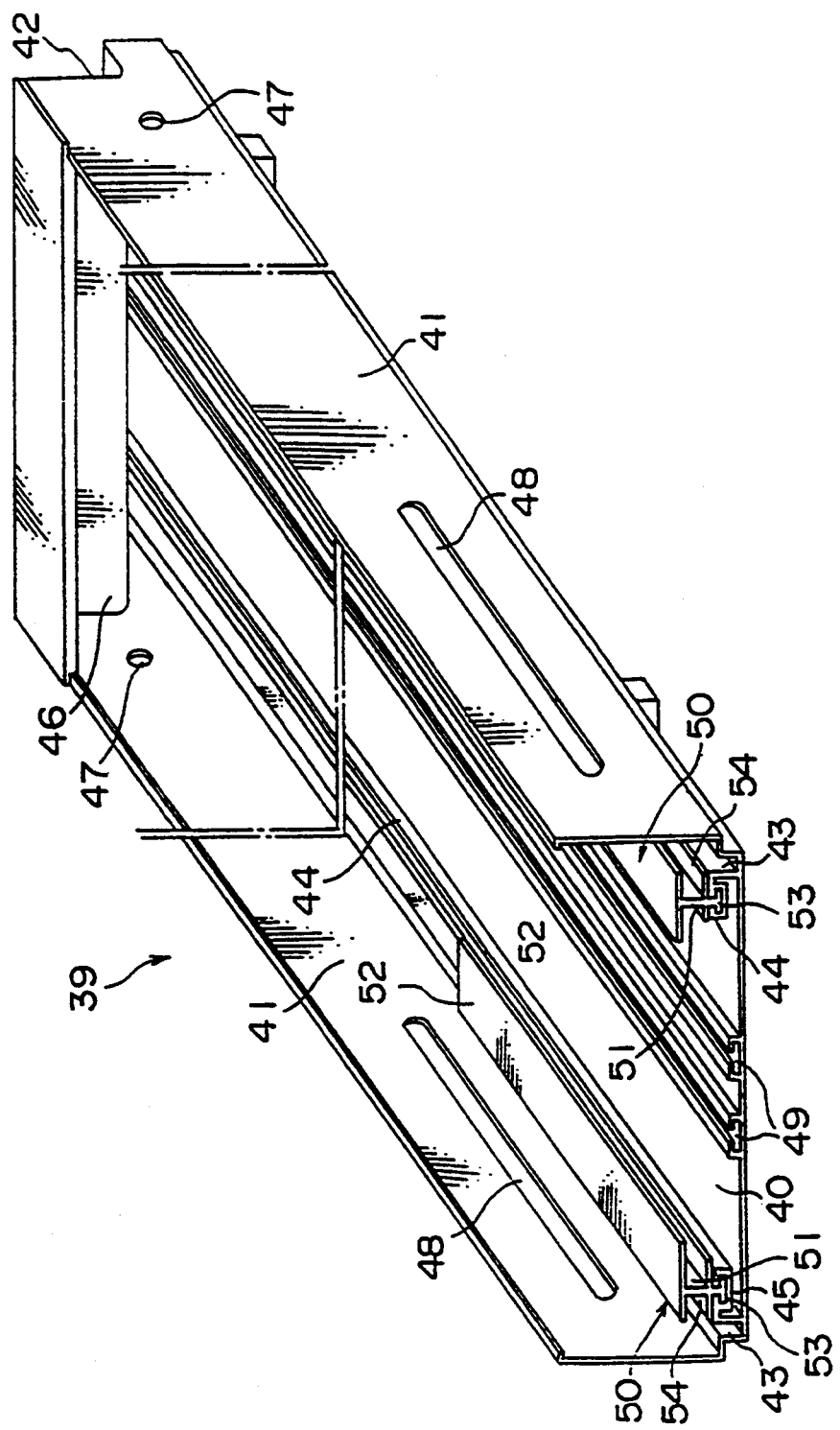
FIG. 20 is a perspective view showing the light collecting member assembling jig to which the lower horizontal member alignment member has been mounted.

The engagement protrusion 53 of the lower horizontal alignment member 50 is slid along arrow a from the other end in the longitudinal direction of the slide groove 45. As shown in FIG. 20, the lower horizontal alignment member 50 is mounted at the other end in the longitudinal direction of the upper horizontal member alignment protrusion 44.

Figure 21:
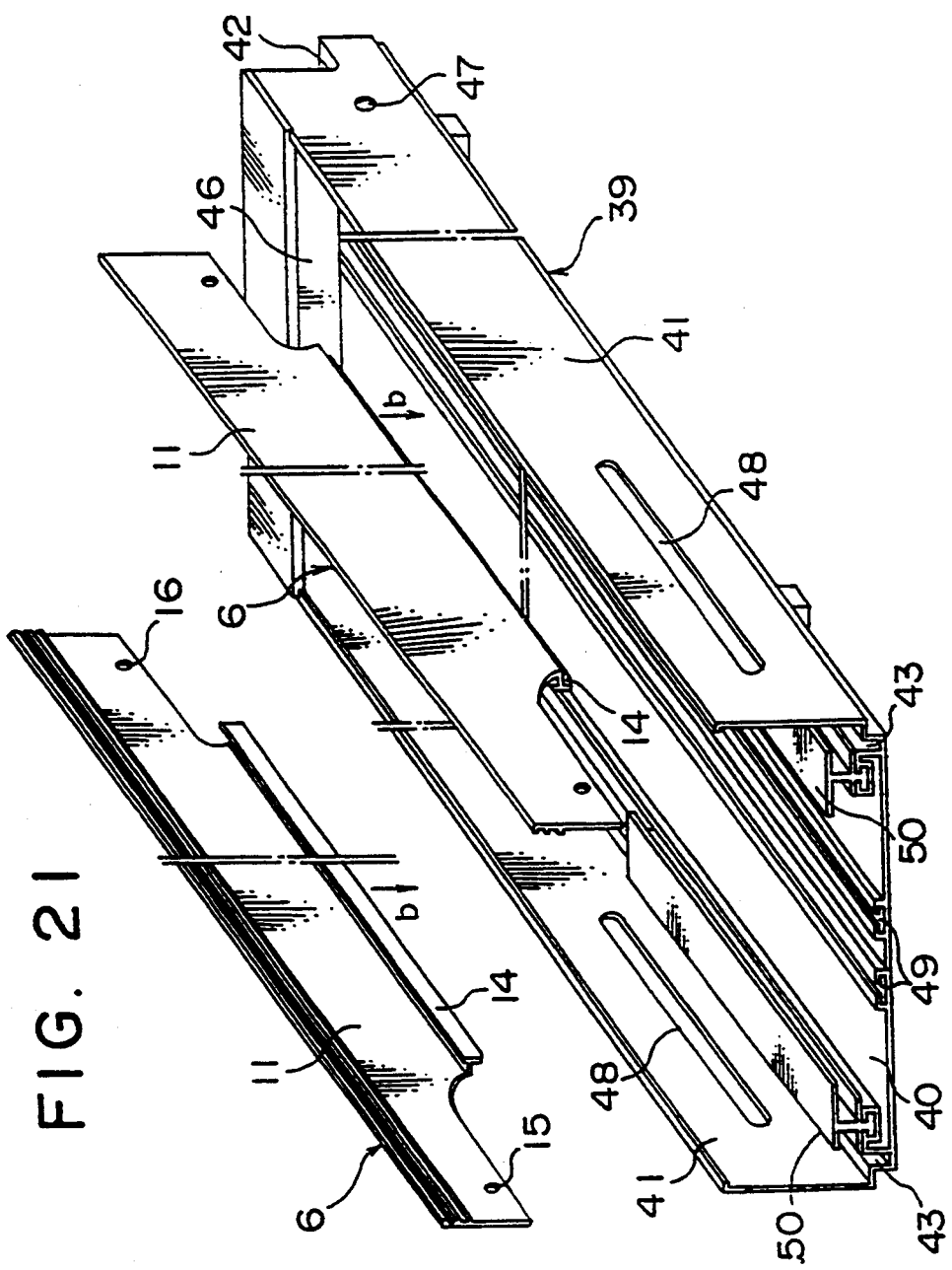
FIG. 21 is a perspective view showing a first step for assembling the light collecting member.
Figure 22:
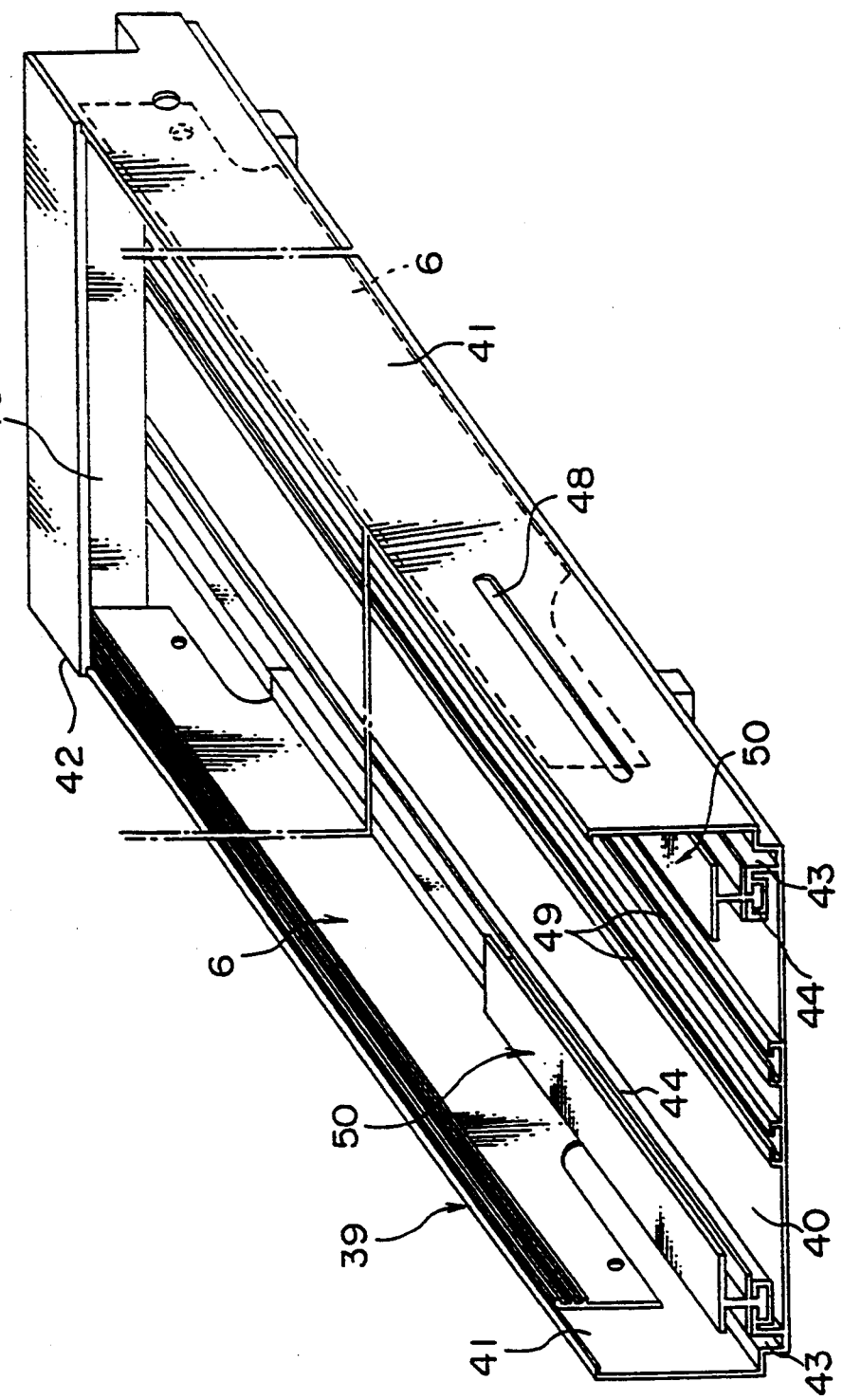
FIG. 22 is a perspective view showing a second step for assembling the light collecting member.

As shown in FIG. 21, the pair of (left and right) vertical members 6 are lowered along arrow b. The vertical support leg 14 is inserted into the vertical member support groove 43. As shown in FIG. 22, the ridge side edge of the vertical member 6 is contacted with the vertical member fixing wall 46 of the rear wall 42. Thus, the light collecting member 3 is assembled.

Figure 23:
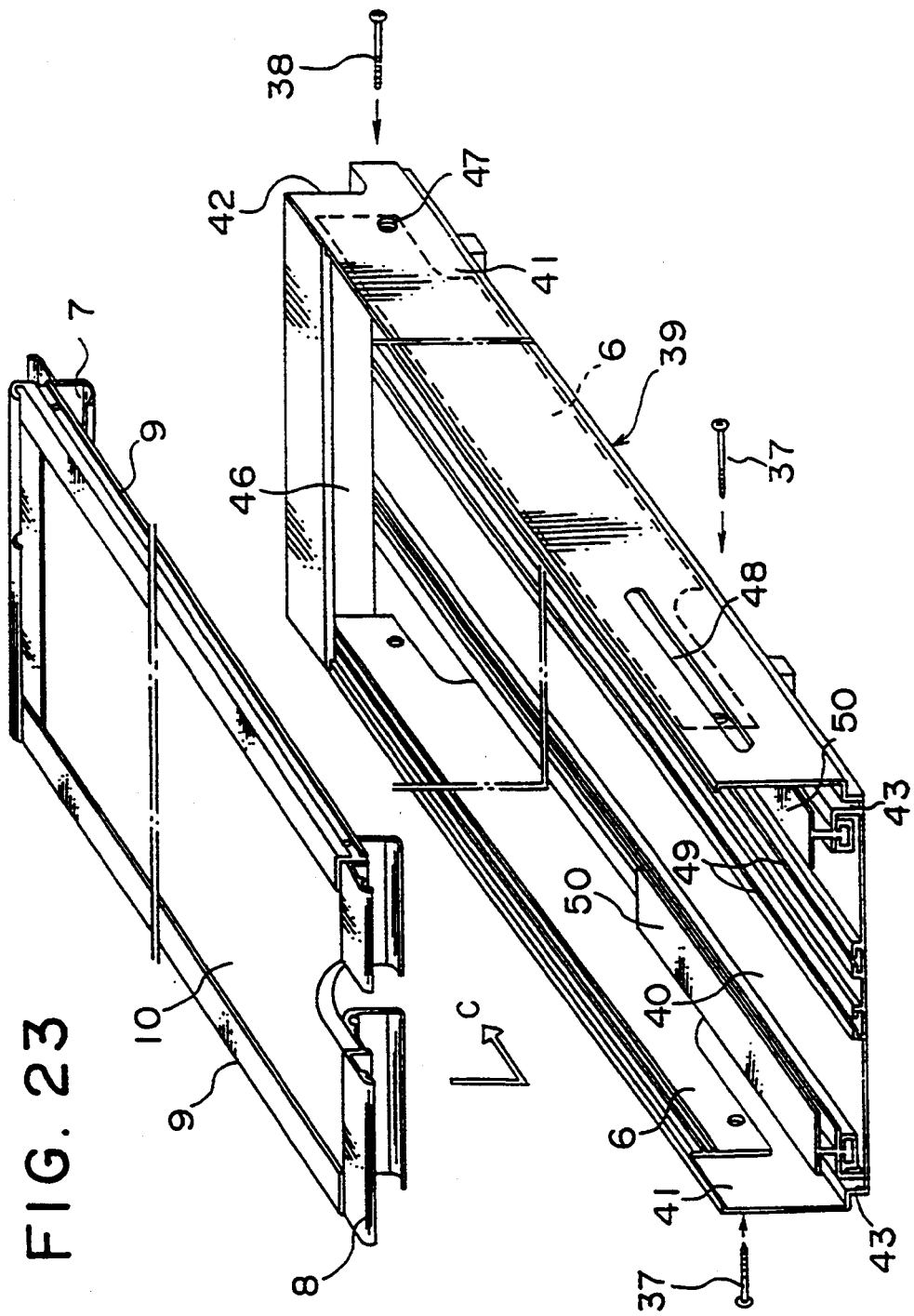
FIG. 23 is a perspective view showing a third step for assembling the light collecting member.
Figure 24:
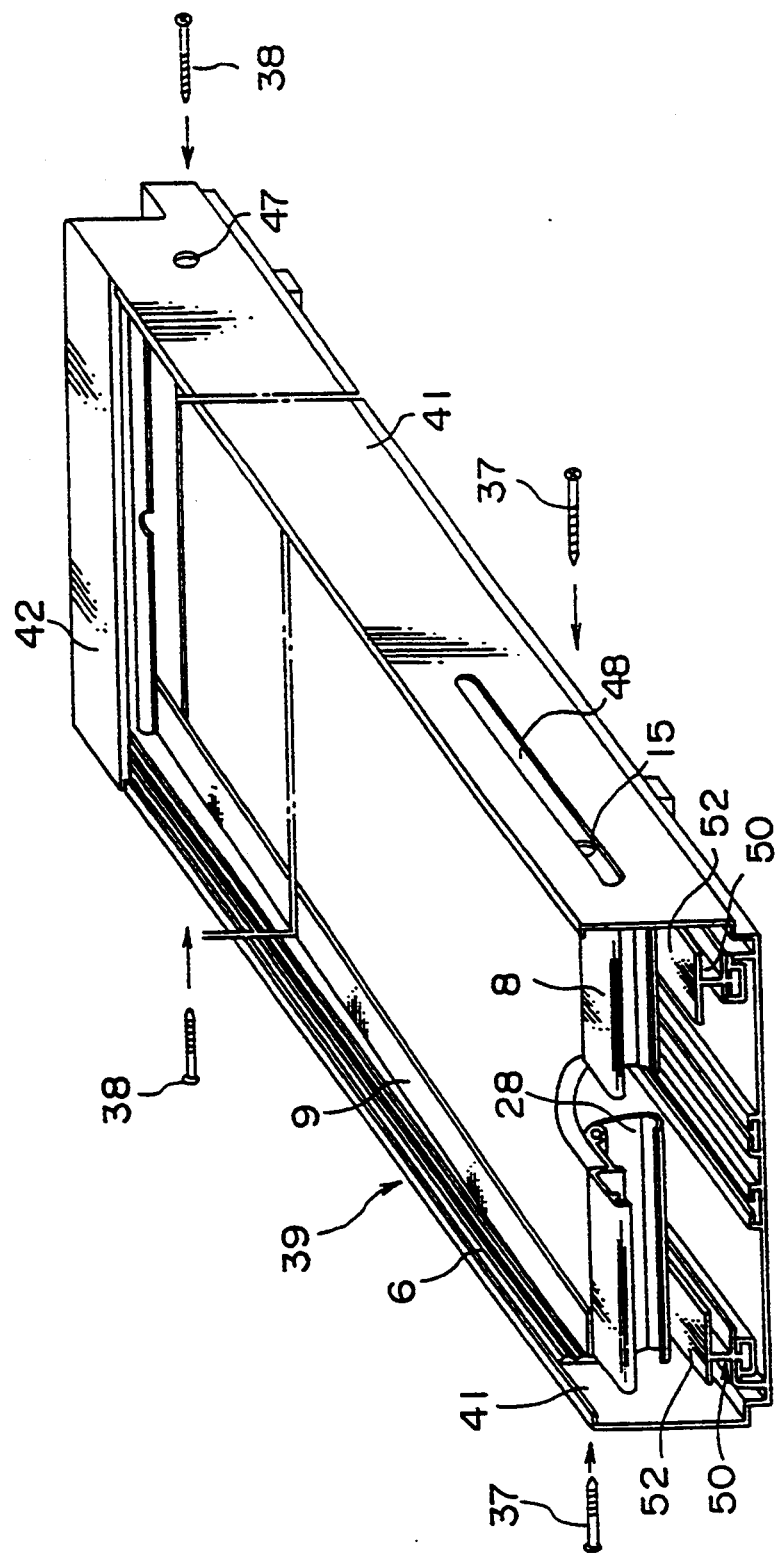
FIG. 24 is a perspective view showing a fourth step for assembling the light collecting member.
Figure 27:
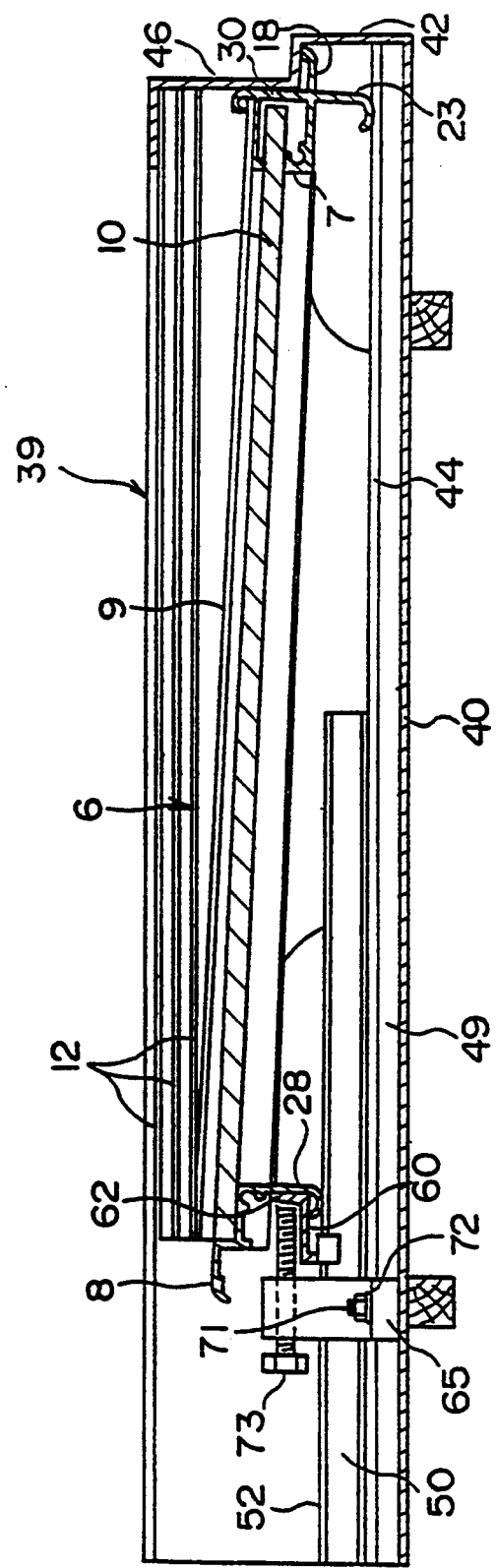
FIG. 27 is a sectional view showing the sixth step for assembling the light collecting member.

Next, as shown in FIG. 23, the light collecting member 10 is assembled to the inner periphery of a frame where the lower horizontal member 8, the upper horizontal member 7, and the transparent plate support members 9 have been formed in a quadrilateral shape. The frame is inserted into an opening of the other end in the longitudinal direction of the light collecting member assembling jig 39 along arrow c. As shown in FIG. 24, the frame is fitted to the inner surface of the vertical member 6. As shown in FIG. 27, the fitting engagement piece 23 of the upper horizontal member 7 is placed on the upper surface of the upper horizontal member alignment protrusion 44. The curved water proof aqueduct 28 of the lower horizontal member 8 is placed on the upper surface of the lower horizontal member support wing piece 52 of the lower horizontal member alignment member 50. The upper surface of the eaves side end of the transparent plate support member 9 is contacted to the lower surface of the lowest water proof protrusion 12 of the vertical member 6.

Thus, the heights measured from the eaves side end and the ridge side end of the transparent plate support member 9 to the vertical member 6 are determined regardless of the length of the light collecting member 3. As a result, a standard light collecting member 3 can be placed in the frame by changing the slope of the transparent plate 10.

Figure 25:
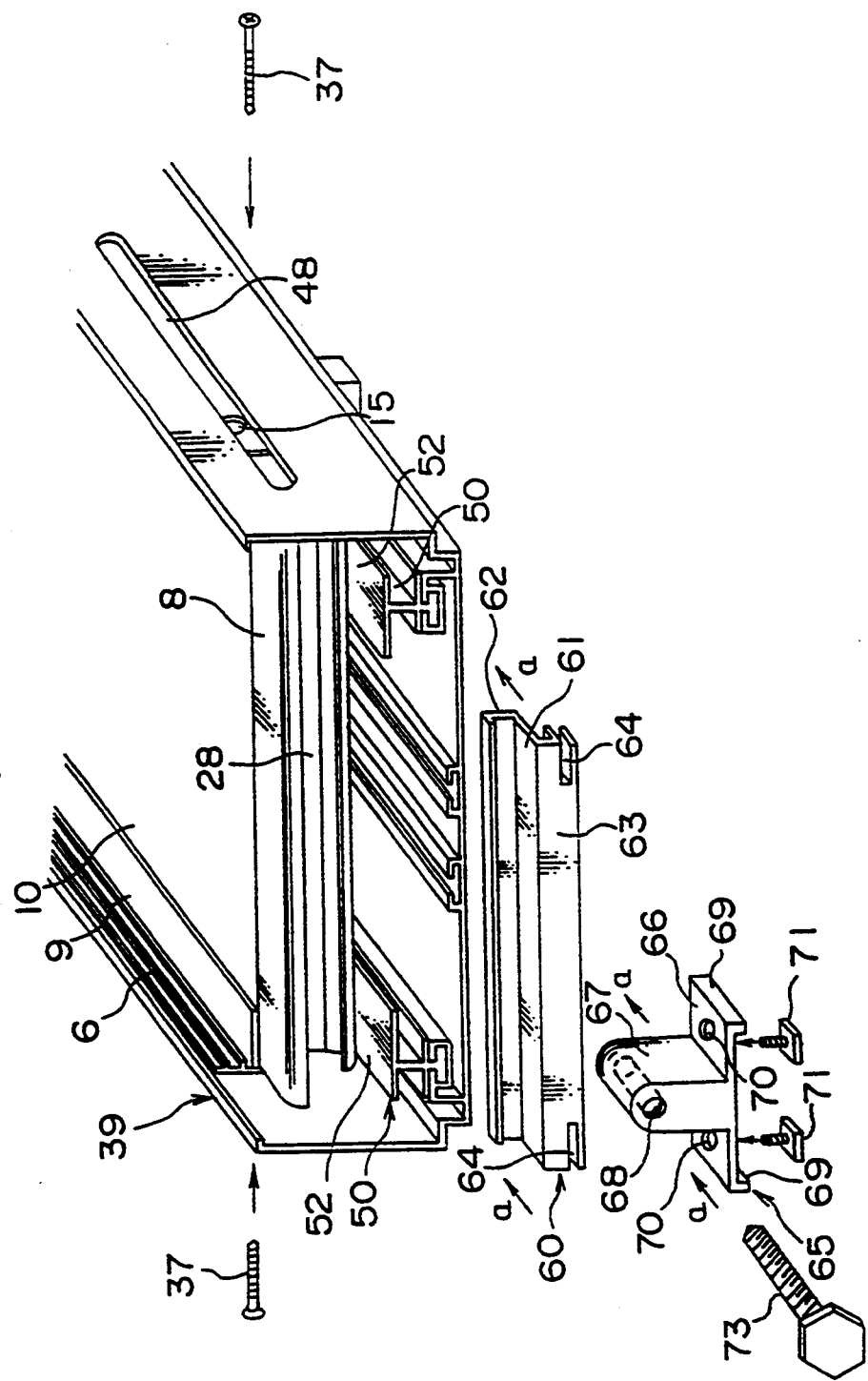
FIG. 25 is a perspective view showing a fifth step for assembling the light collecting member.

In FIG. 25, a light collecting member contact member 60 comprises a horizontal surface 61, a reverse L-shaped pressure wall 62, a suspending piece 63, and engagement grooves 64. The reverse L-shaped pressure wall 62 is in contact with the curved water proof aqueduct 28 of the lower horizontal member 8 at one end in the lateral direction of the horizontal surface 61 which is slightly shorter than the lower horizontal member 8. The suspending piece 63 downwardly extends at the other end in the lateral direction of the horizontal surface 61. At each of the ends in the longitudinal direction of the suspending piece 63, an engagement groove 64 which engages with the lower horizontal member support wing pieces 52 of the lower horizontal member alignment members 50 is defined. A pressure member 65 which pressures the light collecting member contact member 60 comprises a sliding piece 66, bolt holes 70, a protrusion 67, a screw hole 68, and a sliding wall 69. The sliding piece 66 is placed on the upper surface of the pressure member guide groove 49. At each of the end portions of the sliding piece 66, a bolt hole 70 is defined. At a center portion on the upper surface of the sliding piece 66, the protrusion 67 is formed. At an upper portion of the protrusion portion 67, the screw hole 68 is defined along the pressure member guide groove 49. On the lower surfaces at each of the lateral ends of the sliding piece 66, the sliding wall 69 is formed.

Figure 26:
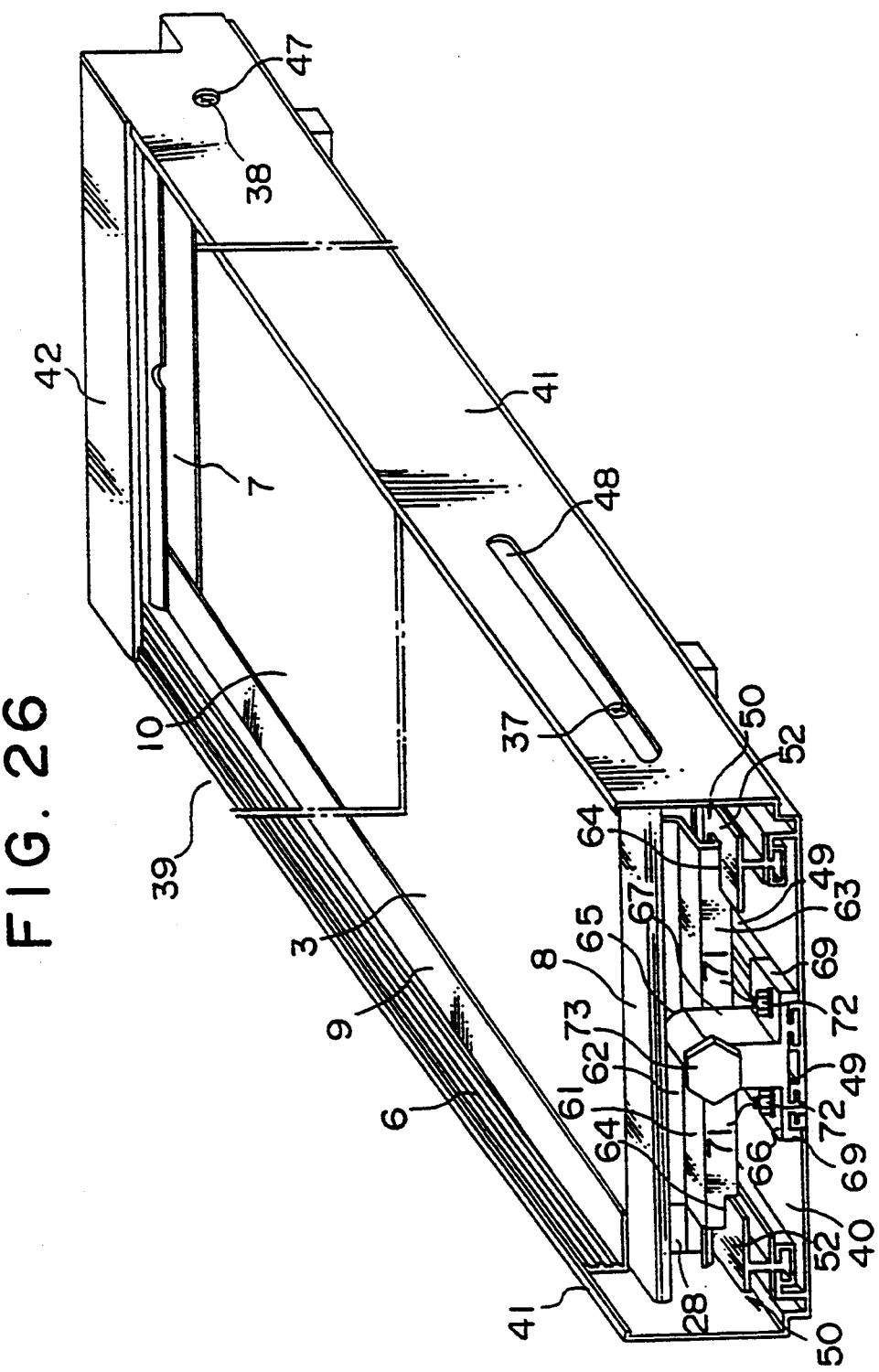
FIG. 26 is a perspective view showing a sixth step for assembling the light collecting member.

As shown in FIGS. 26 and 27, the light collecting member contact member 60 is inserted into one end in the longitudinal direction of the light collecting member assembling jig 39 so that the light collecting member contact member 60 intersects with the pressure member guide groove 49. The engagement groove 64 is fitted to the lower horizontal member support wing piece 52 of the lower horizontal member alignment member 50. The light collecting member contact member 60 is slid and pushed in the direction of allow a until the pressure wall 62 comes in contact with the curved water proof aqueduct 28 of the pressure wall 62, the upright wall 30 of the upper horizontal member 7 comes in contact with the vertical member fixing wall 46, and the ridge side end of the horizontal piece 18 comes in contact with a lower recess portion of the vertical fixing wall 46.

Next, bolts 71 are upwardly inserted into the bolt holes 70 of the pressure member 65. A head portion of the bolt 71 is fitted to the pressure member guide groove 49. The sliding piece 66 is placed on the upper surface of the pressure member guide groove 49. The sliding wall 69 is contacted with the outer surface of the pressure member guide groove 49. The sliding wall 69 is slid along the arrow a. When the sliding wall 69 is positioned close to the light collecting member contact member 60, a nut 72 fitted to the bolt 71 is tightened so as to fix the pressure member 65. A support bolt 73 is inserted into the screw hole 68. The forward end of the pressure bolt 73 is pressed to the pressure wall 62 of the light collecting member contact member 60. The screw 37 is inserted into the hollow curved groove 27 of the lower horizontal member through the elongate hole 48 of the light collecting member assembling jig 39 and the mounting hole 15 of the vertical member 6. The screw 38 is inserted into the hollow curved groove 36 of the upper horizontal member 7 through the round hole 47 of the light collecting member assembling jig 39 and the mounting hole 16 of the vertical member 6. Thus, the light collecting member 3 is assembled. Thereafter, the pressure member 65 and the light collecting member contact member 60 are removed. Next, the light collecting member 3 is extracted from the light collecting member assembling jig 39.

Figure 28:
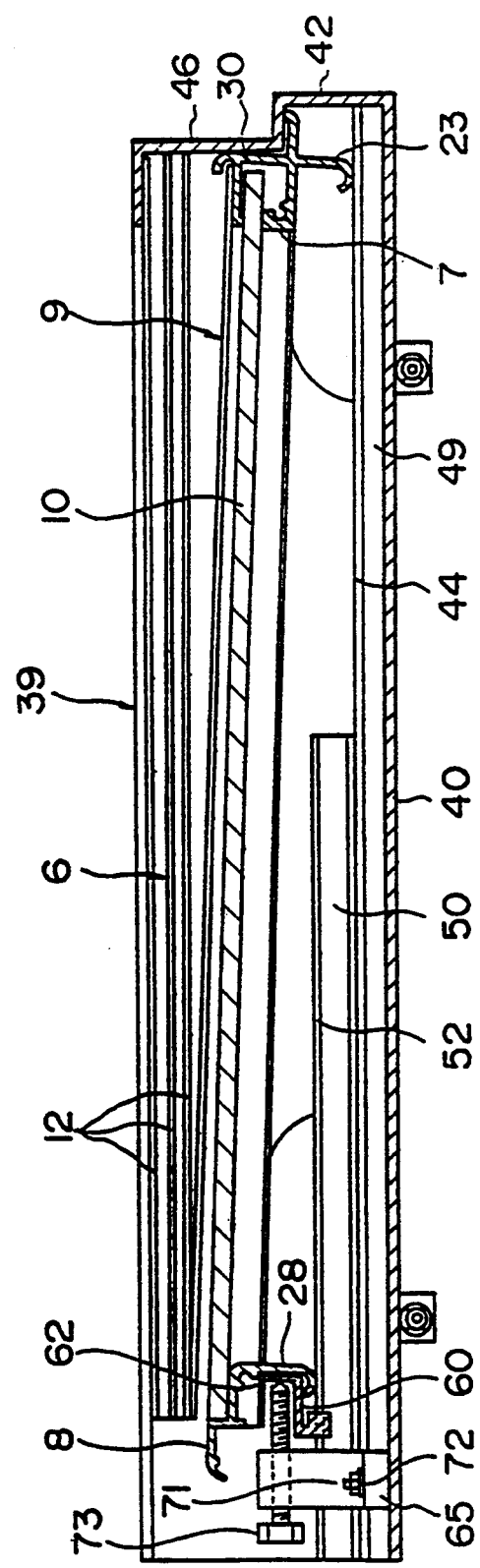
FIG. 28 is a sectional view showing a sixth step for assembling a long type light collecting member.
Figure 29:
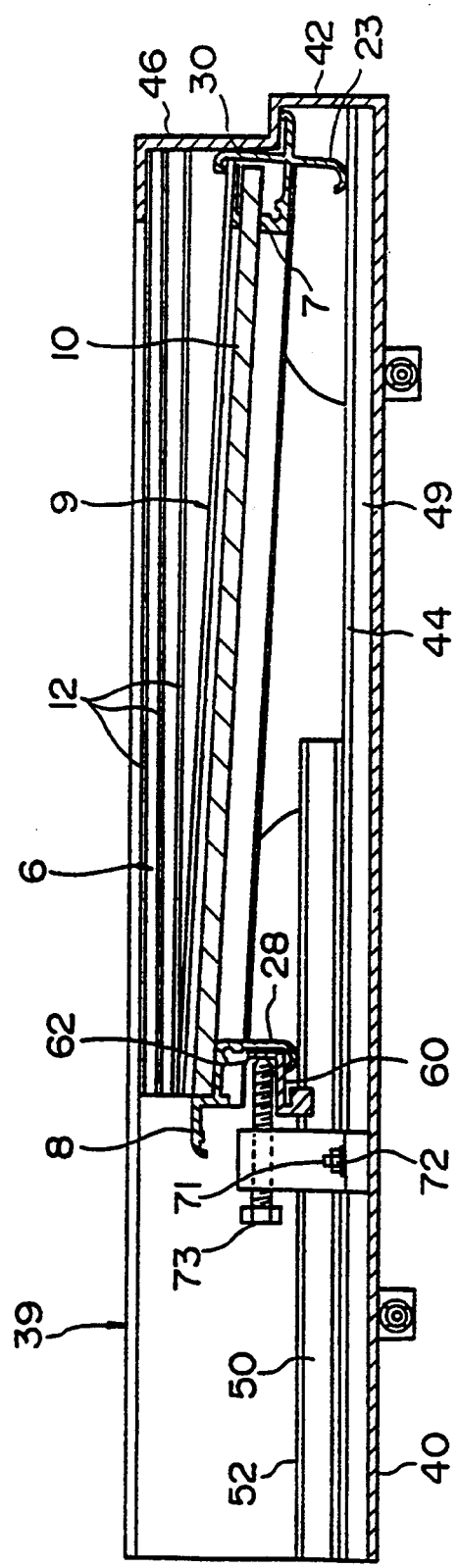
FIG. 29 is a sectional view showing a sixth step for assembling a short type light collecting member.

When the light collecting member 3 is assembled with the light collecting member assembling jig 39, the heights measured from the eaves side end and the ridge side end of the transparent plate support member 9 to the vertical member 6 are automatically obtained regardless of the length of the light collecting member 3. As shown in FIG. 28, when the light collecting member is long, the angle between the vertical member 6 and the transparent plate support member 9 becomes large. As shown in FIG. 29, when the light collecting member 3 is dull, the angle between the vertical member 6 and the transparent plate support member 9 becomes sharp. Thus, the upper horizontal member 7, the lower horizontal member 8, and the transparent plate support member 9 can be easily aligned to the vertical members 6. As a result, these members can be easily assembled even if the slope angle of the transparent plate 10 changes corresponding to the length of the light collecting member 3.

Figure 30:
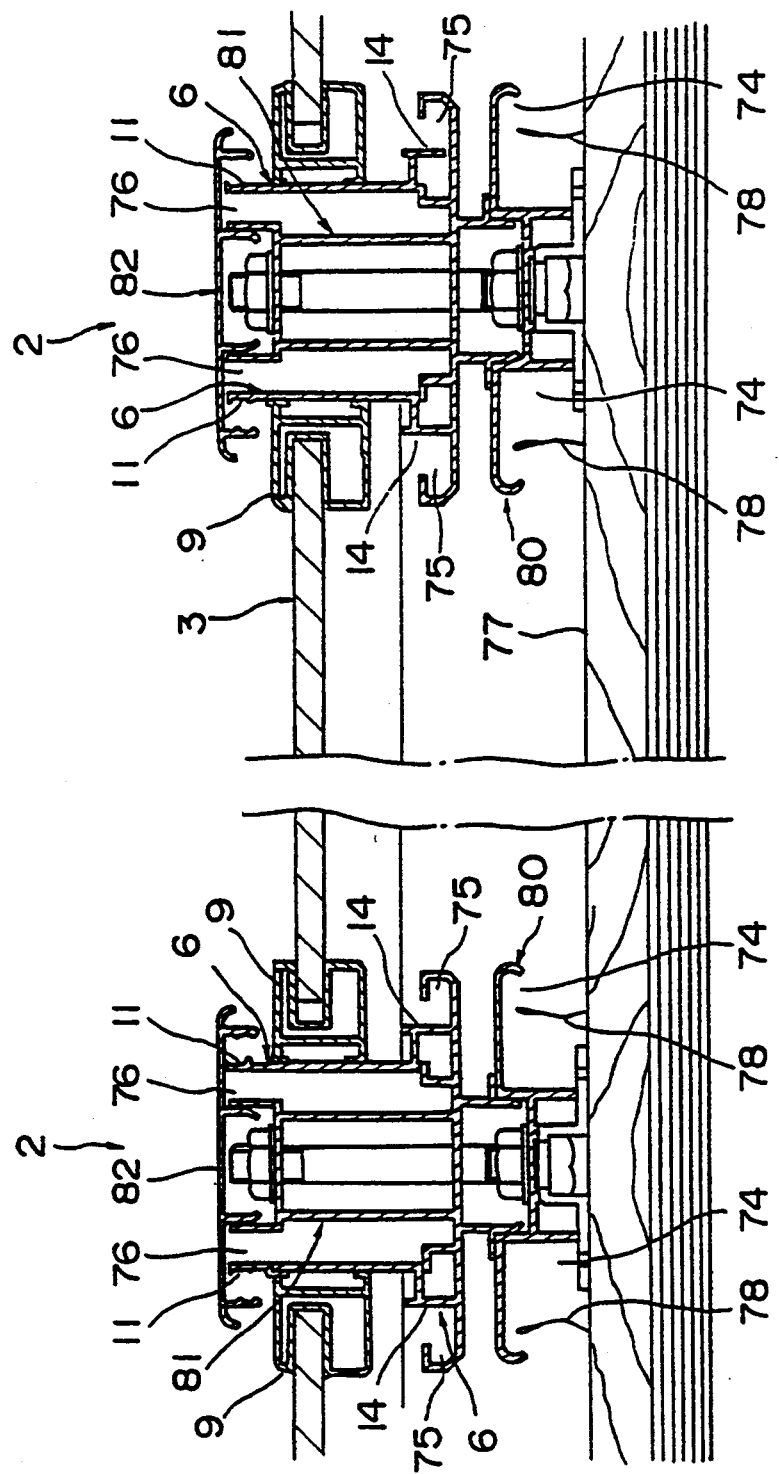
FIG. 30 is a sectional view showing principal portions of a roof apparatus which has been adjusted to standard width.

As shown in FIG. 30, the intermediate connecting member 2 comprises a lower connecting member 80, an upper connecting member 81, and a connecting member cover 82. The upper connecting member 81 is placed above the lower connecting member 80. The connecting member cover 82 is placed above the upper connecting member 81. At each of the lateral ends of the lower connecting member 80, a lower width adjusting space 74 is longitudinally defined. The lower width adjusting space 74 downwardly opens. At each of the lateral ends of the upper connecting member 81, an engagement groove 75 laterally protrudes. The engagement groove 75 upwardly opens. An upper width adjustment space 76 which downwardly opens is defined between the lower surface of each of the lateral ends of the connecting member cover 82 and the upper connecting member 81.

Figure 33:
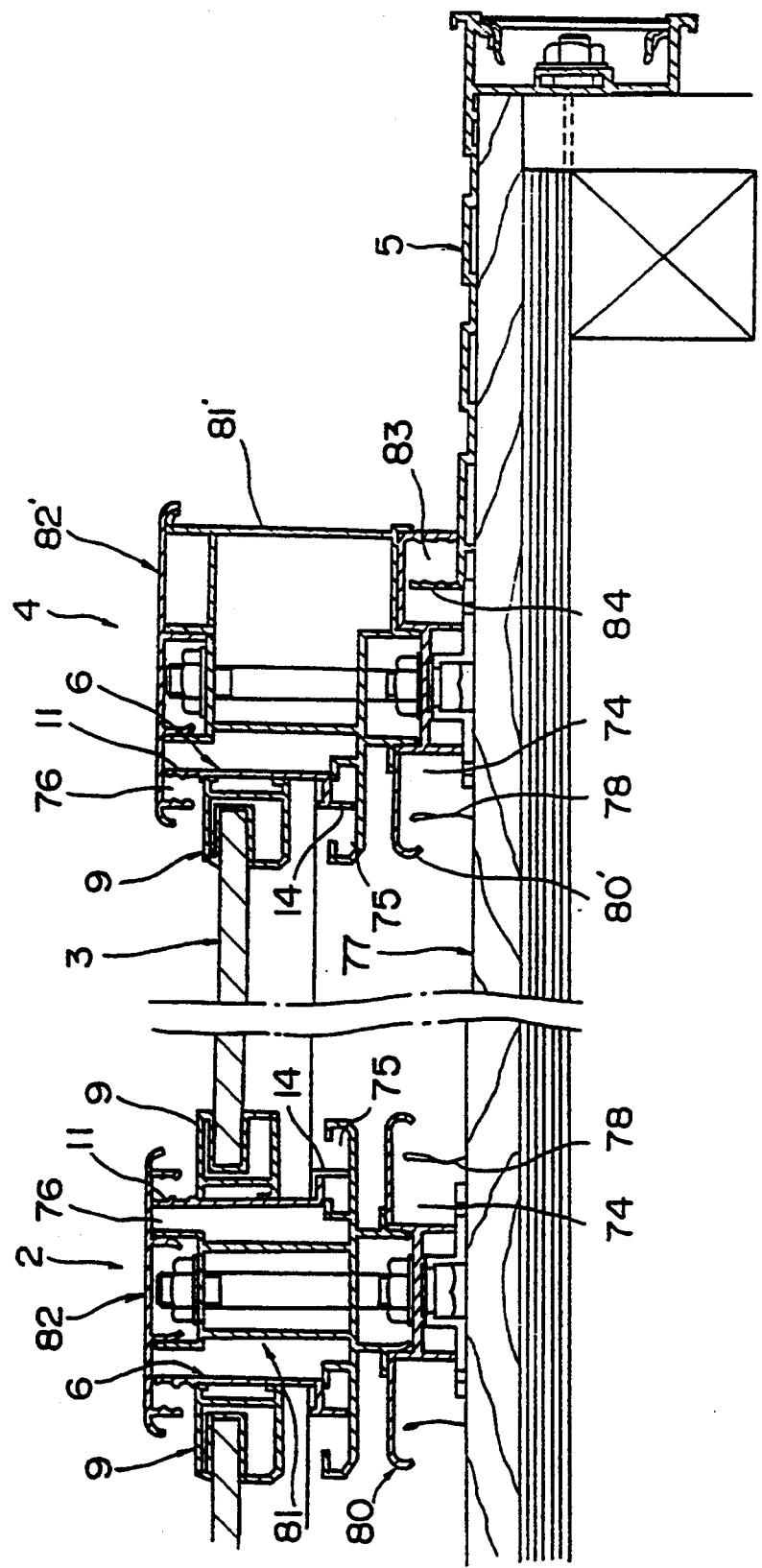
FIG. 33 is a sectional view showing a gable of the roof apparatus.

As shown in FIG. 33, the lateral connecting member 4 comprises a lateral lower connecting member 80', a lateral upper connecting member 81', and a lateral connecting member cover 82'. At an outer portion of the lateral connecting member 4, the light collecting member 3 is not disposed. Thus, the engagement groove 75 and the upper width adjusting space 76 are not defined. Instead of the lower width adjusting space 74, a wide lateral front base member holding space 83 is defined. Since the construction of the inner portions of the lateral lower connecting member 80', the lateral upper connecting member 81', and the lateral connecting member cover-82' is nearly the same as that of the intermediate connecting member 2, the similar portions are denoted by similar reference numerals and the description thereof is omitted.

The light collecting member 3 is connected in the lateral direction of a roof in the following manner. First, the connecting members 2 and 4 are disposed in the slope direction of the roof backing. On the upper surface of the roof backing, a metal water proof plate 77 is placed. Upright water proof walls 78 formed on both the lateral edges of the water proof plate 77 are placed in the lower width adjusting spaces 74 of the connecting members 2 and 4.

Next, the light collecting member 3 is spaced apart from the water proof plate 77. The lower end of the vertical support leg 14 of the vertical member 6 is inserted into the engagement groove 75 of each of the connecting members 2 and 4. The vertical wall 11 of the vertical member 6 is inserted into the upper width adjusting space 76 of each of the connecting member 2 and 4. Thus, a space for preventing water from entering due to capillary action is defined between the lower surface of the connecting member cover 82 and the upper end of the vertical wall 11.

Figure 31:
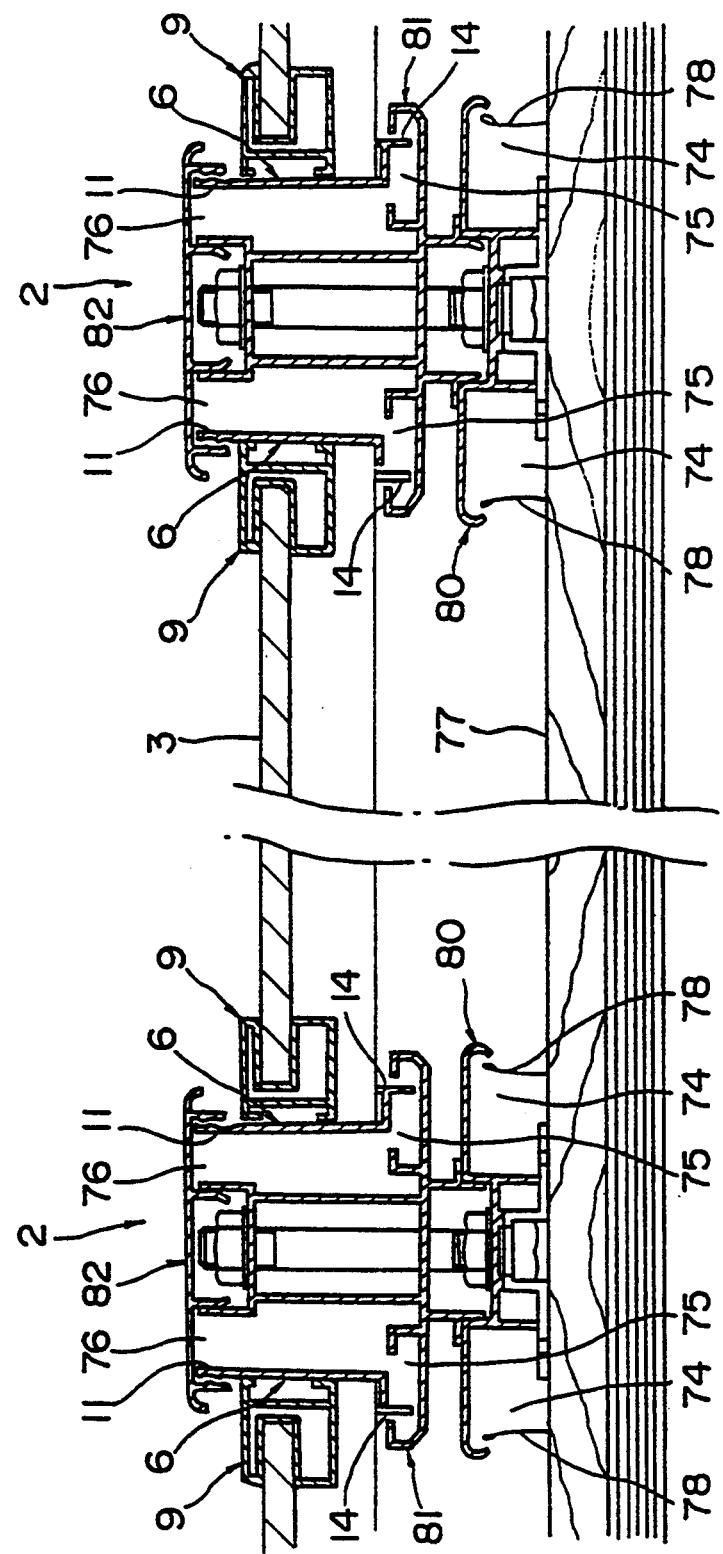
FIG. 31 is a sectional view showing principal portions of the roof apparatus whose width has been adjusted outwardly in the lateral direction of the roof backing.
Figure 32:
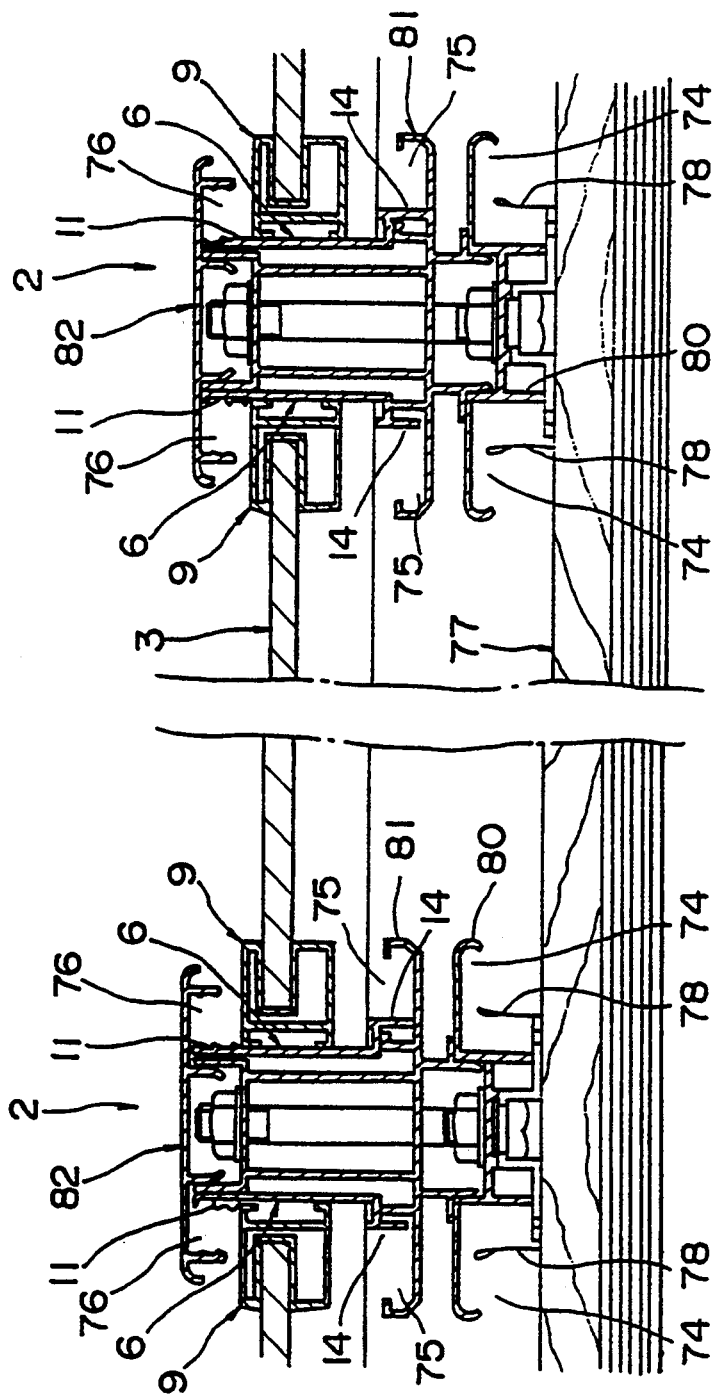
FIG. 32 is a sectional view showing the principal portions of the roof apparatus whose width has been adjusted inwardly in the lateral direction of the roof backing.

When the total of the widths of the light collecting member 3 and the connecting members 2 and 4 correctly matches the width of the roof backing, the upright water proof wall 78 of the water proof plate 77 and the vertical wall 11 of the vertical member 6 are placed at the center portion of the lower width adjusting space 74 and at the center portion of the upper width adjusting space 76, respectively (see FIG. 30). However, as shown in FIG. 31, when the width of roof backing is large, the upright water proof wall 78 and the vertical wall 11 are placed at an outer edge position of the lower width adjusting space 74 and at an outer edge position of the upper width adjusting space 76, respectively. As shown in FIG. 32, when the width of roof backing is small, the upright water proof wall 78 and the vertical wall 11 are placed at center positions of the connecting members 2 and 4, respectively. Thus, the difference between the distance of roof backing and the distance of the connecting members 2 and 4 can be adjusted. Even if the light collecting member 3 and the water proof plate 77 shrink or expand due to heat changes, the difference of these widths can be absorbed.

As shown in FIG. 33, a water reflecting upright wall 84 disposed at the inner edge of the lateral front base member 5 is placed in a lateral front base member holding space 83 of the lateral connecting member 4. The position of the water reflecting upright wall 84 is moved in the lateral direction. Thus, as with the light collecting member 3 and the water proof plate 77, since the width of the water reflecting upright wall 84 can be adjusted, the affection of the shrinkage and expansion thereof by heat can be absorbed.

Figure 34:
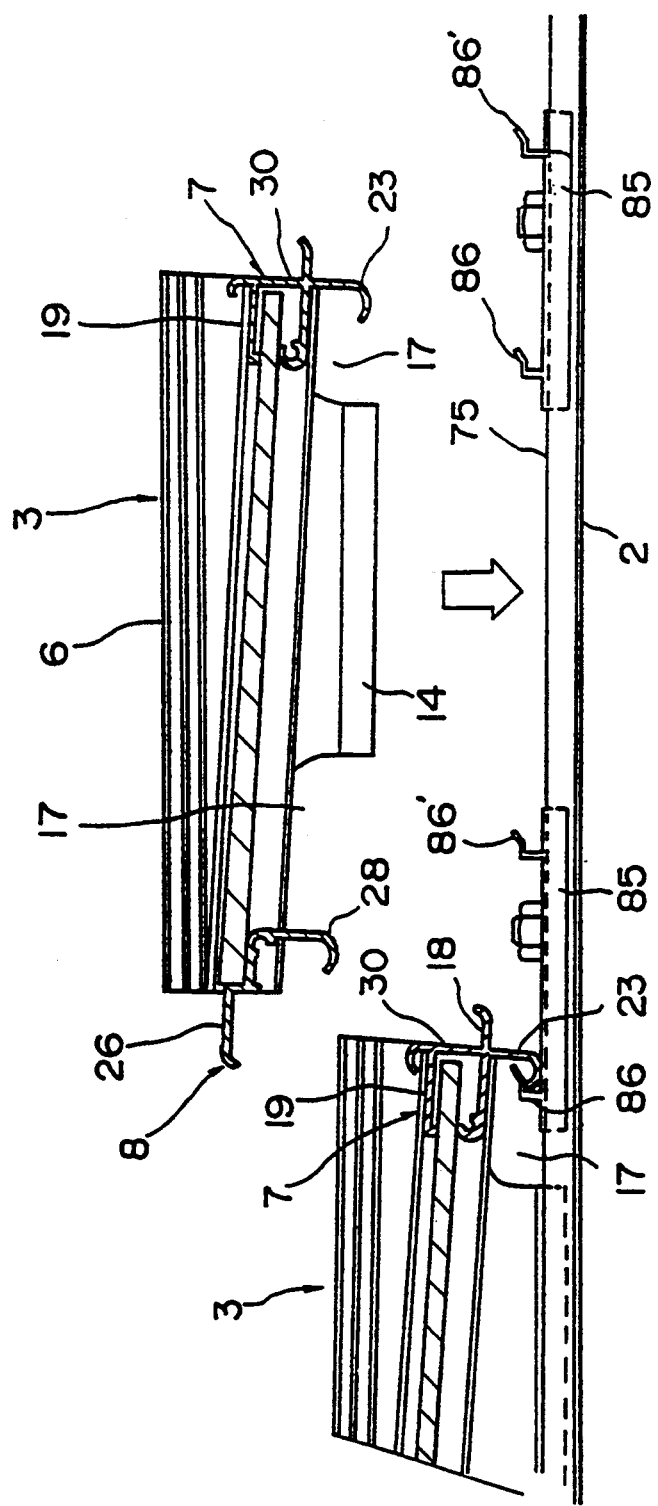
FIG. 34 is a sectional view showing a first step for connecting the light collecting member in the slope direction of the roof;.
Figure 35:
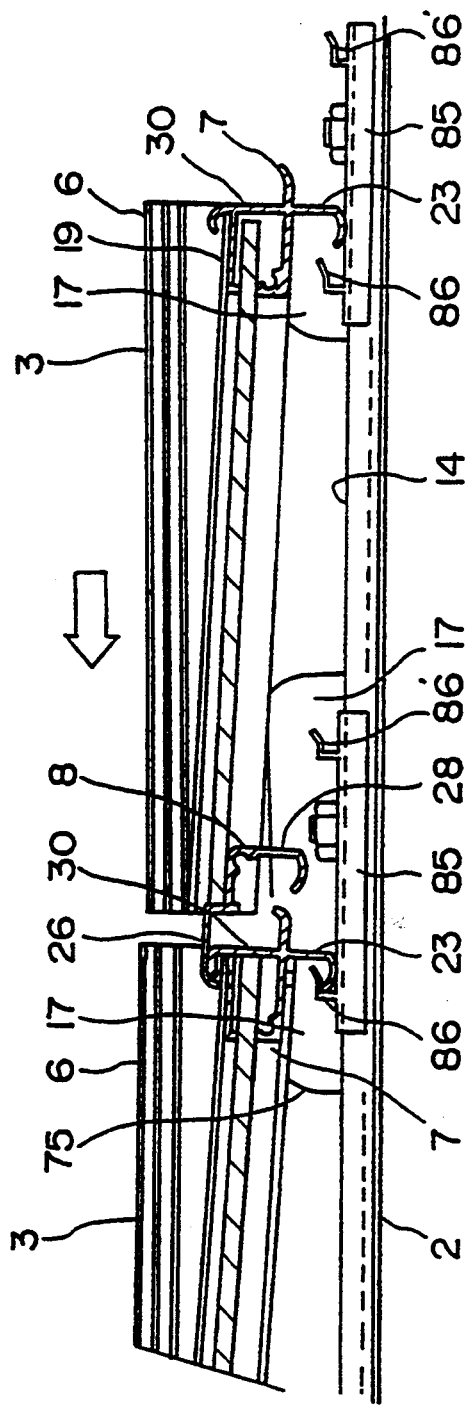
FIG. 35 is a sectional view showing a second step for connecting the light collecting member in the slope direction of the roof.
Figure 36:
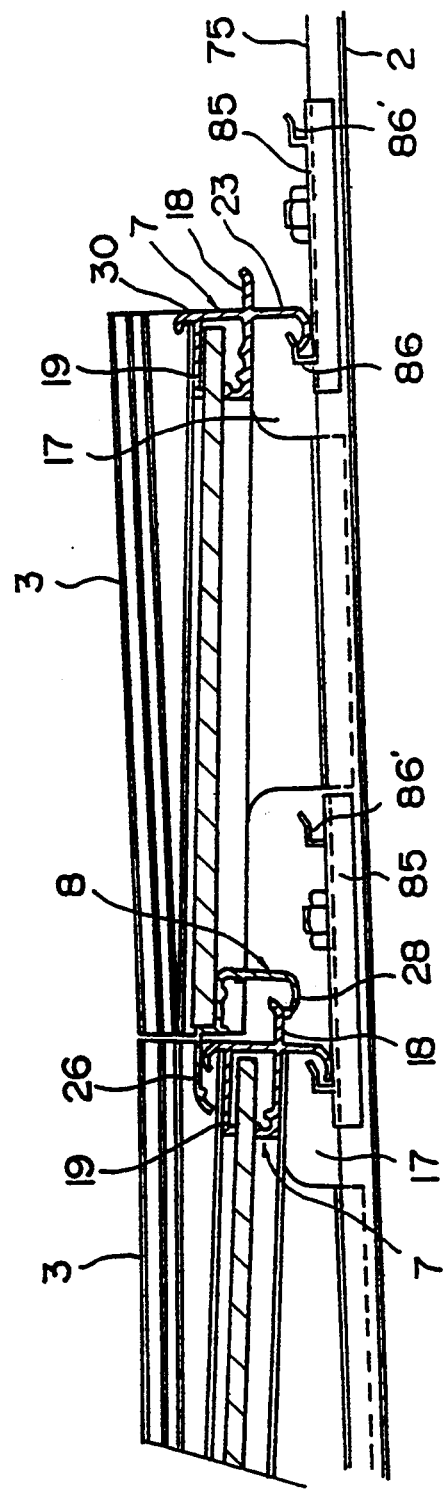
FIG. 36 is a sectional view showing a third step for connecting the light collecting member in the slope direction of the roof.

As shown in FIG. 34, the light collecting member 3 is connected in the slope direction of the roof. First, light collecting member fittings 85 are mounted in the engagement groove 75 of each of the connecting members 2 and 4 at predetermined intervals. As shown in FIG. 35, the lower end of the vertical support leg 14 of the light collecting member 3 is downwardly inserted into the engagement groove 75 disposed between the light collecting member fittings 85. The lower end of the fitting engagement piece 23 of the upper horizontal member 7 is contacted with the upper surface of the light collecting member fitting 85. The cover piece 26 of the lower horizontal member 8 is placed on the upright wall 30 of the upper horizontal member 7 of the light collecting member 3 mounted on the eaves side. Next, the light collecting member 3 is slid in the eaves direction. As shown in FIG. 36, the fitting engagement piece 23 of the upper horizontal member 7 is engaged with a reverse L-shaped engagement hook 86 formed on the upper surface of the light collecting member fitting 85 so as to fix the upper horizontal member 7. The horizontal upper surface 19 of the upper horizontal member 7 of the light collecting member 3 on the eaves side is covered with the cover piece 26 of the lower horizontal member 8. The curved water proof aqueduct 28 of the lower horizontal member 8 is fitted to the lower surface of the ridge side end of the horizontal surface 18 of the upper horizontal member 7 of the light collecting member 3 on the eaves side.

At this time, the light collecting member fitting 85 is placed in the ventilation notch 17 defined at each of the ridge side end and the eaves side end of the light collecting member 3.

When the light collecting members 3 are connected in the slope direction of the roof, since the connecting end portions of the light collecting members 3 are overlapped, the transparent plates 10 are inclined to the roof. However, since the mounting height of the transparent plate support member 9 to the vertical member 6 is constant, even if the lengths of the light collecting members 3 differ from each other and thereby the slope angles of the transparent plates 10 differ from each other, the vertical members 6 can be mounted in parallel with the roof.

Figure 37:
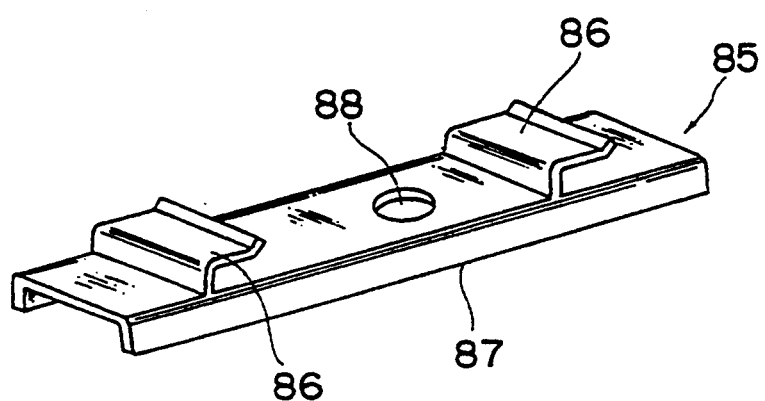
FIG. 37 is a perspective view of a light collecting member fitting.

FIG. 37 shows the light collecting member fitting 85. At a center portion on the top surface of an across sash piece 87 which is disposed across the engagement grooves 75 of the connecting members 2 and 4, a bolt through-hole 88 is defined. At an eaves side portion and an ridge side portion on the upper surface of the across sash piece 87, reverse L-shaped engagement hooks 86 and 86' are disposed. The front ends of the engagement hooks 86 and 86' face on the ridge side.

Figure 38:
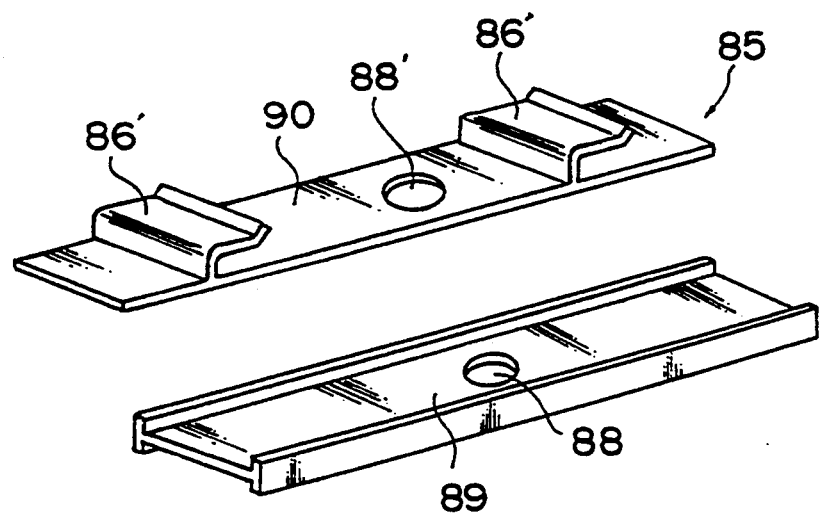
FIG. 38 is a perspective view showing another light collecting member fitting.

FIG. 38 shows another type of light collecting member fitting 85 which comprises a H-shaped lower across piece 89 and an upper holding piece 90. The upper holding piece 90 is placed on the upper surface of the lower across piece 89. At center portions of the lower across piece 89 and the upper holding piece 90, through-holes 88 and 88' are defined. When the upper holding piece 90 is placed on the lower across piece 89, the through-hole 88 matches the through-hole 88'. At an eaves side portion and a ridge side portion on the upper surface of the upper holding piece 90, reverse L-shaped engagement hooks 86 and 86' are disposed, respectively. The front ends of the engagement hooks 86 and 86' face on the ridge side of the roof.

Figure 39:
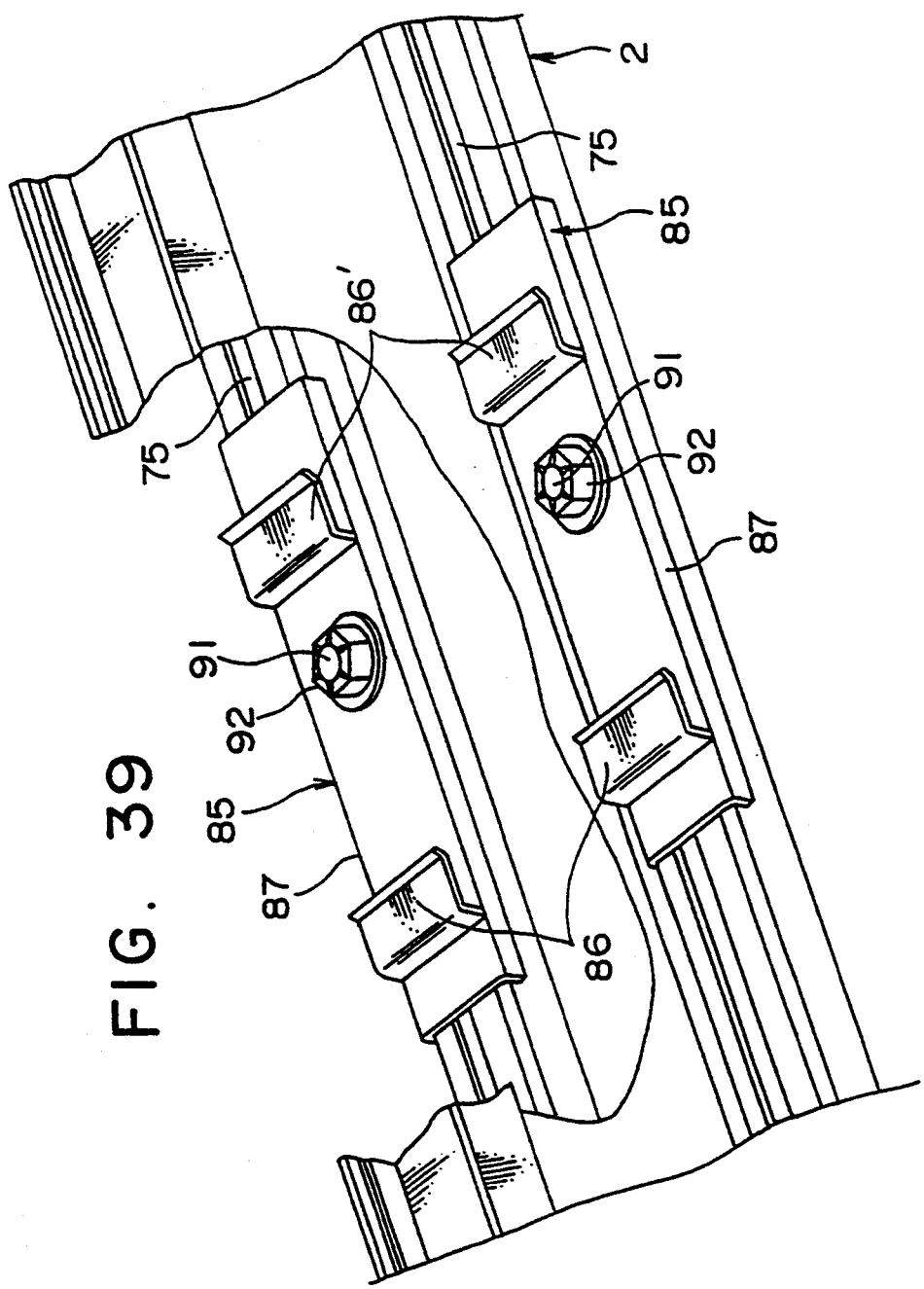
FIG. 39 is a perspective view showing principal portions of a connecting member to which the light collecting member fitting has been mounted.

As shown in FIG. 39, the light collecting member fitting 85 is mounted. In other words, the across sash piece 87 or the lower across piece 89 is placed on the upper surface of the engagement groove 75 of each of the connecting members 2 and 4 so that the front ends of the engagement hooks 86 and 86' face in the ridge direction of the roof. A bolt 91 whose Top portion is inserted into the engagement groove 75 is inserted into the bolt through-holes 88 and 88'. A nut 92 is fitted to the top of the bolt 91.

Figure 40:
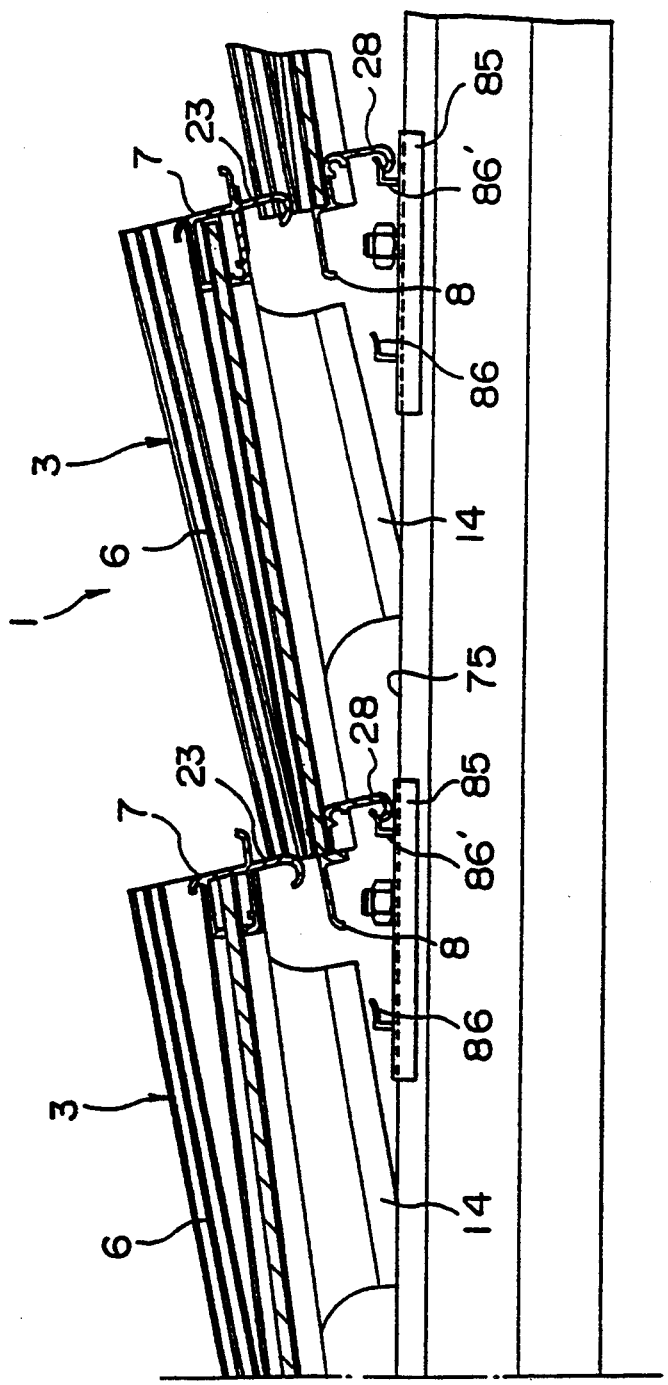
FIG. 40 is a sectional view showing the roof apparatus being repaired or inspected.
Figure 41:
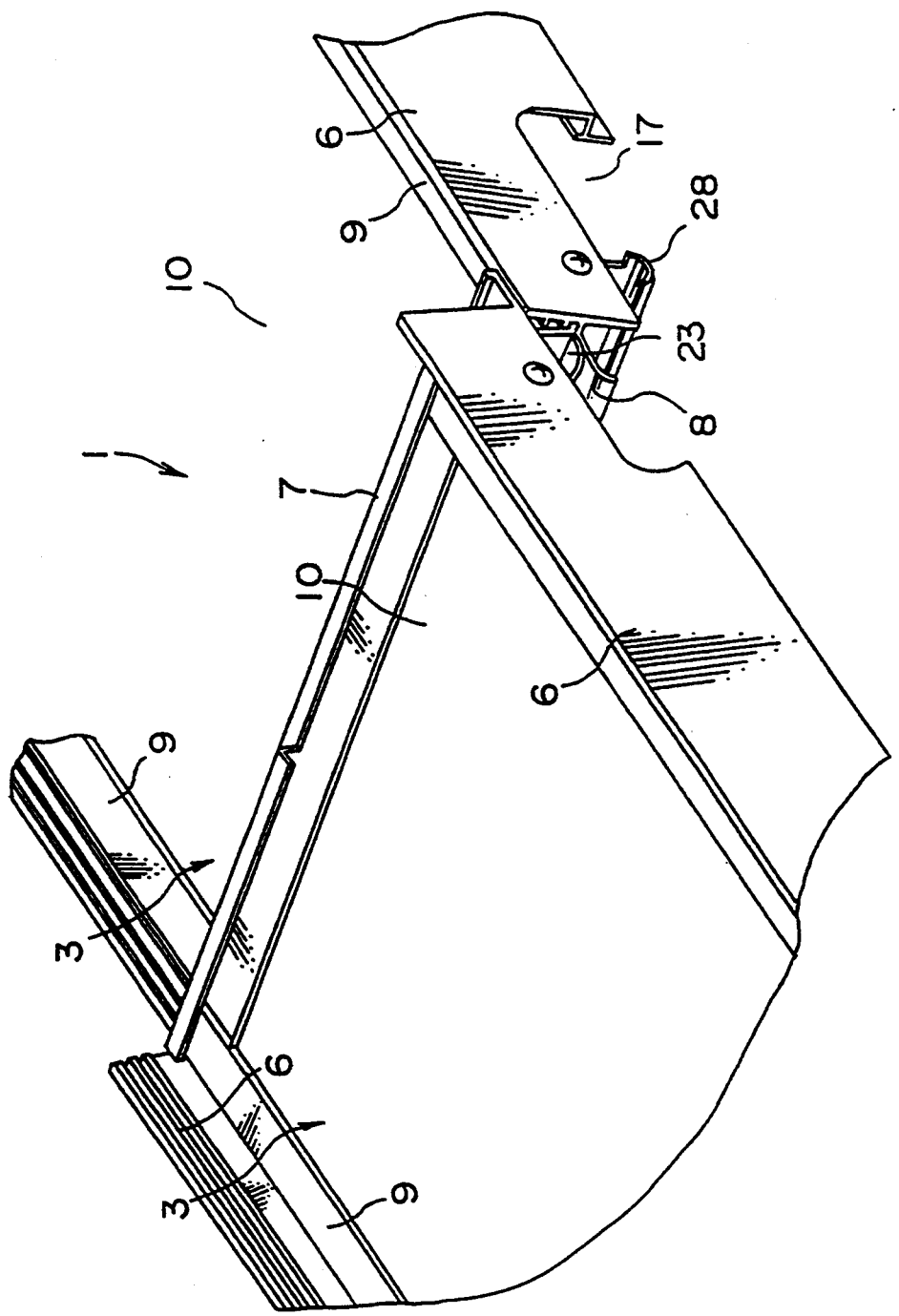
FIG. 41 is a perspective view showing the roof apparatus being repaired or inspected.

When the solar power generating system, which is the roof apparatus 1, is repaired or inspected, as shown in FIGS. 40 and 41, the light collecting members 3 on the ridge side of the roof are extracted successively in the ridge direction. The fitting engagement piece 23 of the upper horizontal member 7 is placed on the upper surface of the eaves side end of the light collecting member 3 on the ridge side of the roof. The curved water proof aqueduct 28 of the lower horizontal member 8 is hooked to the engagement hook 86' on the ridge side of the light collecting member fitting 85 so as to prevent the light collecting member 3 from dropping. The light collecting member 3 is held with an angle so that the ridge side end thereof becomes higher than the other portions thereof.

Thus, when required, the light collecting member 3 can be easily lifted up for inspection or repair. Therefore, regardless of where the light collecting member 3 is installed, it can be safely inspected and/or repaired on the roof not on the ground.

Figure 42:
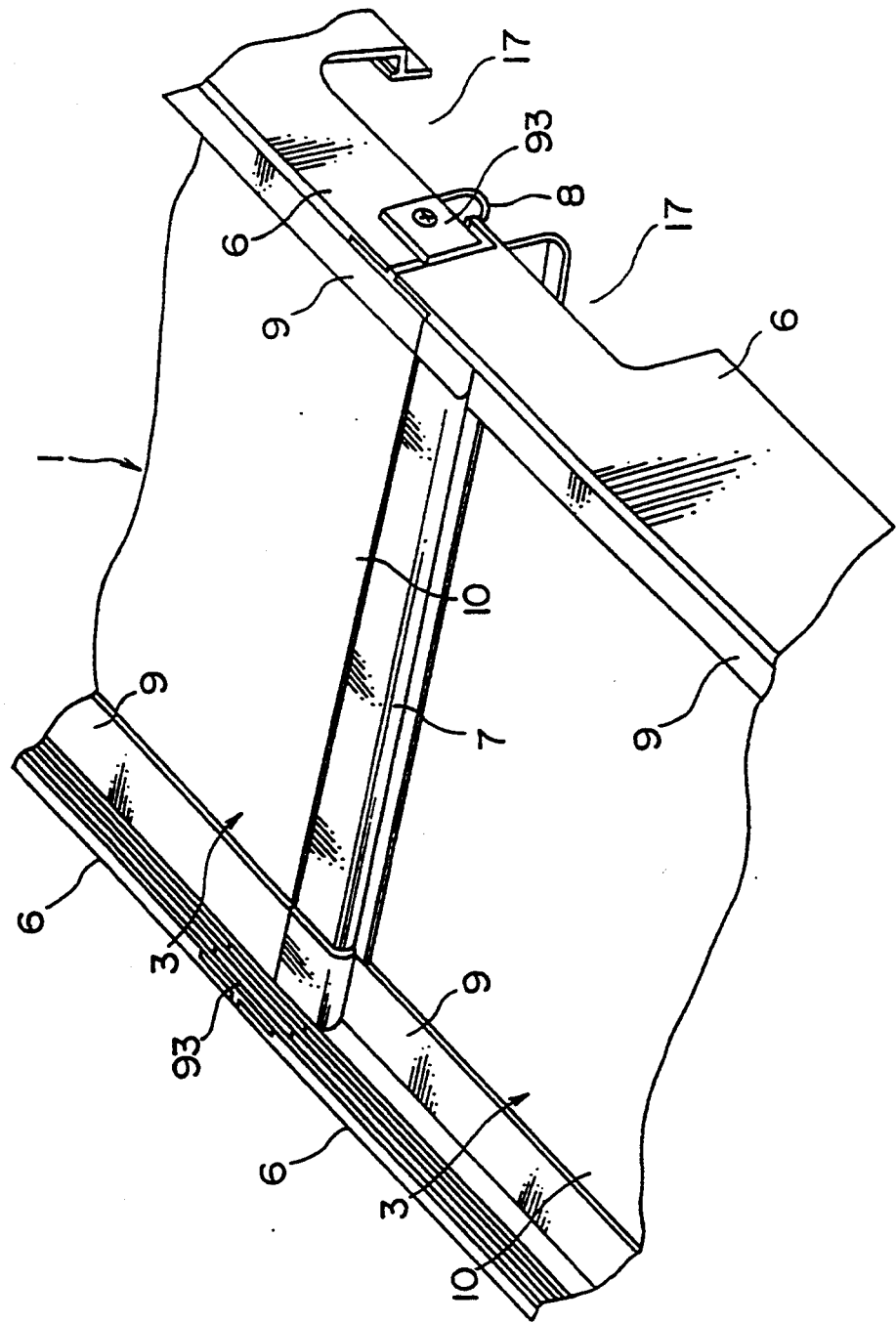
FIG. 42 is a perspective view showing principal portions of a roof apparatus according to a second embodiment of the present invention.
Figure 43:
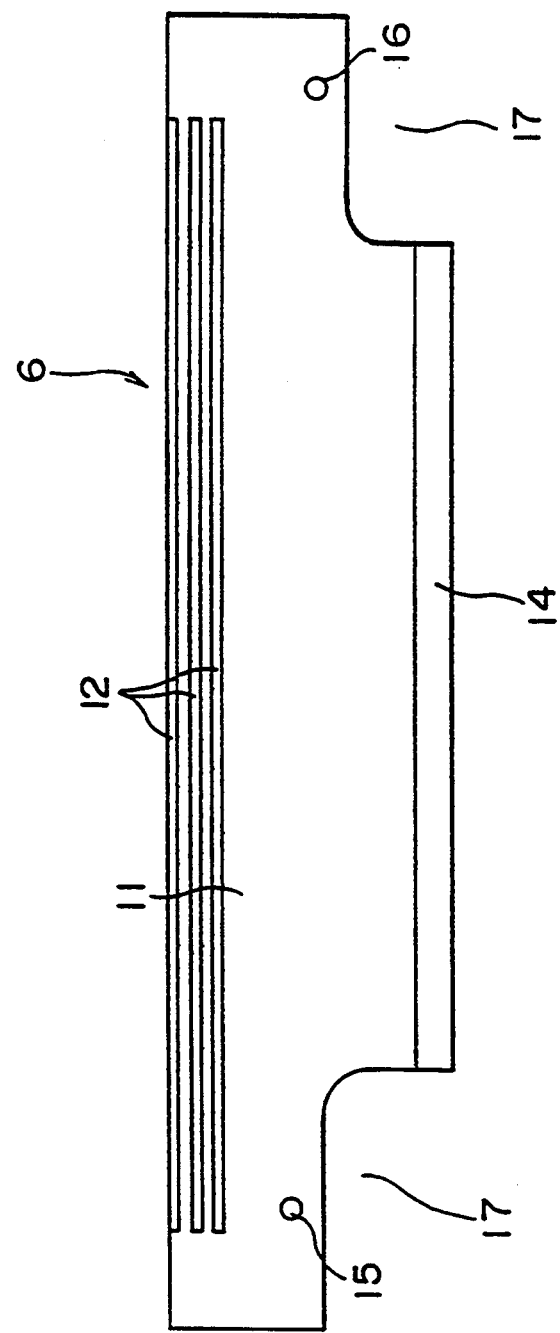
FIG. 43 is a side view showing a vertical member according to the second embodiment.

FIG. 42 shows a roof apparatus 1 according to a second embodiment of the present invention. As shown in FIG. 43, in this roof apparatus 1, water proof protrusions are not formed at the ridge side end and the eaves side end of the vertical member 6 of the light collecting member 3. When the light collecting member 3 is assembled, with the light collecting member assembling jig 93, the vertical member 6 and the lower horizontal member 8 are connected.

Figure 45:
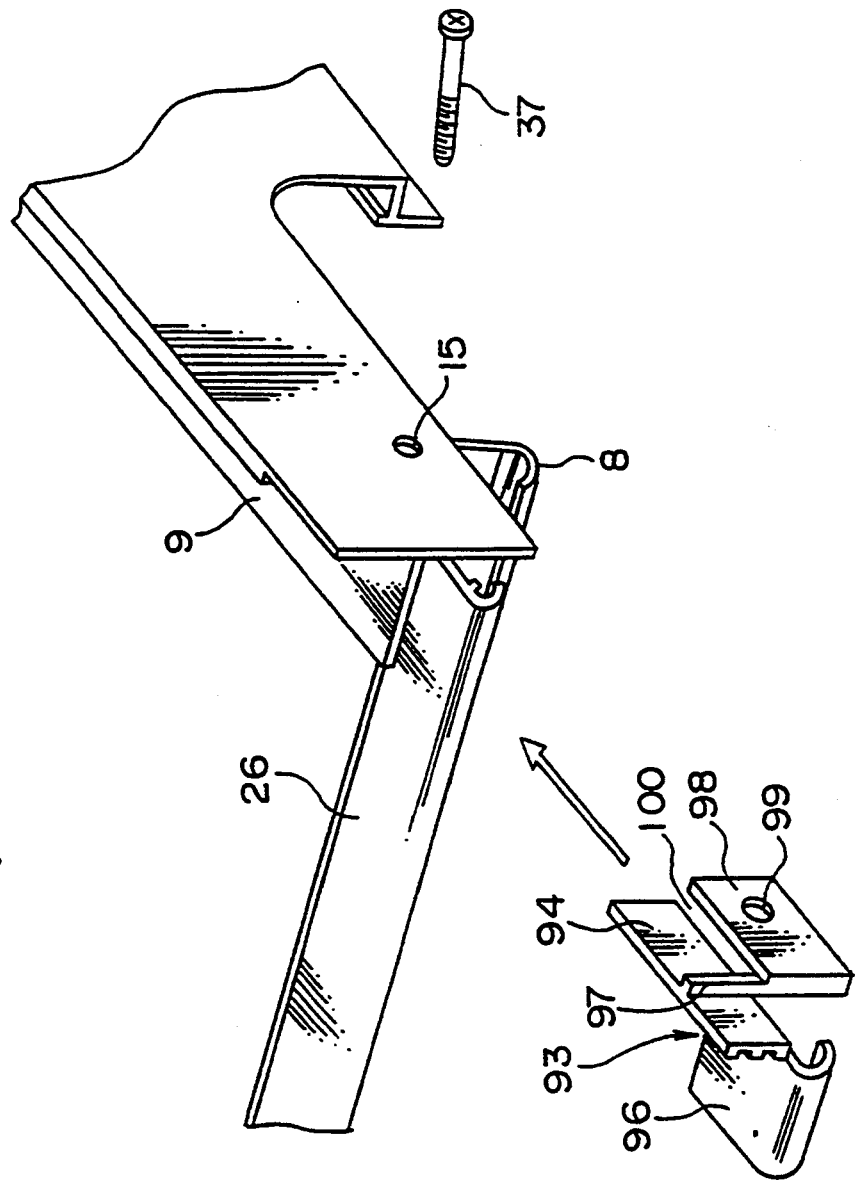
FIG. 45 is an exploded perspective view showing the other side of the light collecting member according to the second embodiment.

As shown in FIGS. 44 and 45, the light collecting member assembling jig 93 is placed at a portion where the water proof protrusion 12 is not defined on the inner surface of the vertical wall 11 of the vertical member 6. An overlap piece 94 which protrudes on the eaves side from the vertical wall 11 is disposed. On the inner surface of the overlap piece 94, a protrusion 95 connecting to the water proof protrusion 12 is formed. On the inner surface at the lower end of the overlap piece 94, a cover connecting portion 96 which is placed along the upper surface of a cover piece 26 of the lower horizontal member 8 is disposed. On the outer surface of the overlap piece 94, a contact protrusion 97 which is in contact with the eaves side end surface of the vertical wall 11 of the vertical member 6 vertically extends. On the outer surface of the contact protrusion 97, a mounting piece 98 which is placed on the outer surface of the vatical wall 11 is disposed. The mounting member 98 defines a screw hole 99 which matches the mounting hole 15 of the vertical member 6. Between the overlap piece 94 and the mounting piece 98, an insertion space 100 fitted to the vertical wall 11 is defined.

Figure 46:
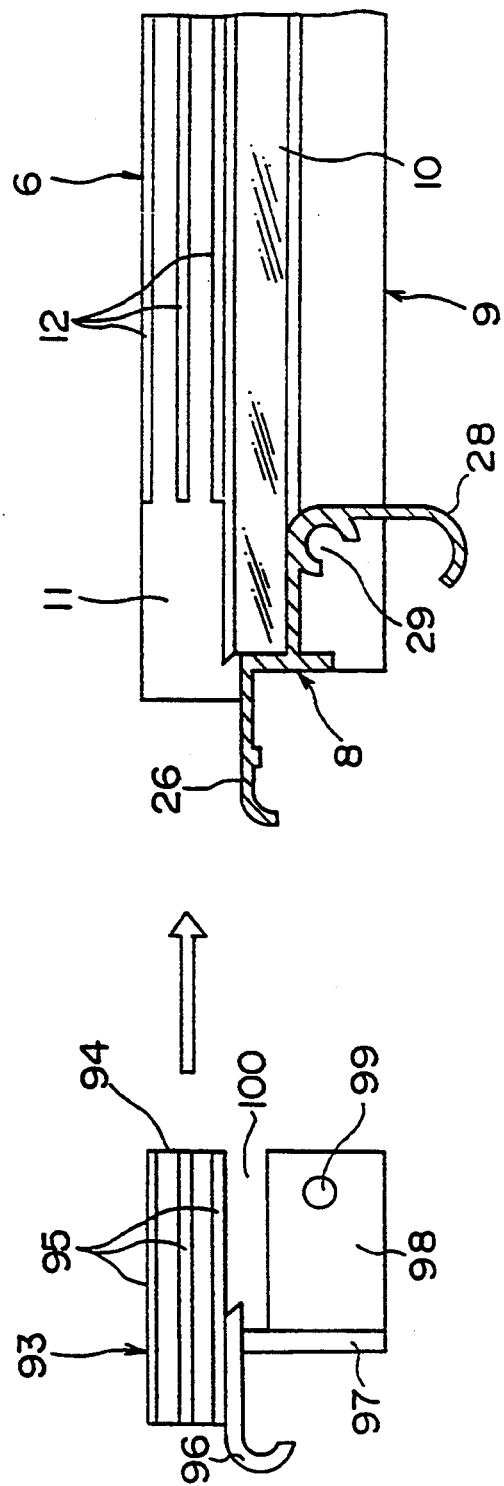
FIG. 46 is an exploded sectional view showing principal portions of the light collecting member according to the second embodiment.
Figure 47:
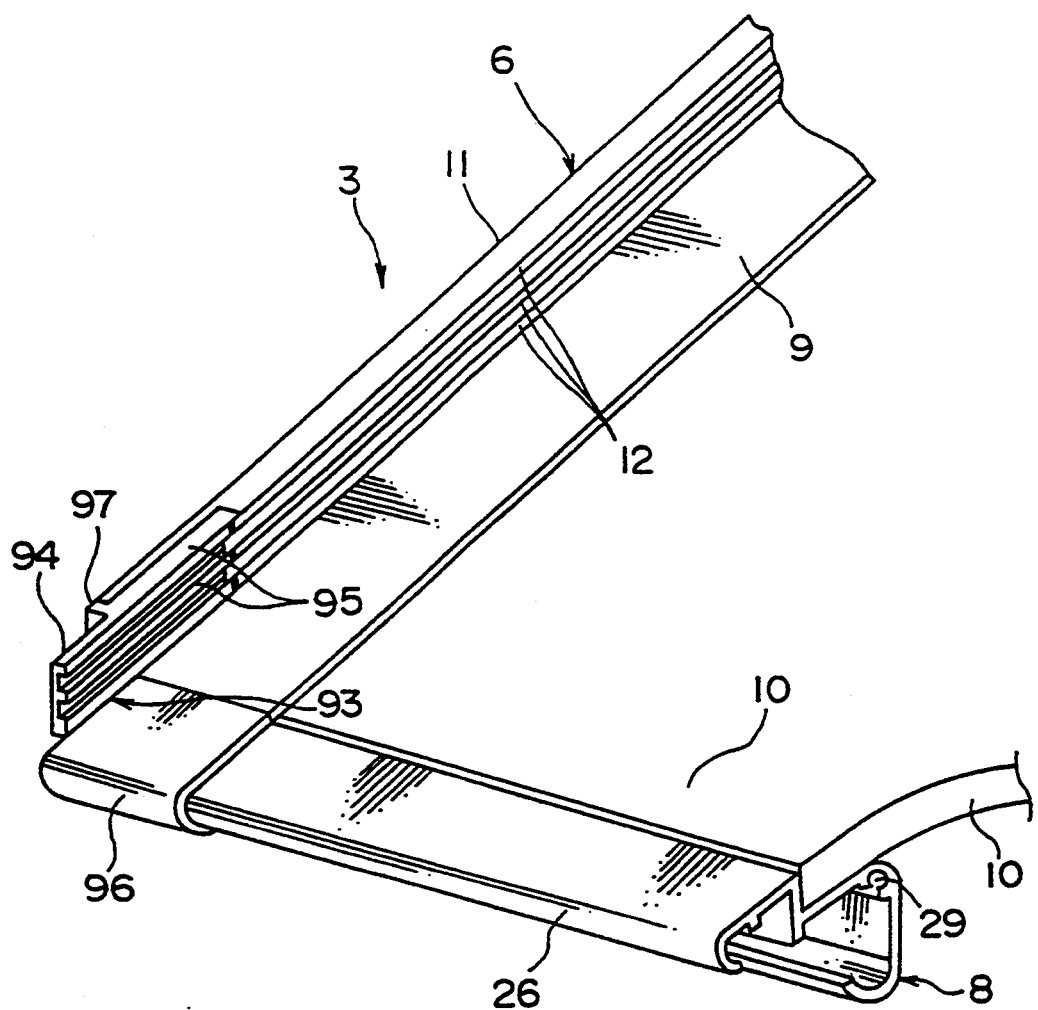
FIG. 47 is a perspective view showing one side of the light collecting member according to the second embodiment.
Figure 48:
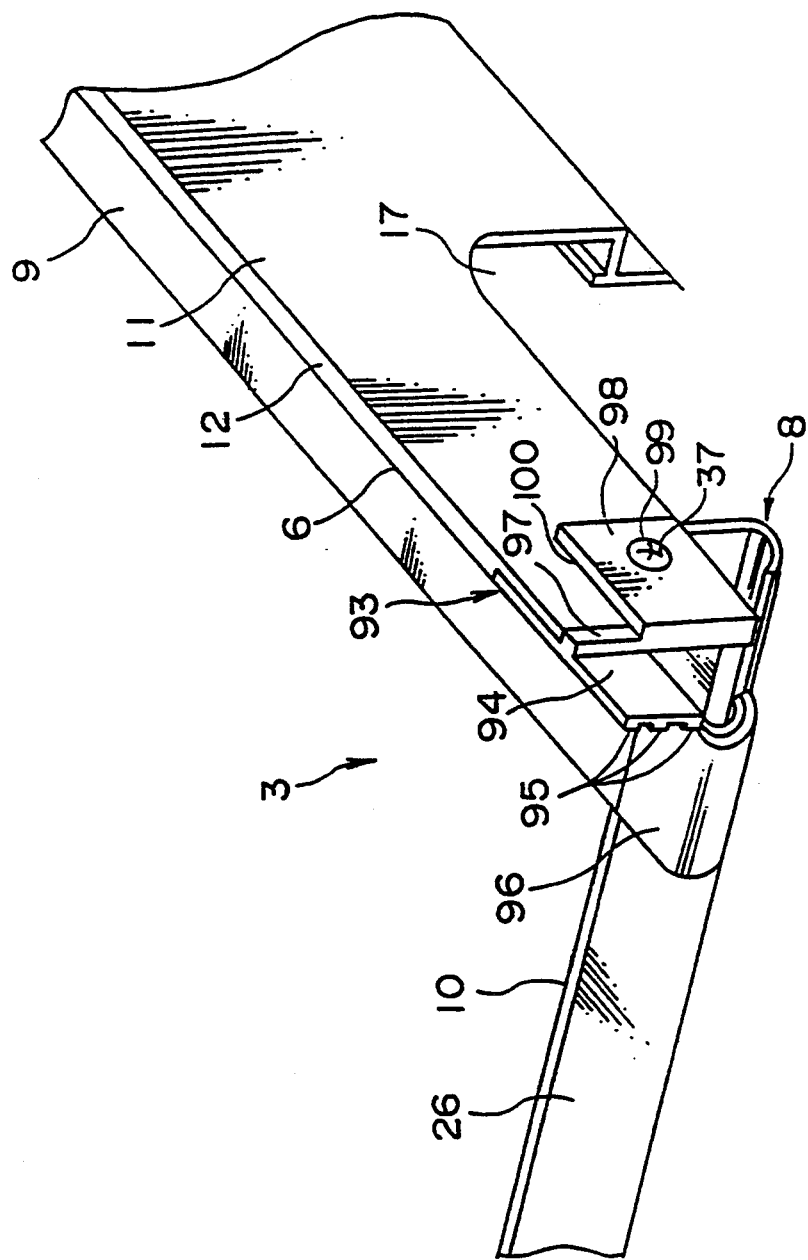
FIG. 48 is a perspective view showing the other side of the light collecting member according to the second embodiment.
Figure 49:
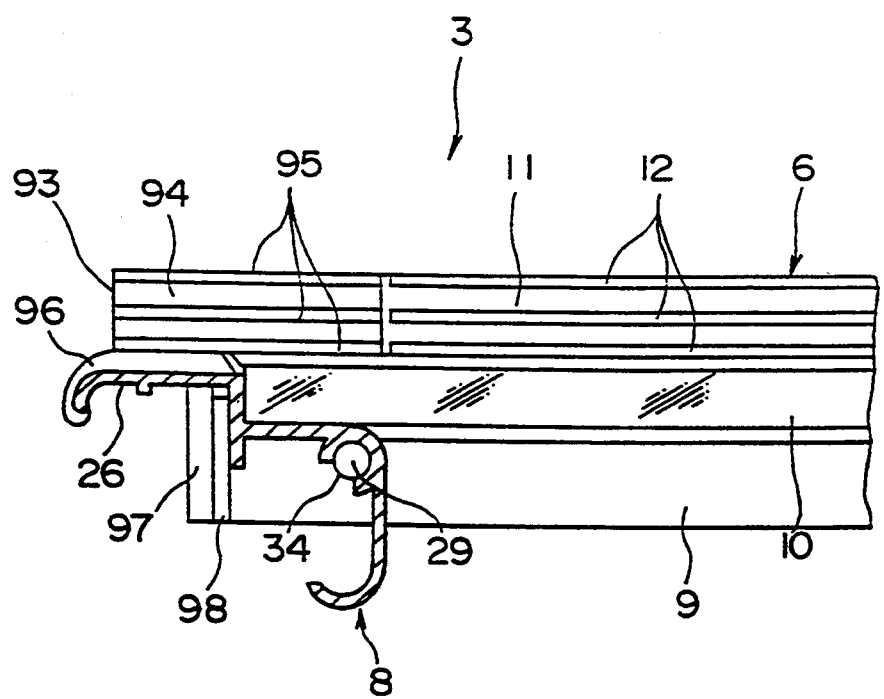
FIG. 49 is a sectional view showing principle portions of the light collecting member according to the second embodiment.

As shown in FIG. 46, the light collecting member 3 is assembled with the light collecting member assembling jig 93. In other words, the vertical wall 11 of the vertical member 6 is inserted into the insertion space 100. As shown in FIGS. 47, 48, and 49, the ridge side half of the overlap piece 94 is placed on the inner surface of the eaves side end of the vertical wall 11. The cover connecting portion 96 is placed on the upper surface of the lateral end portion of the cover piece 26. The contact protrusion 97 is contacted with the eaves side end surface of the vertical wall 11. The mounting piece 98 is placed on the outer surface of the vertical wall 11 so that the screw hole 99 matches the mounting hole 15 of the vertical member 6. The screw 37 is inserted into the screw hole 99, the mounting hole 15, and the eaves side fixing hole 34 of the transparent plate support member 9 so as to fix the hollow curved groove 29 of the lower horizontal member 8. Thus, the vertical member 6, the transparent plate support member 9, and the lower horizontal member 8 are assembled.

Figure 50:
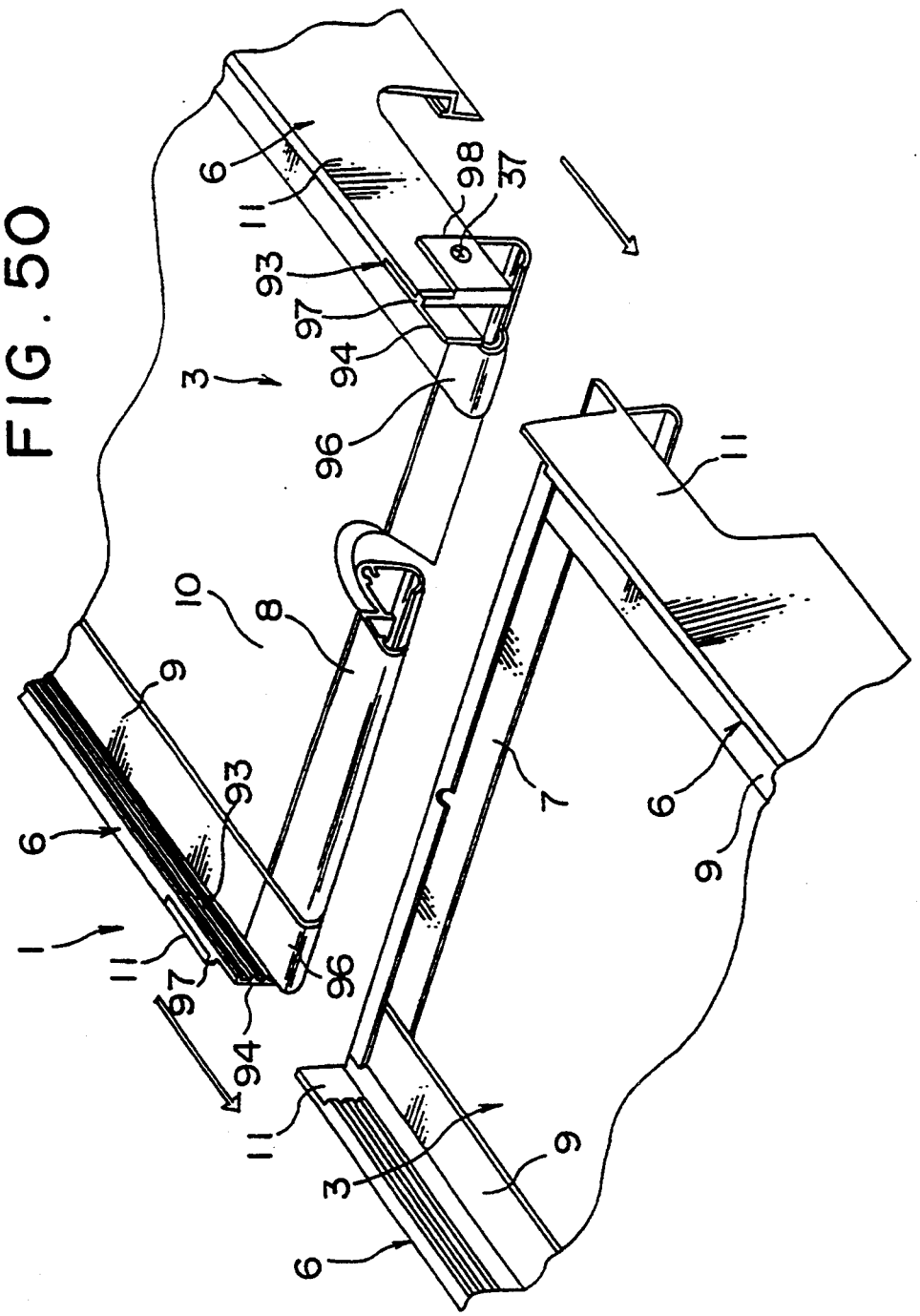
FIG. 50 is a perspective view showing principal portions of the roof apparatus according to the second embodiment to which the light collecting member has not been connected.

As shown in FIG. 50, when a new light collecting member 3 is connected in the slope direction of the roof, the light collecting member 3 is slid to a light collecting member 3 which has been connected on the eaves side of the roof. As shown in FIG. 42, the cover piece 26 is placed on the upper horizontal member 7 of the light collecting member 3 on the eaves side. The eaves side half of the outer surface of the overlap piece 94 of the light collecting member assembling jig 93 is placed at a portion where the water proof protrusion 12 is not formed on the inner surface of the vertical wall 11 of the light collecting member 3 on the eaves side.

Thus, when the roof apparatus is constructed of the light collecting members 3, the space defined between the vertical member 6 of the light collecting member 3 on the eaves side and the vertical member 6 of the light collecting member 3 on the ridge member 3 is covered by the overlap piece 94. As a result, the overlap piece 94 prevents rain water from entering between the connecting members 2 and 4.

The light collecting member assembling jig 93 is used to assemble the light collecting member 3. In this case, the cover connecting portion 96 is covered with the cover piece 26 of the lower horizontal member 8. The cover connecting portion 96 is pushed in the ridge direction. When the cover connecting portion 96 is contacted with the vertical member 6 and the transparent plate support portion 9, the mounting hole 15 of the vertical member 6, the hollow curved groove 29 of the lower horizontal member 8, the fixing hole 34 of the transparent plate support member 9, and the screw hole 99 of the light collecting member assembling jig 93 are aligned. Thus, the light collecting member 3 can be easily assembled.

Since the construction of other portions of the light collecting member 3 and the roof apparatus 1 of the second embodiment is the same as that of the first embodiment, the similar portions are designated by the similar reference numerals and the description thereof is omitted.

Figure 51:
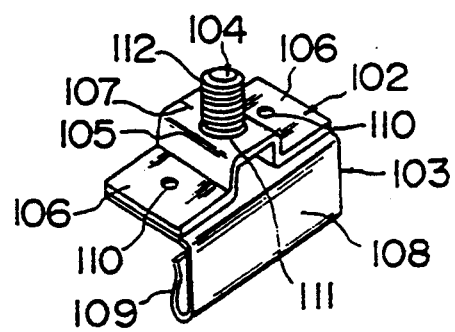
FIG. 51 is a perspective view showing a roof member fitting.

In FIG. 51, a roof member fitting 101 comprises a horizontal base plate 102, a leaf spring 103, and a bolt 104, each of which is made of a metal. The leaf spring 103 is mounted on the rear surface of the horizontal base plate 102 and downwardly extends from one edge in the roof lateral direction of the horizontal base plate 102. The bolt 104 is disposed at a center portion of the horizontal base plate 102.

The horizontal base plate 102 comprises a protrusion 105 and horizontal flanges 106. The protrusion 105 is disposed at a center portion in the lateral direction of the horizontal base plate 102. The horizontal flanges 106 are disposed on both the sides of the protrusion 105. At the center in the lateral direction on the upper surface of the protrusion 105, a red alignment mark 107 which is in contact with the other edge in the roof lateral direction of the horizontal base plate 102 is indicated. At a center portion of the protrusion 105, a bolt through-hole is defined.

The leaf spring 103 is welded on the entire rear surface of the horizontal flange 106. The width of the leaf spring 103 is nearly the same as that of the horizontal base plate 102. One end of the leaf spring 103 downwardly extends from one edge of the horizontal base plate 102 for a predetermined length. The lower end of the leaf spring 103 bends inwardly and upwardly, thereby forming a hook portion 109. The hook portion 109 has an edge portion which is tensioned so that it comes in contact with a vertical portion 108 of the leaf spring 103. The upper end portion of the hook portion 109 is bent in a bracket shape in the leaving direction of the vertical portion 108. On each side of the protrusion 105, a mounting hole 110 which passes through the horizontal flange 106 and the leaf spring 103 is defined.

Figure 53:
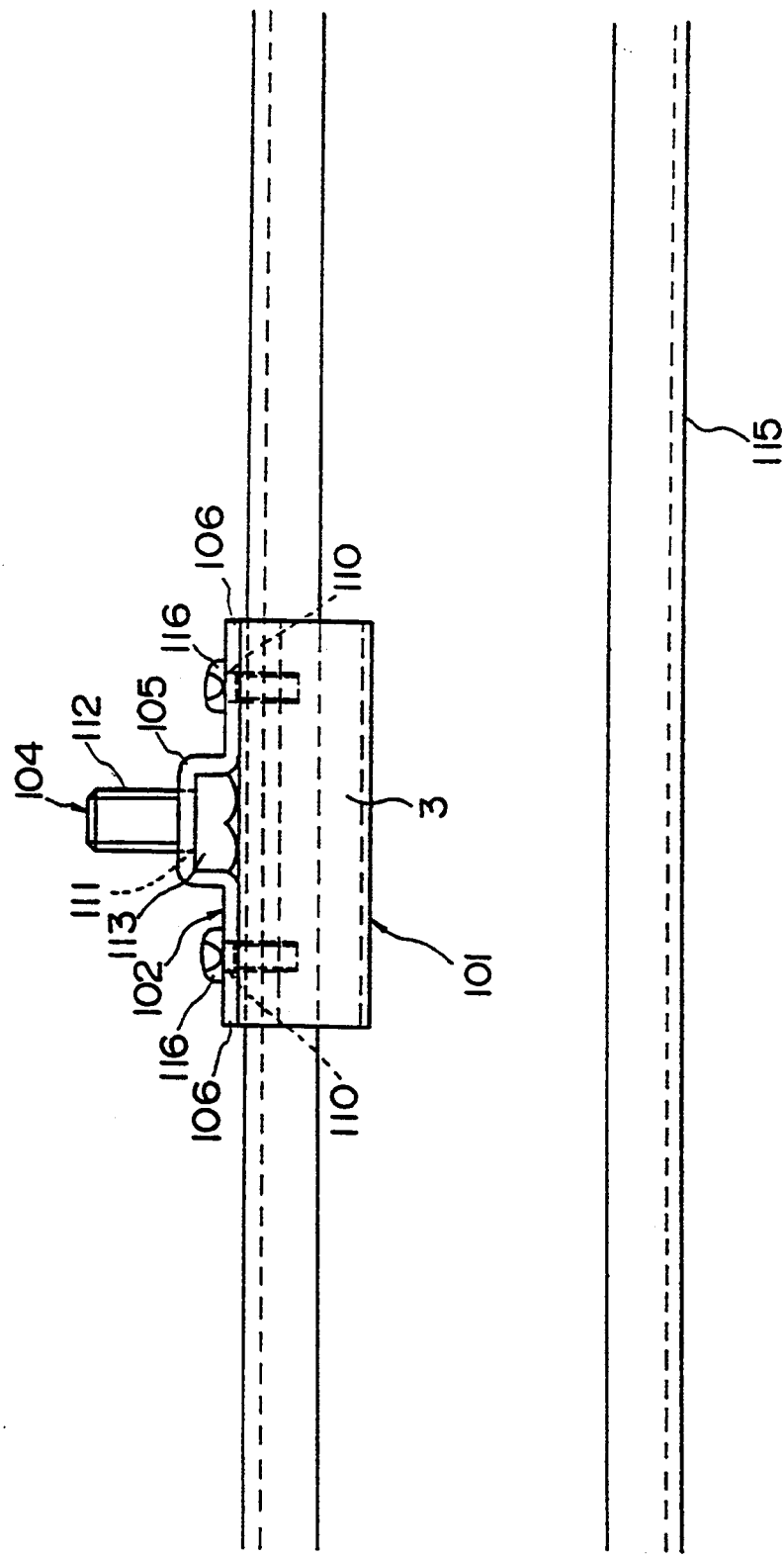
FIG. 53 is a rear view showing the roof member fitting which is mounted to the horizontal beam.

As shown in FIG. 53, the bolt 104 has a short male screw portion 112 and a large head portion 113. The head portion 113 is disposed at the lower end of the male screw portion 112. Before the leaf spring 103 is mounted, the male screw portion 112 is inserted upwardly into a bolt hole 111 of the horizontal base plate 102. The head portion 113 is placed in a lower hollow portion of the protrusion 105. The leaf spring 103 is welded so that the hollow portion is closed. The male screw portion 112 is vertically placed on the horizontal base plate 102.

Figure 54:
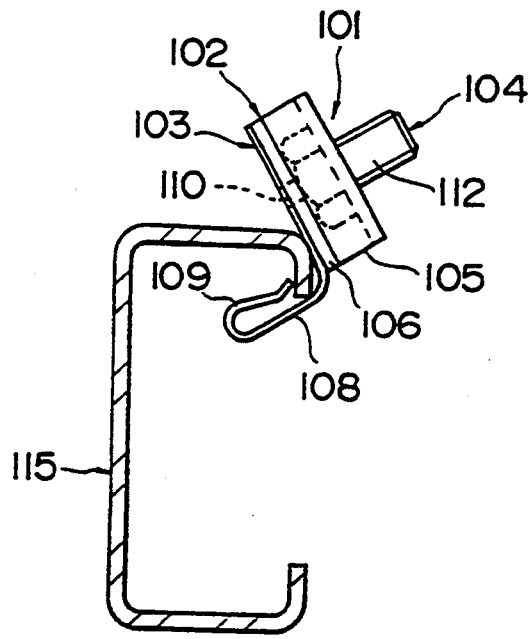
FIG. 54 is a side view showing a first step for mounting the roof member fitting to the horizontal beam.

As shown in FIG. 54, the roof member fitting 101 is mounted to a horizontal beam made of a lip grooved steel member 115. In other words, the roof member fitting 101 is inclined. The lower end of the leaf spring 103 is inserted between upper and lower lips of the lip grooved steel member 115. The forward end of the upper lip is inserted into the opening of the hook portion 109.

Figure 52:
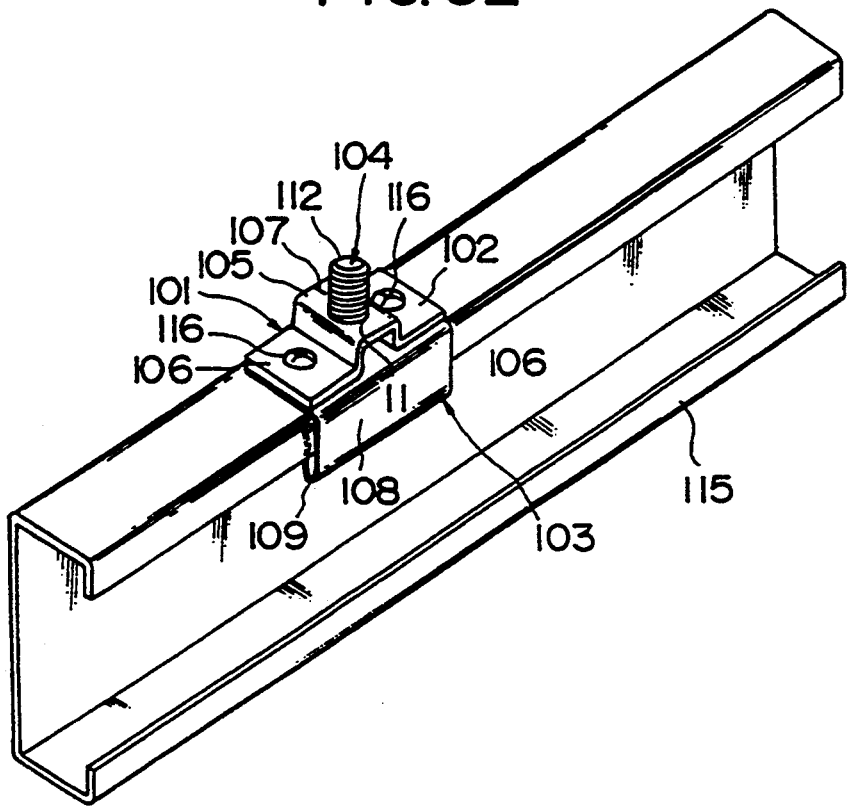
FIG. 52 is a perspective view showing the roof member fitting which is mounted to a horizontal beam.
Figure 55:
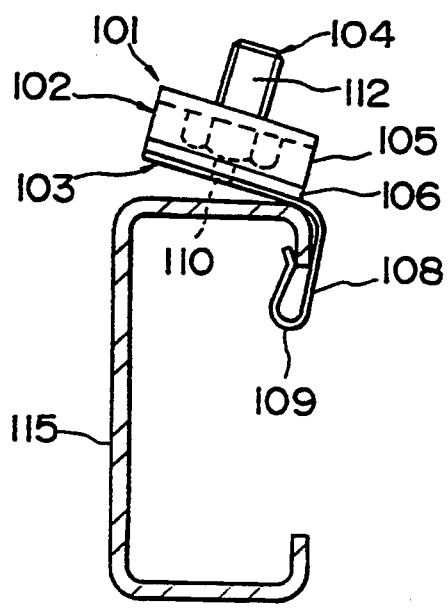
FIG. 55 is a side view showing a second step for mounting the roof member fitting To the horizontal beam.
Figure 56:
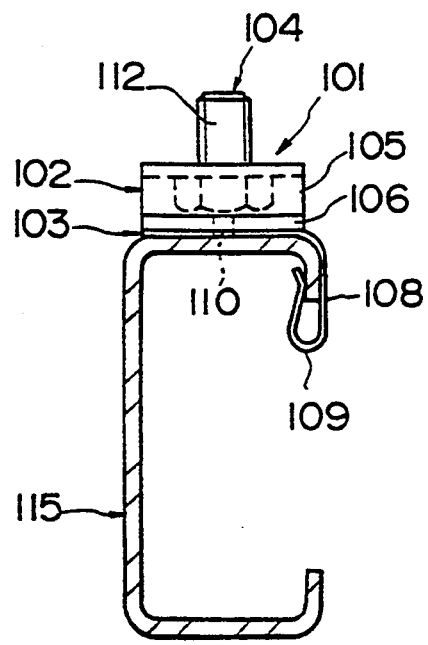
FIG. 56 is a side view showing a third step for mounting the roof member fitting to the horizontal beam.
Figure 57:
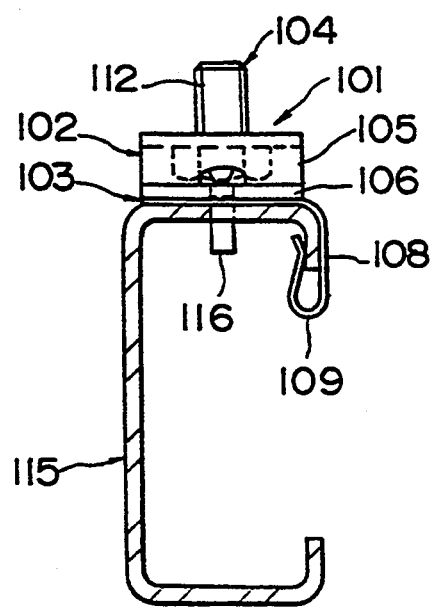
FIG. 57 is a side view showing a fourth step for mounting the roof member fitting to the horizontal beam.

As shown in FIG. 55, the bolt 104 is rotated in the direction perpendicular to the lip grooved steel member 115 along arrow a of the roof member fitting 101. As shown in FIG. 56, the rear surface of the leaf spring 103 is placed on the upper surface of the lip grooved steel member 115. Thereafter, the roof member fitting 101 is slid in the longitudinal direction of the lip grooved steel member 115. A black line on the upper surface of the lip grooved steel member 115 is aligned with the red mark 107 corresponding to the mounting size being obtained. As shown in FIGS. 52 and 57, a fitting 116 such as a machine screw is inserted into the mounting hole 110 and the upper surface of the lip grooved steel member 115.

Next, the connecting member 2 which is mounted on the lip grooved steel member 115 by the roof member fitting 101 will be described.

Figure 58:
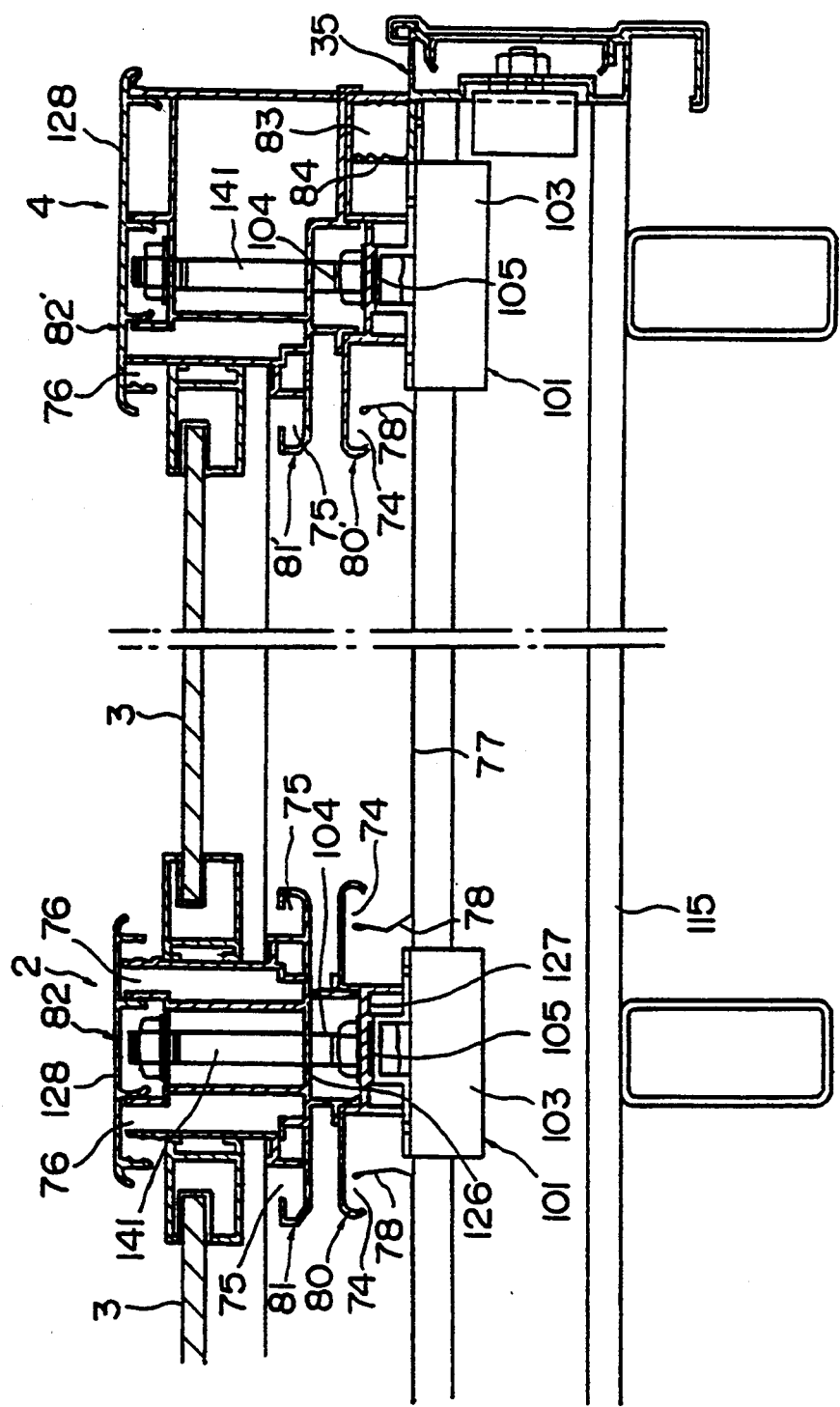
FIG. 58 is a horizontal sectional view showing a roof.

As shown in FIG. 58, the connecting member 2 is disposed in the slope direction of the roof. The connecting member 2 comprises a lower connecting member 80, an upper connecting member 81, and a connecting member cover 82. The lower connecting member 80 connects the water proof plate 77. The upper connecting member 81 connects the light collecting member 3. The connecting member cover 82 covers an upper portion of the upper connecting member 81.

Figure 61:
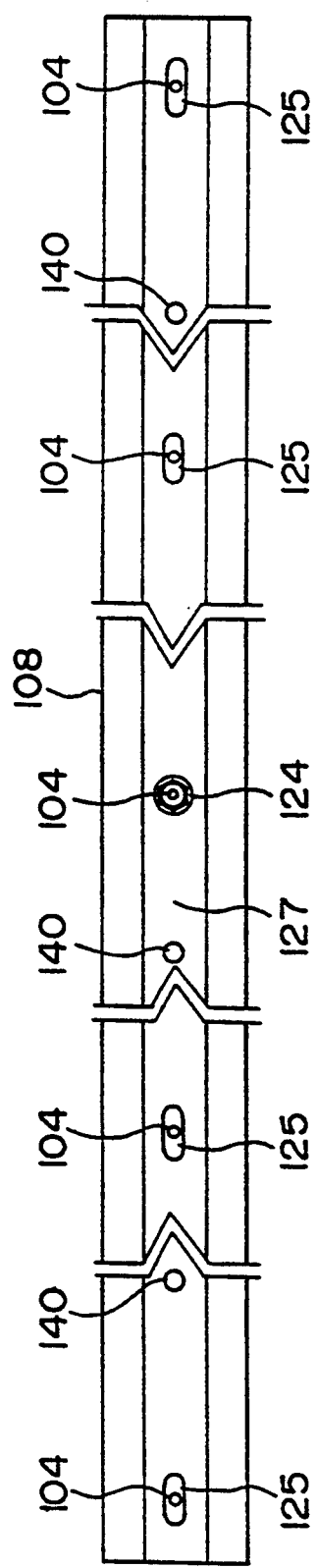
FIG. 61 is a plan view showing a lower connecting member.

The lower connecting member 80 is constructed of a lower width adjusting portion 74 which downwardly and outwardly extends and engages the water proof wall 78 formed at a lateral edge of the water proof plate 77 with both sides in the lateral direction of the horizontal fixing portion 127. As shown in FIG. 61, a round hole 124 is defined at a center portion in the longitudinal direction of the horizontal fixing portion 127. On each side of the round hole 124, elongate holes are defined at predetermined intervals. Between the round hole 124 and each elongate hole 125, a connecting bolt hole 140 is defined.

The upper connecting member 81 is mounted on the upper surface of the lower connecting member 80. At a center portion in the lateral direction of the horizontal surface 26, a connecting bolt hole (not shown) corresponding to the connecting bolt hole 140 of the lower connecting member 80 is defined. At both lateral ends of the horizontal surface 126, an intermediate width adjusting portion 75 is defined which supports the lower end of the light collecting member 3. The intermediate width adjusting portion 75 upwardly opens.

The connecting member cover 82 is disposed so that it covers the upper portions of the upper connecting member 81 and the light collecting member 3. The connecting member cover 82 downwardly opens from both lateral ends on the lower surface of a horizontal cover 128. The connecting member cover 82 has an upper width adjusting portion 76 which holds the upper end of the light collecting member 3.

Figure 59:
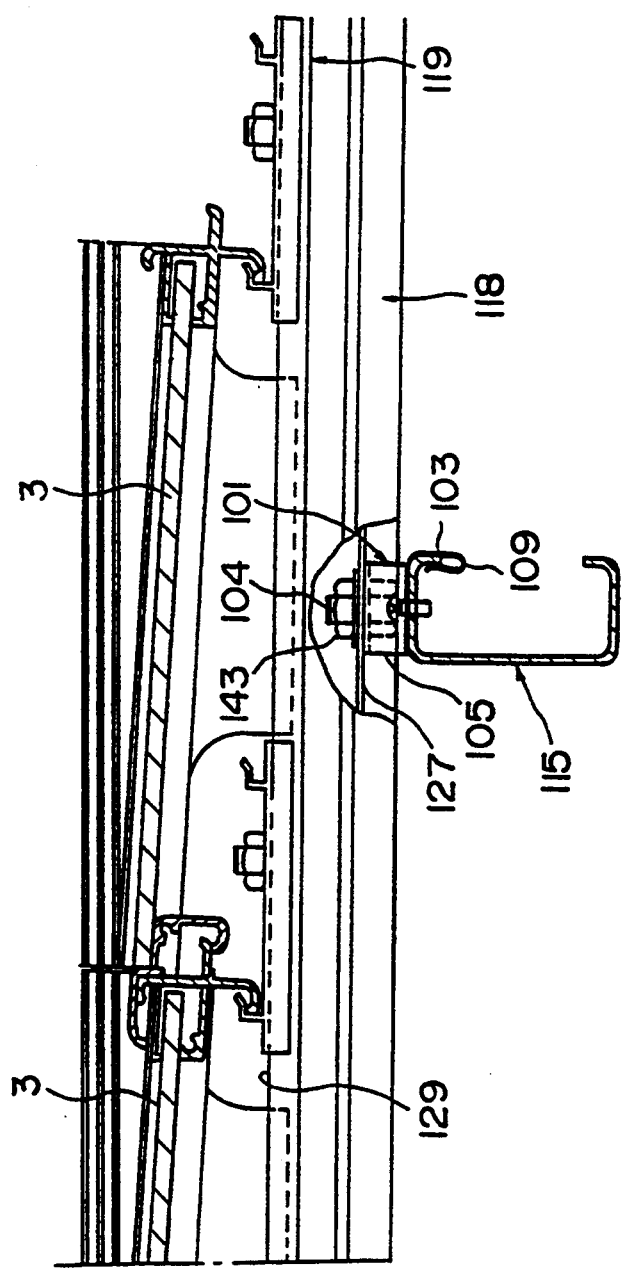
FIG. 59 is a vertical sectional view showing a center portion of the roof.
Figure 60:
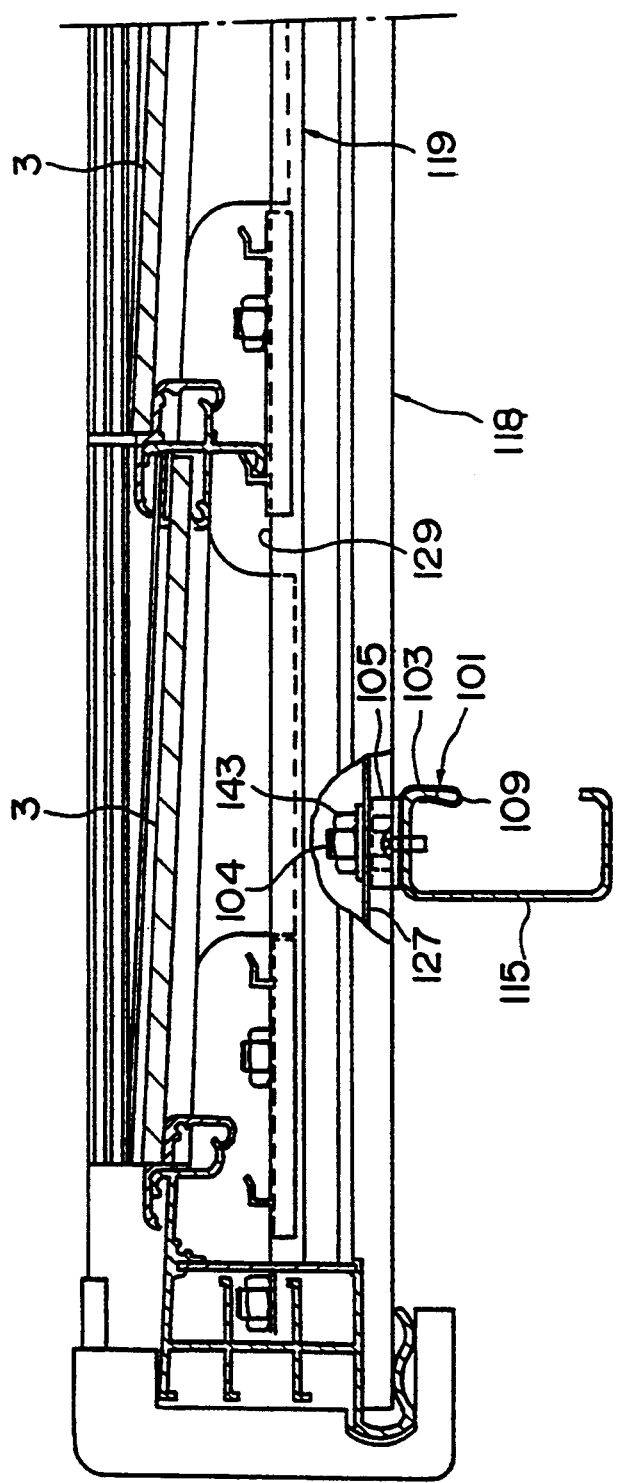
FIG. 60 is a vertical sectional view showing an eaves portion of the roof.

The connecting member 2 is mounted in the following manner. First, the roof member fittings 101 are mounted to the lip grooved steel members 115 disposed in the roof lateral direction corresponding to the intervals of the connecting members 2. Next, as shown in FIG. 59, the lower connecting members 80 are disposed in the slope direction of the roof on the lip grooved steel members 115. The horizontal fixing portion 127 of the lower connecting member 80 is disposed on the upper surface of the protrusion 105 of the roof member fitting 101. The bolts of the roof member fitting 101 are inserted into the round hole 124 and the elongate holes 125. The nut 143 is fitted to the male screw portion 112 of the bolt 104. Thus, the lower connecting member 80 is fixed to the lip grooved steel member 115.

Next, the water proof wall 78 of the water proof plate 77 disposed on the upper surface of the lip grooved steel member 115 is placed in the lower width adjusting portion 74. The upper connecting member 81 is longitudinally disposed on the upper surface of the lower connecting member 80. The connecting bolt 141 inserted upwardly into the connecting bolt hole 140 of the lower connecting member 80 is inserted into the connecting bolt hole of the upper connecting member 81. Each nut of each connection bolt 141 is tightened so as to fix the lower connecting member 80 and the upper connecting member 81.

The lower end of each lateral portion of the light collecting member 3 is inserted into the intermediate width adjusting portion 75 of the upper connecting member 81. The light collecting member 3 is connected in the lateral direction. The connecting member cover 82 is placed on the upper connecting member 81 so as to fix the connecting member cover 82.

As shown in FIG. 58, the lateral connecting member 4 disposed at the lateral front base member of the roof comprises a lateral lower connecting member 80', a lateral upper connecting member 81', and a lateral connecting member cover 82'. Since the construction of the roof inner side half of each member is nearly the same as the construction of the lower connecting member 80, the upper connecting member 81, and the connecting member cover 82, the similar portions are denoted by the similar reference numerals and the description thereof is omitted.

An outer end of the lateral lower connecting member 80', a wide lateral width adjusting portion 83 into which the upright wall 84 of the lateral front base member 5 is inserted is formed. Since the light collecting member 3 is not disposed on the lateral front base member side of the lateral upper connecting member 81' and on the lateral front base member side of the horizontal cover 128 of the lateral connecting member cover 82', the intermediate width adjusting portion 75 and the upper width adjusting portion 76 are not formed. Nearly in the same manner as the connecting member 2, the lateral connecting member 4 is mounted on the lip grooved steel member 115.

Figure 62:
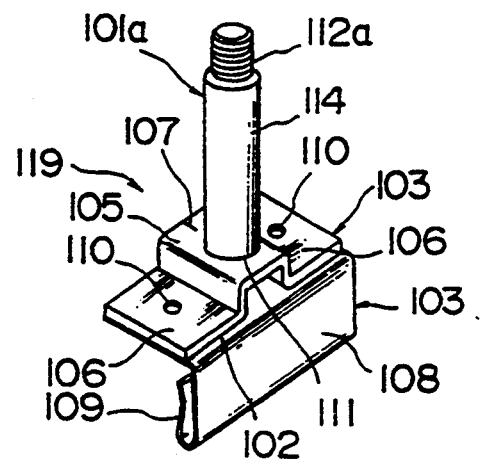
FIG. 62 is a perspective view showing another roof member fitting.
Figure 63:
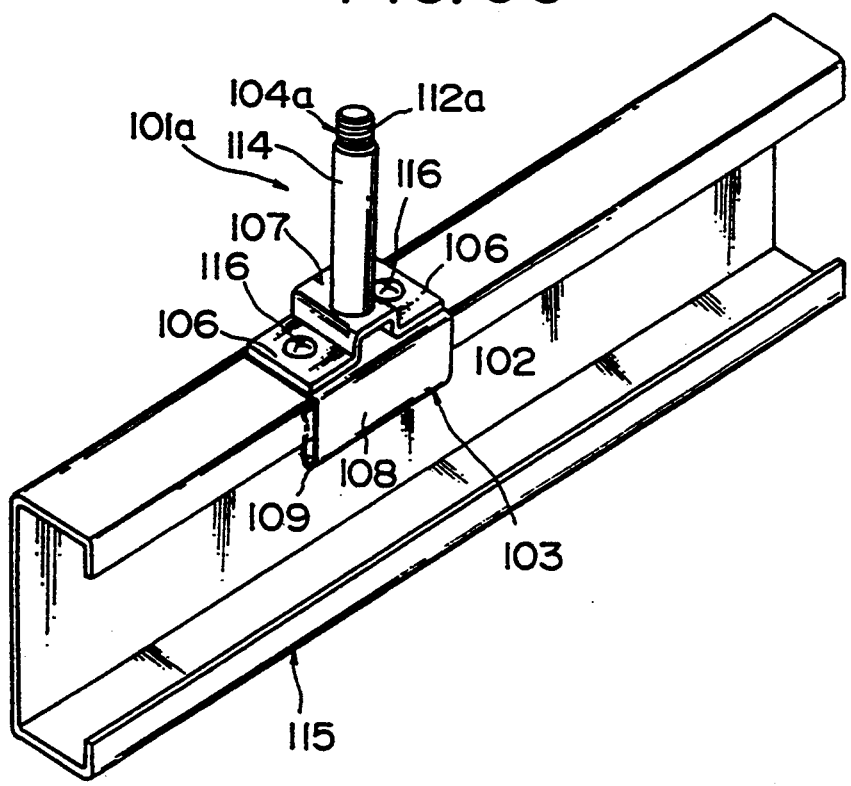
FIG. 63 is a perspective view showing another roof member fitting which is mounted to the horizontal beam.
Figure 64:
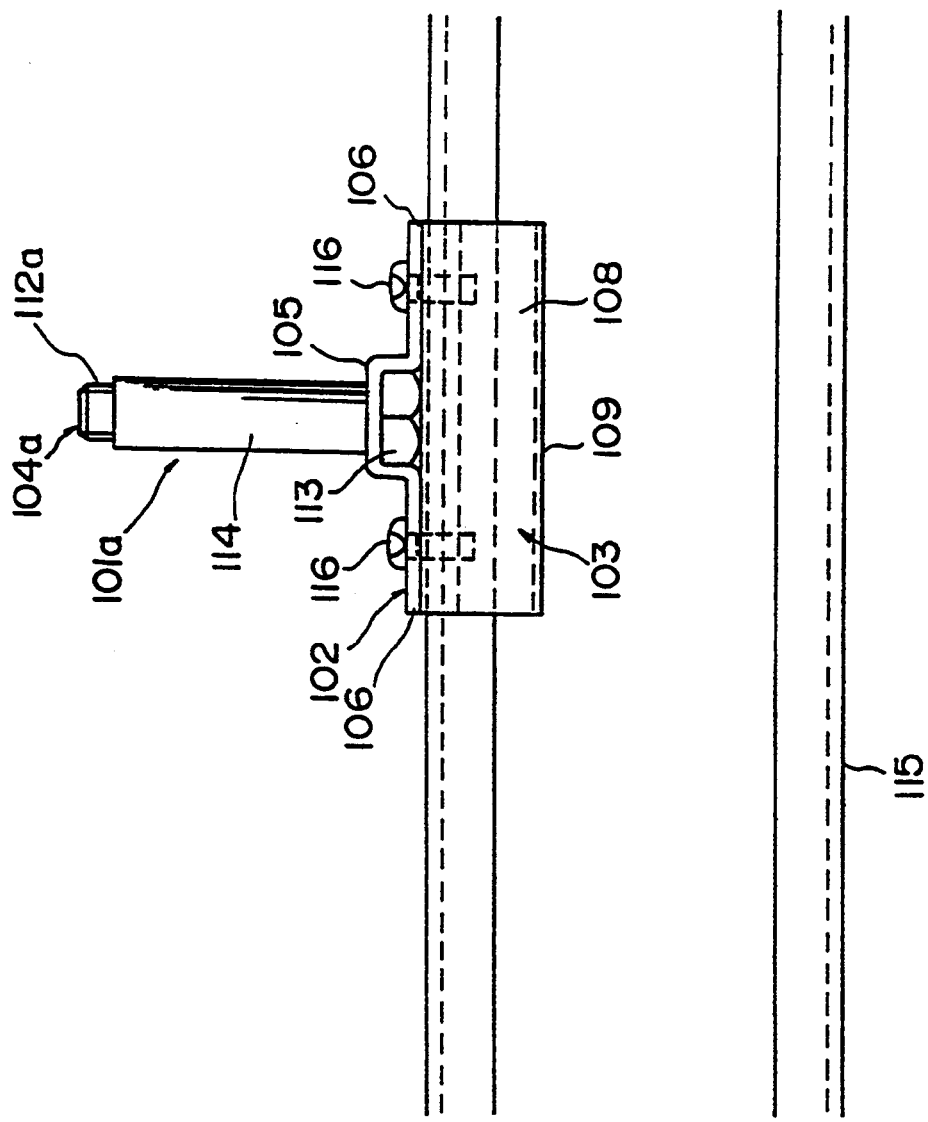
FIG. 64 is a rear view showing another roof member fitting which is mounted to the horizontal beam.

FIGS. 62 to 64 show another roof member fitting 101a. A bolt 104a has a cylinder portion 114, a male screw portion 112a, and a head portion 113. The diameter of the cylinder portion 114 is slightly larger than that of the male screw portion 112a. The diameter of the cylinder portion 114 is smaller Than that of the head portion 113. The male screw portion 112a is disposed at the upper end of the cylinder portion 114. The head portion 113 is disposed at the lower end of the cylinder portion 114. On the protrusion 105 of the horizontal base plate 102, the cylinder portion 114 and the male screw portion 112 are disposed.

Since the construction of other portions of the roof member fitting 101 and the mounting method thereof to the lip grooved steel member 115 are nearly the same as those of the roof member fitting 101, the similar portions are denoted by the similar reference numerals and the description thereof is omitted.

Figure 65:
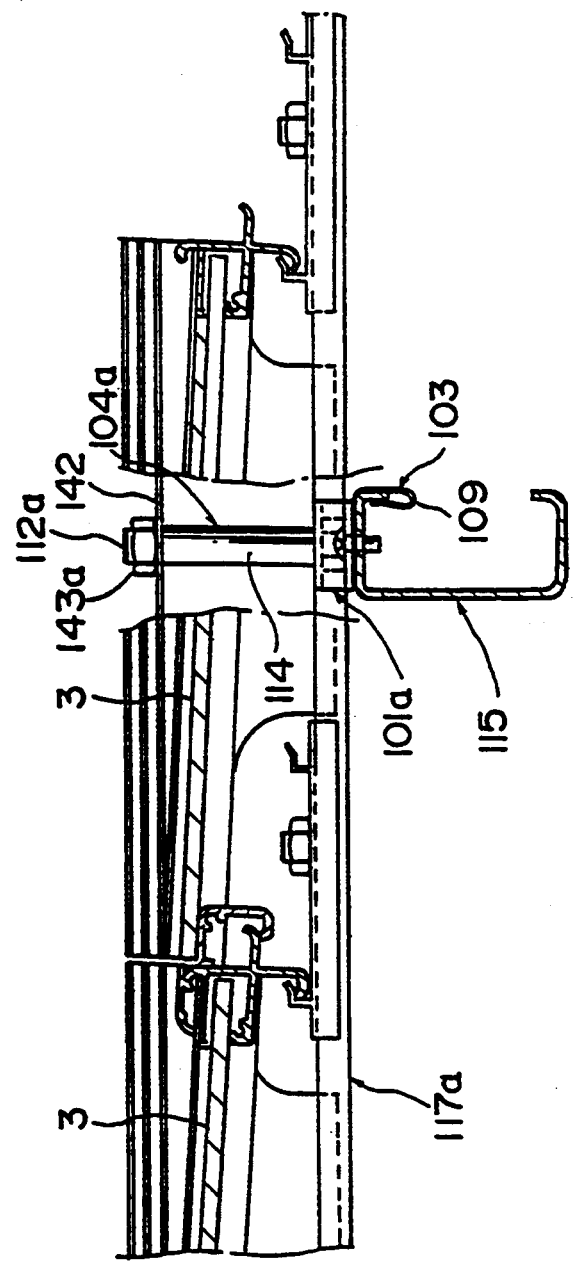
FIG. 65 is a vertical sectional view showing the another roof member fitting which is mounted at the roof center portion.
Figure 66:
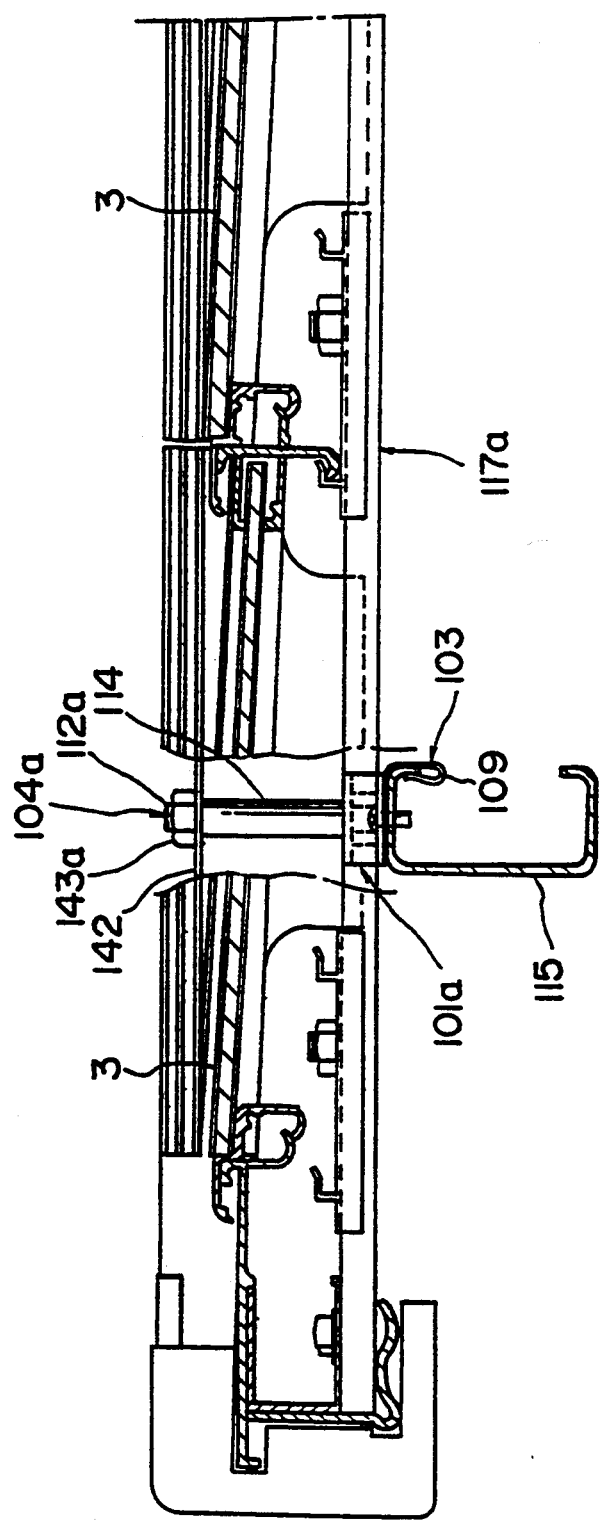
FIG. 66 is a vertical sectional view showing the roof member fitting which is mounted at the roof eaves portion.
Figure 68:
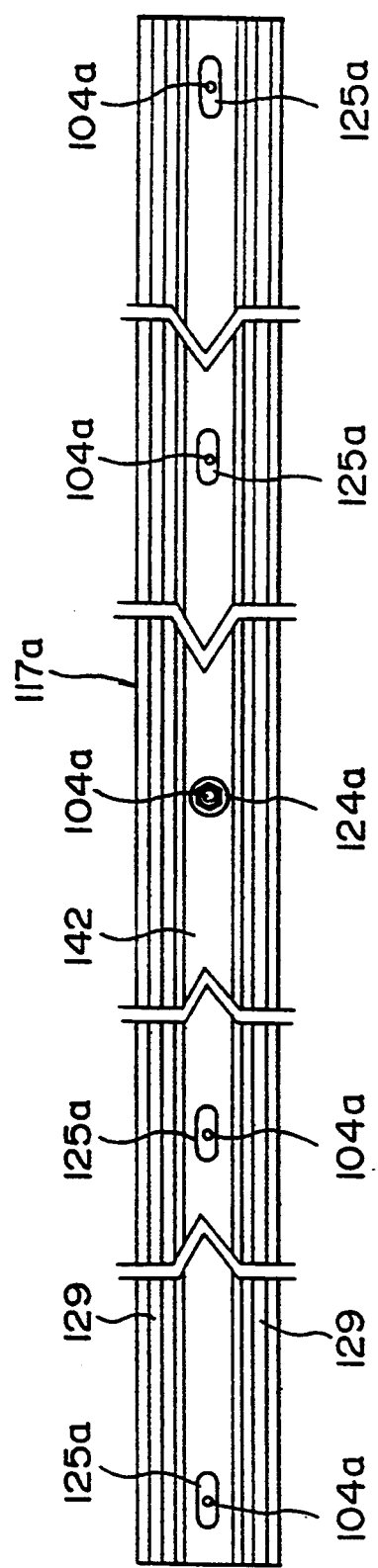
FIG. 68 is a plan view showing the connecting member which is in normal state.

As shown in FIGS. 65 and 66, the connecting member 117a mounted with the roof member fitting 101a is not separated into a lower portion and a upper portion. As shown in FIG. 68, bolts 104a of the roof member fitting 101a are inserted into a round hole 124a and elongate holes 125 which are defined on both sides of the round hole 124a at predetermined intervals. The round hole 124a passes through a center portion of the horizontal portion 142. The elongate holes 125 pass through in the longitudinal direction of the horizontal portion 142. A nut 143a is fitted to the male screw portion 112a. Thus, the connecting member 117a is fixed to the lip grooved steel member 115.

Although the construction of other portions of the connecting member 117a is nearly the same as those of the connecting member 2, since the connecting member 117a is not separated into an upper portion and a lower portion, it is not necessary to define the connecting bolt hole 140.

Figure 67:
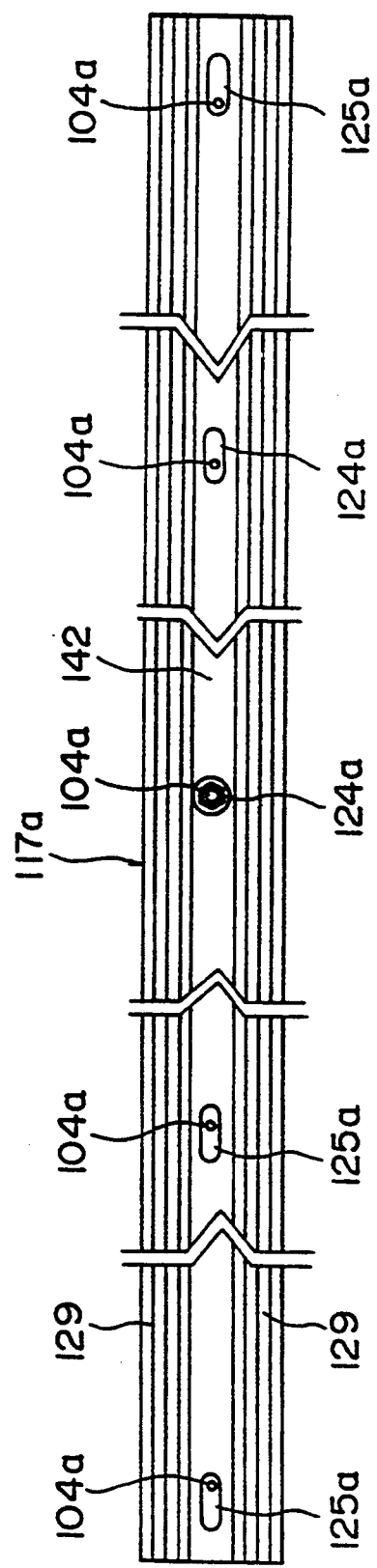
FIG. 67 is a plan view showing a connecting member which is contacted.

When the connecting member 117a is mounted on the lip grooved steel member 115, if the connecting member 117a is of standard length type, as shown in FIG. 68, each bolt 104a of the roof member fitting 101a is positioned at the center of the elongate hole 125a. However, even if the connecting member 117a expands from the center portion in the longitudinal direction due to temperature change or direct sun light, as shown in FIG. 67, the bolt 104a of the roof member fitting 101a easily moves to an end portion close to the round hole 124a in the elongate hole 125a. Thus, since the bolt 104a is not twisted, the fixed portion of the connecting member 117a is not damaged.

Figure 69:
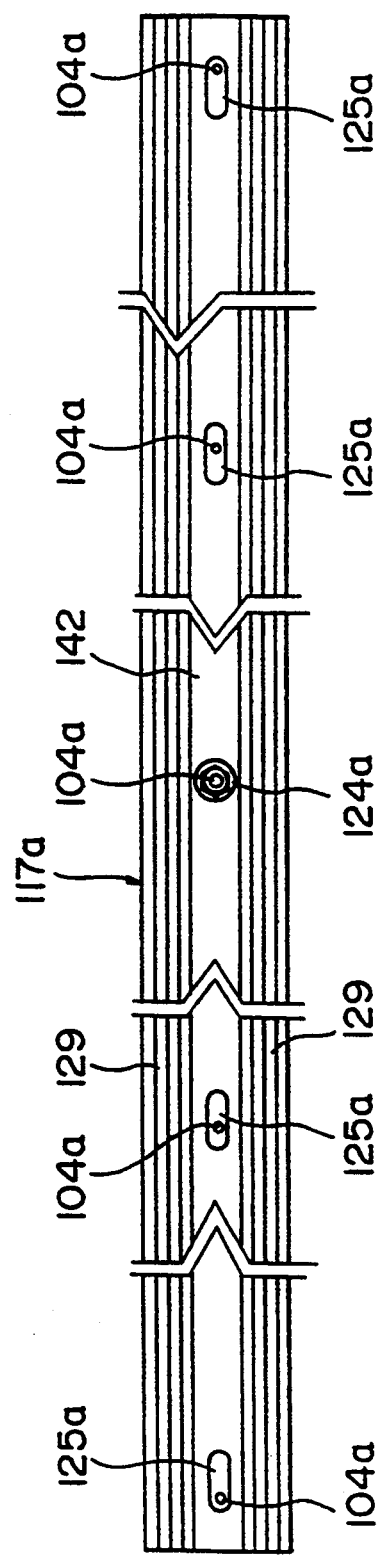
FIG. 69 is a plan view showing the connecting member which is expanded.

When the connecting member 117a shrinks from the center portion in the longitudinal direction due to temperature drop, as shown in FIG. 69, the bolt 104a moves to the outer end direction in the elongate hole 125a. Thus, the distortion of the bolt 104a is absorbed. This applied to the above-described connecting member 2 and the lateral connecting member 4. Thus, the bolt 104 of the roof member fitting 101 moves in the elongate hole 125 of the lower connecting member 80. As a result, the roof member fitting 101 can absorb the distortion by heat expansion and mounting error.

In the above-described embodiments, the lip grooved steel member 115 as a horizonal beam was used. However, it should be noted that with an angle steel member or an unequal angle steel member the lower end of the leaf spring 103 of the roof member fitting 101 or 101a may be engaged with the flange thereof. In addition, a light collecting member 3 which does not have photocells may be used.

Moreover, the roof member fittings 101 and 101a may be directly fixed to a metal roof plate or the like rather than a connecting member. The mark 107 may be a notch rather than the red mark.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A roof apparatus, comprising:
    a plurality of light collecting members, each of said light collecting members comprising left and right vertical members each having a ridge side end and an eaves side end, an upper horizontal member, a lower horizontal member, and a transparent plate, said upper horizontal member being disposed at said ridge side ends of said vertical members, said lower horizontal member being disposed at said eaves side ends of said vertical members, said transparent plate being disposed an inner periphery of said vertical members, said upper horizontal member, and said lower horizontal member, said light collecting members being connected in a slope direction of a roof,
    wherein said lower horizontal member has a transparent plate holding piece, a transparent plate contact wall, and a cover piece, said transparent plate holding piece being adapted to hold an eaves side end of said transparent plate, said transparent plate contact wall having thickness which is smaller than a thickness of said transparent plate, said cover piece being adapted to cover an upper portion of said upper horizontal member of an adjacent eaves side light collecting member and extending from an upper end of said transparent plate contact wall.

2. The roof apparatus as set forth in claim 1, wherein:
    said vertical members each comprise a vertical wall;
    a plurality of water-proof protrusions longitudinally formed at an upper end of an inner surface of said vertical wall;
    a horizontal protrusion piece disposed on said inner surface at a lower end of said vertical wall; and
    a vertical support leg disposed at an inner end of said horizontal extrusion piece and extending vertically.

3. The roof apparatus as set forth in claim 2, wherein:
said vertical wall and said vertical support leg each define a ventilation notch at lower end on the eaves side end and a ridge side end of said vertical members.

4. The roof apparatus as set forth in claim 1, wherein:
said upper horizontal member comprises a sash-shaped horizontal piece;
an upright wall disposed in longitudinal direction on an upper surface of said horizontal piece;
a horizontal upper surface disposed at an upper end of said upright wall and extending on an eaves side of said roof, said horizontal upper surface being in parallel with said horizontal piece;
a water reflecting wall folded to a ridge side end of said horizontal upper surface;
a transparent plate support groove defined between said horizontal piece and said horizontal upper surface; and
a fitting engagement piece having a downwardly extending portion, a first bend portion and a second bend portion which are connected in succession, said downwardly extending portion extending on a lower surface of said horizontal piece, with said first bend portion bending on an eaves side and said second bend portion bending upwardly.

5. The roof apparatus as set forth in claim 1, wherein:
a forward end of said cover piece bends downwardly, the lower surface thereof having a water-proof protrusion.

6. The roof apparatus as set forth in claim 1, wherein:
said transparent plate holding piece has a curved water-proof aqueduct disposed at a ridge side edge and curves downwardly in an eaves direction of said roof.

7. The roof apparatus as set forth in claim 1, wherein:
said vertical members each have a transparent plate support member disposed along an inner surface.

8. The roof apparatus as set forth in claim 7, wherein:
said transparent plate support member comprises a hollow transparent plate holding frame;
space means formed in the longitudinal direction at an upper portion of an inner wall of said transparent plate holding piece, said space means being formed to allow said transparent plate to be held; and
groove means formed in longitudinal direction and on an outer surface of said transparent plate holding frame.

9. The roof apparatus as set forth in claim 4, further comprising:
a plurality of connecting members, disposed in a slope direction of said roof at predetermined intervals;
a light collecting member fitting having a ridge side and an eaves side, mounted on each of said connecting members; and
an engagement hook upwardly extending on a ridge side of said roof to said light collecting member fitting and engaging with a fitting engagement piece of said upper horizontal member.

10. The roof apparatus as set forth in claim 9, wherein:
said engagement hook is disposed on each of the ridge side and the eaves side of said light collecting member fitting.

11. The roof apparatus as set forth in claim 10, wherein:
said light collecting member fitting comprises
a lower cross-piece; and
an upper holding piece disposed on an upper surface of said lower cross-piece.

12. The roof apparatus as set forth in claim 10, wherein:
said transparent members are connected by a light collecting member assembling jig.

13. The roof apparatus as set forth in claim 12, wherein:
said light collecting member assembling jig comprises
an overlap piece disposed on the inner surface of a vertical wall of each of said vertical members and extending to an eaves side from said vertical wall;
a cover connecting portion disposed along an upper surface of said cover piece of said lower horizontal member disposed on an inner surface at the lower end of said overlap piece;
a contact protrusion in contact with an eaves side end surface of said vertical wall of each of said vertical members, said contact protrusion being formed in a vertical direction on an outer surface of said overlap piece;
a mounting piece disposed on an outer surface of said vertical wall disposed on an outer surface of said contact protrusion; and
holding space means for holding said vertical wall, formed between said overlap piece and said mounting piece.

* * * * *